United States Patent
Kojima et al.

(10) Patent No.: US 6,334,211 B1
(45) Date of Patent: *Dec. 25, 2001

(54) METHOD FOR VISUAL PROGRAMMING WITH AID OF ANIMATION

(75) Inventors: Keiji Kojima, Pittsburgh, PA (US); Yoshiki Matsuda, Kokubunji; Seiji Futatsugi, Inagi, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/405,214

(22) Filed: Sep. 27, 1999

Related U.S. Application Data

(60) Continuation of application No. 09/015,070, filed on Jan. 28, 1998, which is a continuation of application No. 08/659,805, filed on Jun. 7, 1996, now Pat. No. 5,774,122, which is a division of application No. 07/589,405, filed on Sep. 28, 1990, now Pat. No. 5,566,294.

(30) Foreign Application Priority Data

Sep. 29, 1989 (JP) .................................... 1-251890
Apr. 27, 1990 (JP) .................................... 2-110014

(51) Int. Cl.⁷ ...................................... G06F 9/45
(52) U.S. Cl. ...................................... 717/4
(58) Field of Search ...................................... 717/4

(56) References Cited

U.S. PATENT DOCUMENTS

| | | | |
|---|---|---|---|
| 4,455,619 | 6/1984 | Masui et al. | 345/509 |
| 4,600,919 | 7/1986 | Stern | 345/122 |
| 4,601,003 | 7/1986 | Yoneyama et al. | 395/351 |
| 4,704,696 | 11/1987 | Reimer et al. | 704/275 |
| 4,730,315 | 3/1988 | Saito et al. | 714/38 |

(List continued on next page.)

OTHER PUBLICATIONS

Ichikawa et al., Visual Programming . . . , Jul. 1987, IEEE, p. 129–137.*

Biles et al., Animated Graphics and Computer Simulation, 1987, IEEE, p. 472–477.*

Snodgrass, R., A Relational Approach to Monitoring Complex Systems, May 1988, ACM, p. 157–196.*

S. Change, "Visual Languages: A Tutorial and Survey", IEEE Software, vol. 4, No. 1, 1987, pp. 29–39.

(List continued on next page.)

*Primary Examiner*—Tuan Q. Dam
*Assistant Examiner*—John Q. Chavis
(74) *Attorney, Agent, or Firm*—Mattingly, Stanger & Malur, P.C.

(57) ABSTRACT

A program making method includes the steps of displaying figures representative of a plurality of objects, inputting a command train which includes a plurality of processing commands each designating at least one of the objects and a processing to be executed for that object and forms a program to be made, executing each processing command so that a processing designated by that command is executed for example data of an object designated by the command each time the command is inputted, and changing the display of a figure representative of an object designated by each of at least some of the processing commands by processing figure data concerning the figure when that command has been executed. Another program making method includes displaying figures which represent a plurality of objects and a figure for program to which a program to be made is allotted, inputting a command train which includes a plurality of processing commands each instructing one of the objects to execute at least one processing and forms the program to be made, and changing the display of the figure for program in the vicinity of a point of time of the input of each processing command so that a figure representative of one object designated by that command can be discriminated.

10 Claims, 50 Drawing Sheets

U.S. PATENT DOCUMENTS

| | | | |
|---|---|---|---|
| 4,813,013 | | 3/1989 | Dunn ................................... 395/333 |
| 4,827,404 | * | 5/1989 | Barstow et al. ..................... 395/500 |
| 4,831,580 | | 5/1989 | Yamada ............................... 345/433 |
| 4,868,766 | | 9/1989 | Oosterholt ........................... 395/120 |
| 5,179,656 | | 1/1993 | Lisle .................................... 395/155 |
| 5,201,034 | | 4/1993 | Matsuura et al. ................... 395/337 |
| 5,214,756 | | 5/1993 | Franklin et al. .................... 345/348 |
| 5,287,449 | | 2/1994 | Kojima ................................ 395/348 |
| 5,293,385 | * | 3/1994 | Hary ...................................... 714/38 |
| 5,295,243 | | 3/1994 | Robertson et al. ................. 395/348 |
| 5,301,348 | * | 4/1994 | Jaaskelainen ......................... 714/46 |
| 5,317,688 | | 5/1994 | Watson et al. .......................... 717/2 |
| 5,333,256 | | 7/1994 | Green et al. ........................ 345/349 |
| 5,347,628 | | 9/1994 | Brewer et al. ...................... 395/351 |
| 5,398,313 | | 3/1995 | Kojima ................................ 709/300 |
| 5,448,739 | | 9/1995 | Jacobson ............................. 345/122 |

OTHER PUBLICATIONS

"Agents and the HP New Wave Application Program Interface", Hewlett–Packard Journal, Aug. 1989, pp. 32–37.

Yoshimoto et al, "Interactive Iconic Programming in Hi–Visual", 1986, IEEE Workshop on Visual Languages, pp. 34–41.

Myers, "The State of the Art in Visual Programming and Program Visualization", Carnegie Mellon University Computer Science Department Report CMU–CS–88–114, 1988, pp. 1–25.

H. Lieberman, "A Three–Dimensional Representation for Program Execution", IEEE, 1989, pp. 111–116.

* cited by examiner

FIG. 18A
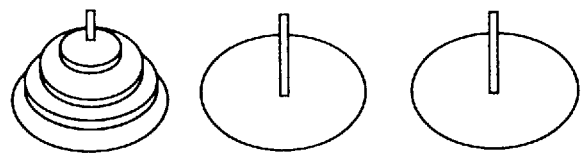
FIG. 18B (PRIOR ART)
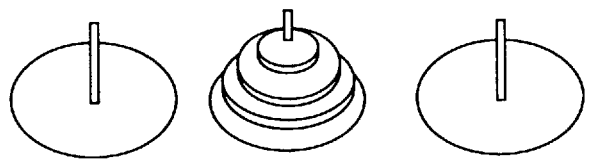
```
(DEFUN HANOI (H1 H2 H3 I J K)
    (COND ((NULL H1 "END)
          (T (HANOI (CDR H1) H3 H2 I K J)
             (PRIN2 I)
             (PRIN2 "to")
             (PRINT J)
             (HANOI H3 (CONS (CAR H1) H2) H1 KJ I)
```
FIG. 18C (PRIOR ART)
```
(HANOI [2 1] [ ] [ ] 1 2 3)
    1 to 3
    1 to 2
    3 to 1
    END
```

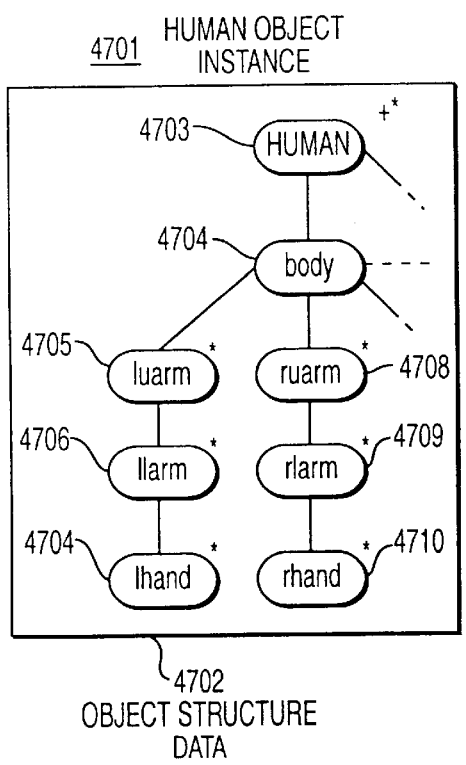
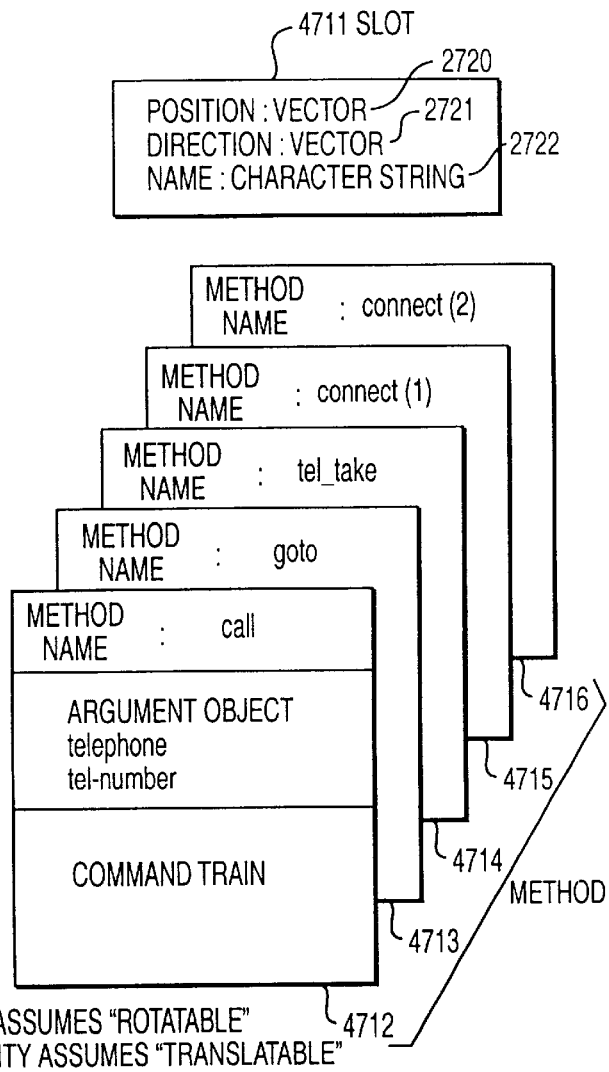
FIG. 21A
(NOTES) + : ATTRIBUTE OF ROTATABILITY ASSUMES "ROTATABLE"
\* : ATTRIBUTE OF TRANSLATABILITY ASSUMES "TRANSLATABLE"
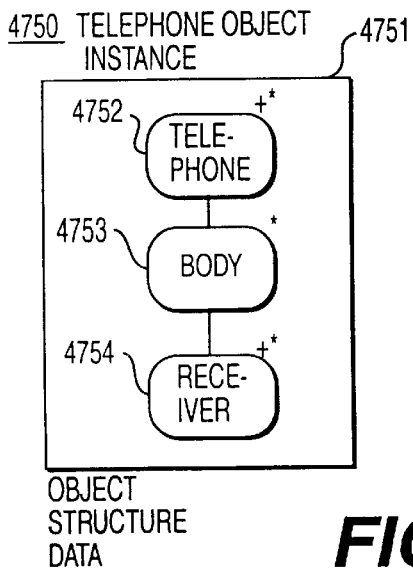
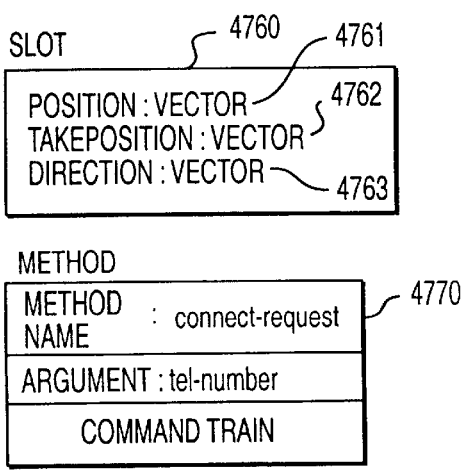
FIG. 21B

(NOTES) DATA KIND REPRESENTS ONE OF THE FOLLOWING:
- OBJECT INSTANCE
- OBJECT METHOD
- BUILT-IN INSTRUCTION COMMAND
- PROGRAM CONTROL (NOTES) EVENT KIND REPRESENTS ONE OF THE FOLLOWING:
- MOTION CONTROL
- VIEW CONTROL
- OBJECT SELECTION
- PROGRAM CONTROL
- INSTRUCTION INPUT
- OBJECT MODELING
- KEYBOARD

FIG. 26B

2304     OBJECT SELECTION EVENT GENERATION PROCESSING

SPECIFY SELECTED OBJECT WHILE REFERRING TO POSITION OF MOUSE CURSOR AND CONTENTS OF THREE-DIMENSIONAL SHAPE DATA BASE — 2801

↓

GENERATE EVENT HAVING "OBJECT SELECTION" STORED AS EVENT KIND AND CHARACTER STRING FORM OF SELECTED OBJECT STORED AS ADDITION INFORMATION — 2802

↓

ACTIVATE INPUT EVENT PROCESSING — 2803

↓

( RETURN )

FIG. 26C

2305     MOTION EVENT GENERATION PROCESSING

GENERATE EVENT HAVING "MOTION CONTROL" STORED AS EVENT KIND AND NAME OF MANIPULATED VALUATOR AND VALUE OF VALUATOR STORED AS ADDITION INFORMATION — 2901

↓

ACTIVATE INPUT EVENT PROCESSING — 2902

↓

( RETURN )

FIG. 26D

2306     VIEW EVENT GENERATION PROCESSING

GENERATE EVENT HAVING "VIEW CONTROL" STORED AS EVENT KIND AND NAME OF MANIPULATED VALUATOR AND VALUE OF VALUATOR STORED AS ADDITION INFORMATION — 3001

↓

ACTIVATE INPUT EVENT PROCESSING — 3002

↓

( RETURN )

FIG. 26E

2307 PROGRAM CONTROL EVENT GENERATION PROCESSING

GENERATE EVENT HAVING "PROGRAM CONTROL STORED AS EVENT KIND AND "execute" OR "record" STORED AS ADDITION INFORMATION IN ACCORDANCE WITH DEPRESSED BUTTON —3101

↓

ACTIVATE INPUT EVENT PROCESSING —3102

↓

( RETURN )

FIG. 26F

2308 OBJECT MODELING EVENT GENERATION PROCESSING

GENERATE EVENT HAVING "OBJECT MODELING" STORED AS EVENT KIND AND INPUT INFORMATION STORED AS ADDITION INFORMATION —3201

↓

ACTIVATE INPUT EVENT PROCESSING —3202

↓

( RETURN )

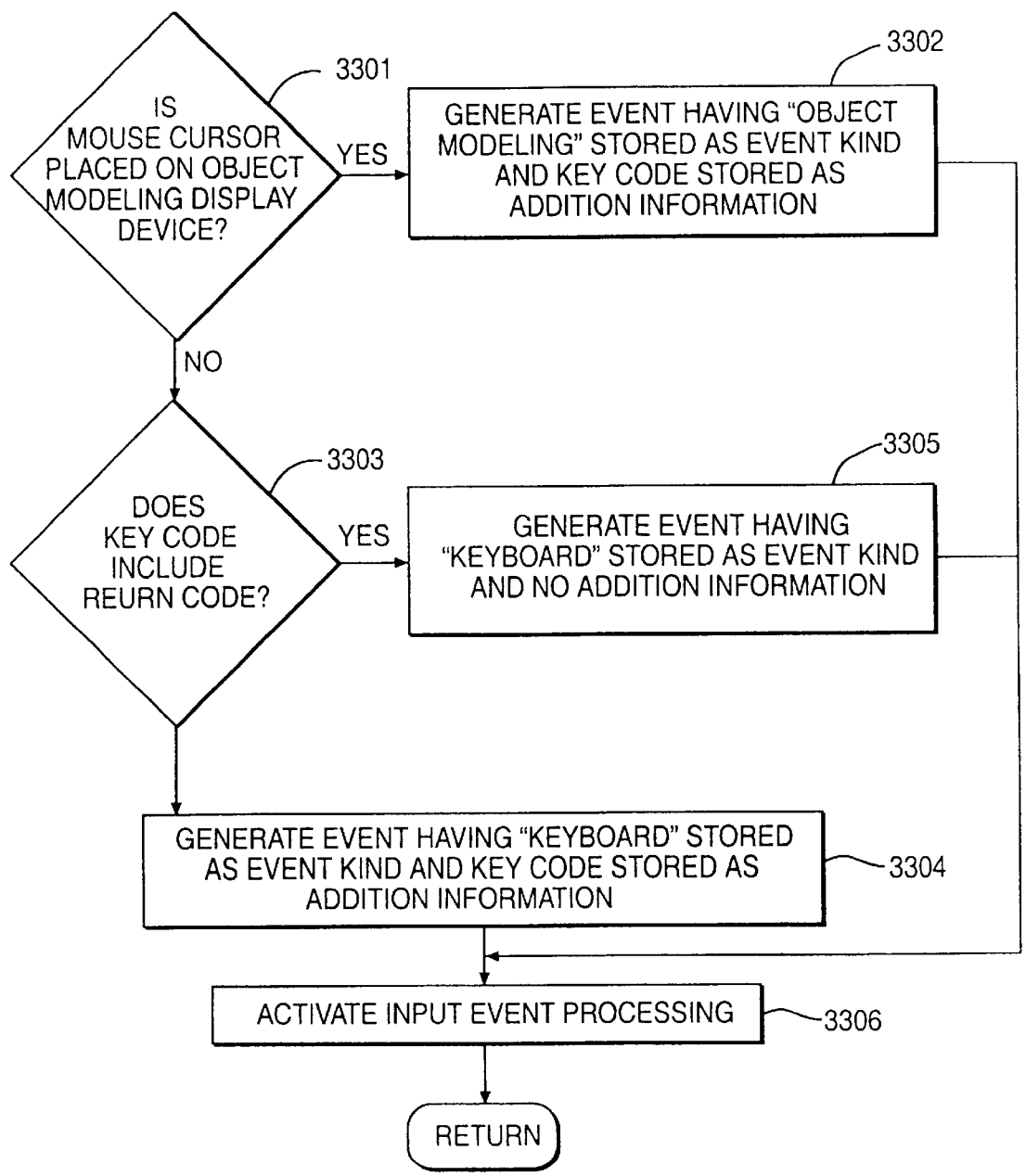

3701 COMMAND (NOTES) OBJECT TO BE PROCESSED

NAME OF INSTANCE OF OBJECT,
NAME OF ELEMENT OF INSTANCE OF OBJECT,
NAME OF SLOT OF INSTANCE OF OBJECT,
OR ABSENCE

- ARGUMENT

OBJECT INSTANCE OR ATOM
    ( WHICH MAY BE PLURAL IN NUMBER )

- INSTRUCTION CODE

NAME OF METHOD OF OBJECT INSTANCE OR
    BUILT-IN INSTRUCTION CODE

FIG. 32

2130     OBJECT SELECTION PROCESSING

ADD NULL CHARACTER TO CHARCTER STRING STORED IN ADDITION INFORMATION FIELD OF EVENT DATA AND STORE RESULTANT INTO COMMAND BUFFER IN ORDER — 4001

RETURN

FIG. 33

2131     INSTRUCTION INPUT PROCESSING

COPY CHARACTER STRING STORED IN ADDITION INFORMATION FIELD OF EVENT DATA INTO COMMAND BUFFER IN ORDER — 4101

ADD CONTENTS OF COMMAND BUFFER TO COMMAND QUEUE AT TOP OF COMMAND QUEUE STACK — 4102

CLEAR COMMAND BUFFER — 4103

RETURN

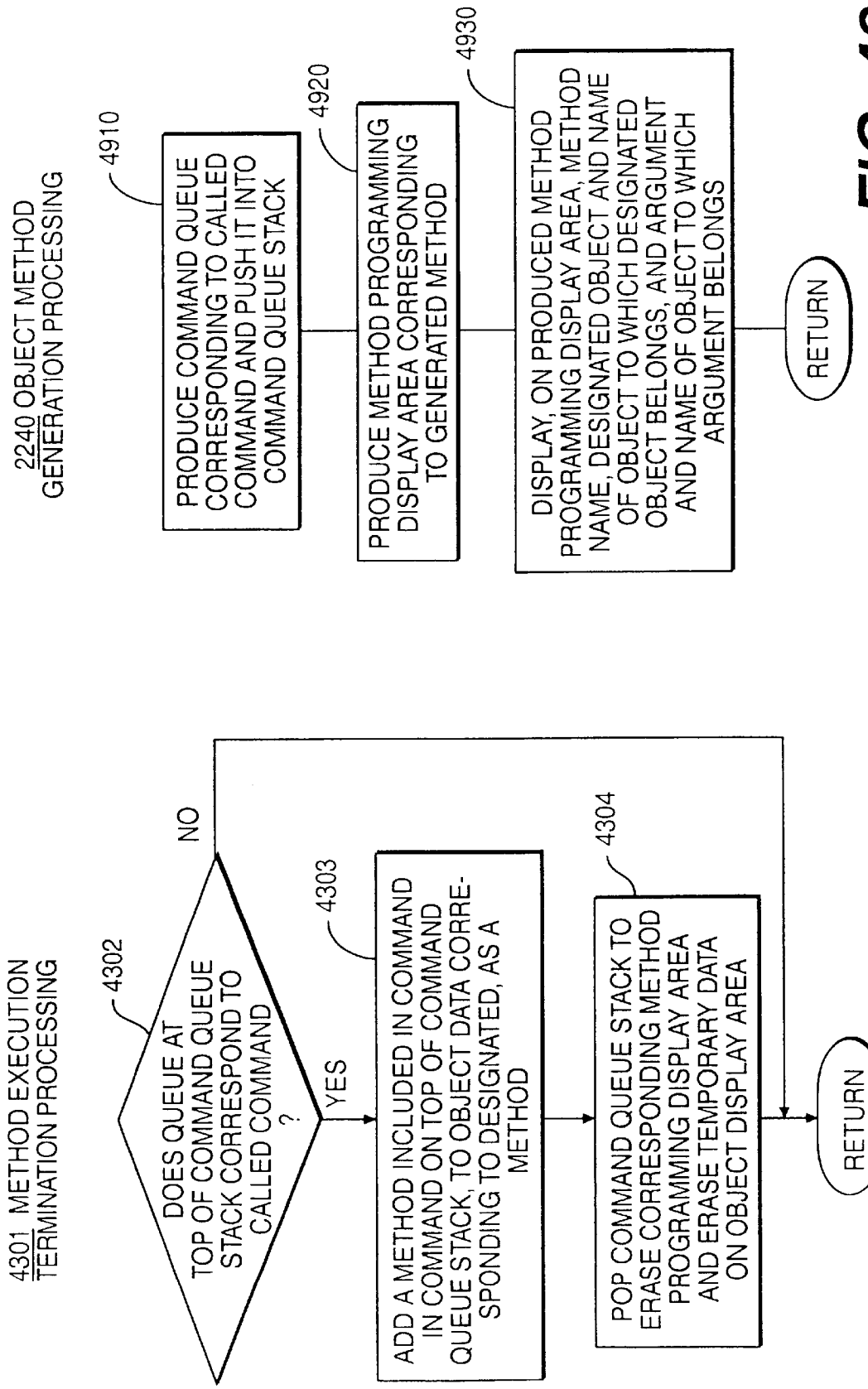

FIG. 43

BUILT IN COMMANDS 5001

| OBJECT | ARGUMENT OBJECT | METHOD NAME | FUNCTION |
|---|---|---|---|
| HUMAN | JAPANESE SYLLABARY | speak | PRODUCE VOICE OUTPUT |
| | SCALAR | walk | WALK FORWARD BY DESIGNATED DISTANCE |
| | ABSENCE | neutral | STAND ERECT |
| TELEPHONE | TEL - NUMBER | connect_request | TELEPHONE |
| TERMINAL | ABSENCE | openterminal | LOG-ON TO LARGE SIZE GENERAL PURPOSE COMPUTER |
| | date, room | getreservation | RESERVE ROOM ON DESIGNATED DAY |
| CAMERA | VECTOR 1, VECTOR 2, VECTOR 3 | camera_set | SET CAMERA TO POSITION OF VECTOR 1, DIRECTION OF VECTOR 2 AND UPWARD DIRECTION OF VECTOR 3 |
| VECTOR A | VECTOR B, SCALAR | getdistance | SUBSTITUTE DISTANCE BETWEEN A AND B FOR SCALAR |
| | VECTOR B, VECTOR C | getdirection | SUBSTITUTE DIRECTION FROM A TO B FOR C |
| ARBITRARY OBJECT A | ARBITRARY OBJECT B | link | MAKE B INTO CONSTITUENT ELEMENT OF A |
| | CONSTITUENT OBJECT B OF A | unlink | REMOVE B FROM CONSTITUENT ELEMENT OF A |
| | — | (OBJECT NAME) @create | CREATE OBJECT INSTANCE A, INPUT VOICE REPRESENTATIVE OF A AND STORE INPUTTED VOICE INTO CANDIDATE VOICE DATA BASE |

Columns: 5002, 5003, 5004, 5005

Rows: 5010–5021

METHOD FOR VISUAL PROGRAMMING WITH AID OF ANIMATION

This is a continuation application of U.S. Ser. No. 09/015,070, filed Jan. 28, 1998, which is a continuation application of U.S. Ser. No. 08/659,805, filed Jun. 7, 1996, now U.S. Pat. No. 5,774,122, which is a divisional application of U.S. Ser. No. 07/589,405, filed Sep. 28, 1990, now U.S. Pat. No. 5,566,294.

BACKGROUND OF THE INVENTION

The present invention relates to a program making method, and more particularly to a program making method suitable for programming in a computer which has a bit map display device capable of displaying graphics or figures.

Conventionally, a method of using diagrams such as flow charts have been used as a method of visualizing a program to improve the efficiency of making the program. Any flow chart facilitates the comprehension of the program by two-dimensionally illustrating a control flow such as a conditional branch or iteration loop in the program but data handled by the program has not been visualized.

On the other hand, a method of facilitating the making of a program by use of icons visually representing data handled by the program or procedures is disclosed in IEEE Software, Vol. 4, No. 1, (1987) pp. 29–39 (herein-after referred to as reference 1).

As one of such methods called visual programming, one of the present inventors has proposed, in JP-A-01-121935 (hereinafter referred to as reference 2) or the corresponding U.S. Ser. No. 266,079 filed on November, 1988, now U.S. Pat. No. 5,287,449, a method of making a program in such a manner that data concerning an object to be processed by the program is two-dimensionally displayed as an icon on a display device and the instruction of data manipulation is made to the icon. In the proposed method, instructions, including a data selection instruction for displaying data satisfying a given selection condition as an icon, and a data manipulation instruction for manipulating the selected data to display the result again as an icon, are provided, and a variety of programs can be made while observing the structure of data as an object on the display device.

As another method of improving the work efficiency of programming, a programming technique called object orientation is widely used. In this technique, an object including a set of a data structure and a procedure of manipulation thereof is defined and the programming is made by describing the behavior of such an object. A name specifying data in the data structure is called a slot, the data corresponding to the slot is called a slot value and the procedure defined for the object is called a method.

A feature of the programming technique based on object orientation lies in a restriction imposed on an object, that is, the restriction that the change of a slot value of a certain object can be made by only a method defined in the same object. Owing to this restriction, a risk of a programmer carelessly changing data is reduced and the modulization of a program can be promoted.

An object can be handled in a personified form since it possesses both data and a procedure and individual objects (called object instances) carry on their works while communicating messages with each other.

"Agents and the HP New Wave Application Program Interface", Hewlett-Packard Journal, pp. 32–37, August, 1989 (hereinafter referred to as reference 3) discloses a system in which the fixtures (such as file, printer and so forth) placed in an office environment and persons working in the office are abstracted as objects and which the objects are displayed as icons on a bit map display device to construct a pseudo in-computer office environment. In this system, an operator gives human icons representing persons work messages as commands together with icons of another object used for work. Since the work progresses while the human object serves as an object, the operator encounters a feeling that the work is requested upon a (confidential) secretary in the office.

The system according to the reference 2 facilitates the comprehension of a program by two-dimensionally visualizing the structure of data handled by the program. However, the data is restricted to numerical data such as numeric values or an array of numeric values. Though the field of application of such a program handing the numeric data is wide, there are may fields where other important problems exist. For example, when considering a program for solving a problem concerning an artificial intelligence, relatively concrete and visual data are essentially handled in many cases. Consider as a simple one of such examples the problem of Hanoi tower problem, which is often used as a teaching material of programming.

The problem of Hanoi tower is as follows. Three towers capable of carrying saucers thereon are prepared, as shown in FIG. 8A. In an initial state, a plurality of saucers are placed on only one of the three towers in the order of sizes from the larger one to the smaller one. A problem to be solved is to transfer all of the saucers from a certain tower to another tower under the condition that on a certain saucer should not be placed a saucer larger than that. In the case of this problem, objects to be operated or manipulated by a program are data having concrete images such as the saucers and the towers. In the conventional programming language based on symbol string, data such as saucers to towers is converted into abstractive symbols to make a program which solves this problem. For example, FIG. 18B shows a program for solving the Hanoi tower problem by means of a LISP language which is a programming language for artificial intelligence. FIG. 18C shows the result of execution of the program shown in FIG. 18B. In the program shown in FIG. 18B, a tower having, for example, three saucers is realized as an example of numeric data such as [3, 2, 1]. According to this method, the Hanoi tower problem can be solved by the technique of the above reference 2. However, such a program as shown in FIG. 18B is far different from images as shown in FIG. 18A and this is a factor which makes the work of programming difficult for ordinary non-specialists of a computer.

There are many programs handling artificially intelligent problems other than the Hanoi tower problem. For example, one of such programs handles visual data to determine of the shortest path on a map. The great of control programs for equipments issue operation commands to respective parts of the equipment. In such cases, objects to be handled are concrete materials such as parts, that is, visual data. In the above-mentioned references, no consideration is paid to the provision of a method of making an intelligible program in which such objects having concrete graphic or figure images in essence are handled as they are the figure images.

Also, the above references have a lack of consideration about allowing a programmer his or her understanding of the state of progression of manipulation for the objects having concrete images by visualizing the progression. Namely, in the above references, since a change in state in the course of manipulation if not displayed though the result of manipulation is displayed, there is a problem that it is hard to comprehend which of objects or which of elements of an object changes in what manner in the cause of the manipulation. For example, in the problem of Hanoi tower, the operation for transfer of a saucer causes a person to image the gradual movement of the saucer in a space. Also, an example of equipment control causes a person to image the movement (or translation) or rotation of parts with the actuation of a certain mechanism. In the above references, such visual elements or change are not demonstrated to the programmer.

In the reference 3, though an object is displayed as an icon, an image of the icon only gives an intuitive association of a function of the object. Accordingly, there is a problem that it is not possible to visually confirm the process and/or result of execution of an object method.

SUMMARY OF THE INVENTION

Accordingly, a first object of the present invention is to display a data structure in a form comprehensible to a human, thereby allowing an intuitive comprehension of a change of the data structure with the progression of a program.

However comprehensibly the change of the data structure is displayed, it is not possible to completely grasp the state of execution of the program. For example, in the case where the display of the data structure encounters no change even with a wait of a while, it is not possible to judge which of a state (1) in which the program is executing a processing having no change in data structure and a state (2) in which the program is being stopped does the present state correspond to.

Therefore, a second object of the present invention is to comprehensibly display an object of an object-oriented program in concordance with the progression of the program.

According to one aspect of the present invention, there is provided.

a program making method comprising a step of displaying a plurality of figures which represent a plurality of objects to be processed, respectively, a step of inputting a command train which includes a plurality of processing commands each designating at least one of the plurality of objects and a processing to be executed for that object and forms a program to be made, a step of executing each of the plurality of processing commands so that a processing requested by that processing command is executed for example data of an object designated by the processing command each time the processing command is inputted, and a step of changing, upon execution of each of at least some of the plurality of processing commands, the display of a figure representative of an object designated by that processing command by processing figure data concerning said figure.

According to another aspect of the present invention, there is provided a program making method comprising a step of displaying a plurality of figures which represent a plurality of objects to be processed, respectively and a figure for program to which a program to be made is allotted;

a step of inputting a command train which includes a plurality of processing commands each instructing one of a plurality of objects to execute at least one processing and forms the program to be made, and a step of changing the display of the figure for program in the vicinity of a point of time of the input of each processing command so that a figure representative of one object designated by the processing command can be discriminated.

BRIEF DESCRIPTION OF THE DRAWINGS

FIGS. 18A to 18C are views showing a diagram for explaining the Hanoi tower problem, a program for solving the Hanoi tower problem by a conventional technique, and the results when the program is executed;

FIGS. 21A to 21C are views showing various object instance information used in the second embodiment;

FIGS. 26A to 26F are flow charts concerning processings activated by the input by a mouse;

FIG. 27 is a flow chart concerning the input by a keyboard;

FIGS. 32 to 37 are flow charts of processings activated by the event dispatch processing;

FIGS. 40 to 42 are flow charts concerning a method execution termination processing called in an object method execution processing;

FIG. 43 is a table showing a group of built-in instructions used in the program shown in FIG. 20;

DESCRIPTION OF PREFERRED EMBODIMENTS

A first embodiment of the present invention will now be explained by virtue of FIGS. 1 to 17.

Figure 1:
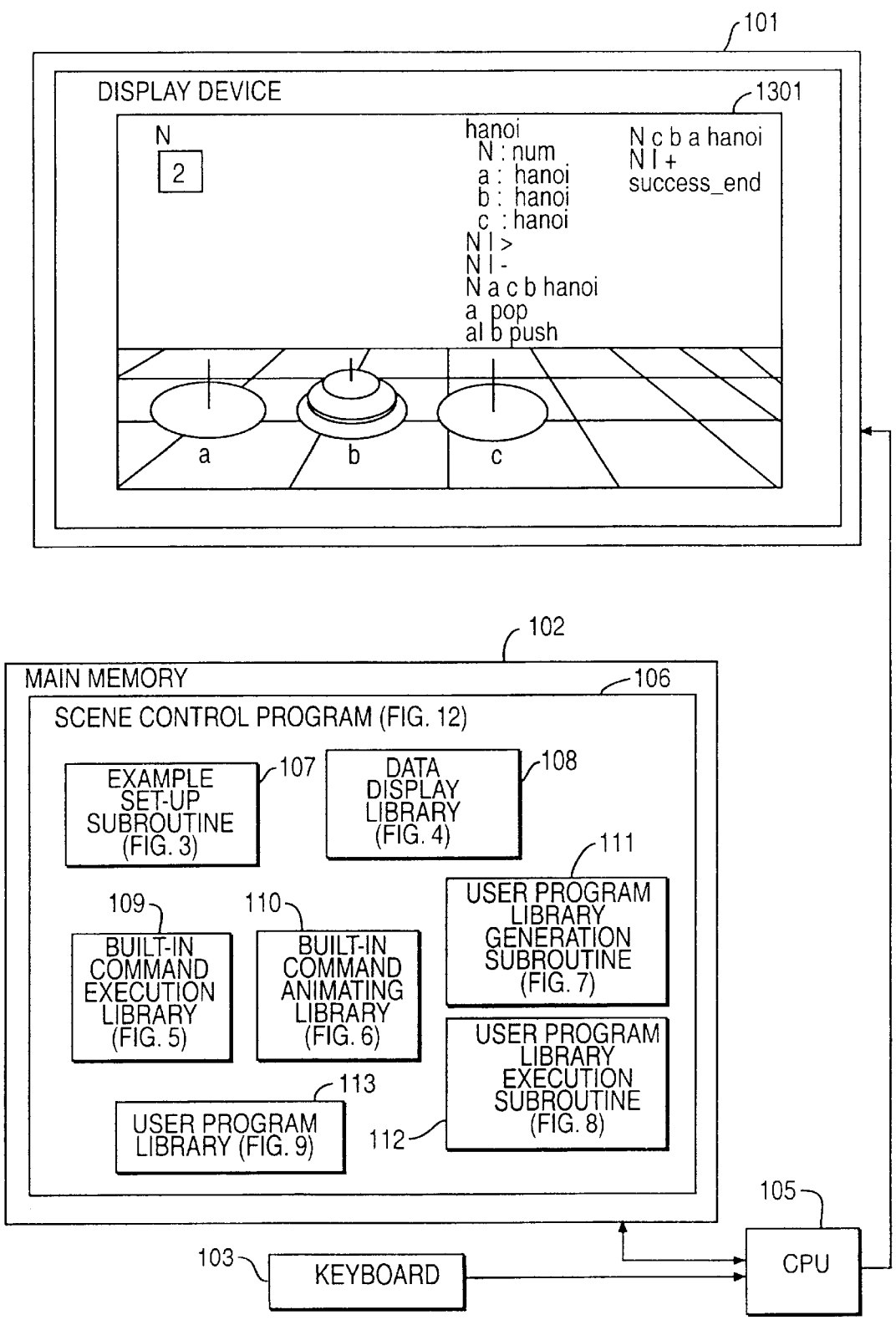
FIG. 1 is a block diagram of a system for realining a program making method according to a first embodiment of the present invention.

FIG. 1 is a block diagram showing the construction of a system according to the first embodiment of the present invention. As shown in FIG. 1, the system comprises a keyboard 103 for inputting commands, a display device 101 for visually displaying a program making process by virtue of an animation, a main memory 102 for storing a scene control program 106 which controls the program making process, and a CPU 105.

The scene control program 106 has a group of subroutines 107 to 112. An example set-up subroutine 107 is a subroutine for setting up an example from which the making of a program is to be started. A data display library 108 is a subroutine for visualizing data such as numerals and Hanoi towers to display them on the display device 101. A built-in command execution library 109 includes an assembly of plural subroutines each of which is provided for executing a built-in command which was previously prepared in the system. The built-in commands include the operation of addition/subtraction of numerals, the comparison of magnitude in large-small relation, a "push" operation and a "pop" operation in the Hanoi tower. A built-in command animating library 110 includes an assembly of plural subroutines each of which animates the state of execution of such a built-in command as mentioned above. A user program library generation subroutine 111 stores a history of the entry of the data manipulation commands by a user as a user programs into a user program library 113. A user program library execution subroutine 112 fetches and executes one of user-produced programs other than the above-mentioned built-in commands from the user program library 113 when that program is called as a command.

Now, a program making method according to the first embodiment of the present invention will be explained by use of FIGS. 12 to 27, taking by way of example the making of program for solving the Hanoi tower problem (called a Hanoi program).

The Hanoi problem is a problem which is often used as an example when a combinational problem is solved. First, three towers are prepared and a plurality of saucers having different sizes are placed on one of the three towers in the order of sizes from the larger one to the smaller one. Next, the saucers are moved or transferred to one of the remaining towers with the other of the remaining towers being used as a working tower. The Hanoi tower problem is how to determine the order to movement or transfer of the saucers under the condition that the saucers should be placed on the tower in the order of sizes from the larger one to the smaller one.

First of all, the outline of the first embodiment will be described with reference to FIG. 12 which is a flow chart showing the processing by the scene control program 106 which controls the whole of a process of making a program. A user inputs the name of a program which he or she desires to make (step 201), and inputs an example corresponding thereto (step 202). At this time, the scene control program 106 secures in the user program library 113 an area for registering the program and stores the example inputted by the user. Next, the user inputs a command (step 203) so that the scene control program 106 causes highlighting such as the change of a display position, the change of a display color, the flickering of display or the like in accordance with the command. Such a highlighting or a change in display is called "animate" or "animation".

The scene control program 106 registers the inputted command into the user-program library 113 (step 204) and examines whether or not the command is a built-in command (step 205). When the inputted command is a built-in command, this command is executed (step 206) and is animated (step 207). On the other hand, when the inputted command is not a built-in command or it is a user program, step 208 is carried out. Namely, the search of the user program library 113 for the corresponding program is made and a train of commands in the searched program are executed. In the case where a failure occurs during the execution of the command train, the user program library 113 is searched for another corresponding program and a train of commands in the searched program are executed. If the other corresponding program is not present, information of failure is given. In the case where the execution of the command train results in a success, information of the success is given.

Next, the examination is made of whether the execution of the user program is the success or the failure (step 250). In the case of the failure, the name of the program being executed is employed as a program name and the current data is employed as example data (step 251). A program save area is produced in the user program library 113, and the name of the example data itself and the type name of the example data are registered into the program save area and are displayed in a scene to describe a program having the program name (step 252). A program is made by repeating the above processing until an end is indicated by the user. In the present embodiment, a program for the Hanoi tower problem is first made with respect to an example in which the number of saucers is 1 (one) and the made program is thereafter executed for an example in which the number of saucers is 2 (two). As a result, a failure occurs during the execution of a user program and the program for the Hanoi tower problem is described taking the case of the two saucers as an example.

Thus, the present embodiment has a feature that since the movement of the saucers on the Hanoi tower is animated, the status of program execution is easily comprehensible and hence the programming can be made with great reality and a feature that the programming can be made in such a manner than an incomplete portion is described at the time of need, as shown by the above-mentioned example in which a program is made with respect to the case of one saucer and the case of two saucers is described, as required. Detailed description will now be made.

A. Generation of Program for Processing of Example Data (1) Read-in of Program Name (Step 201)

Figure 2:
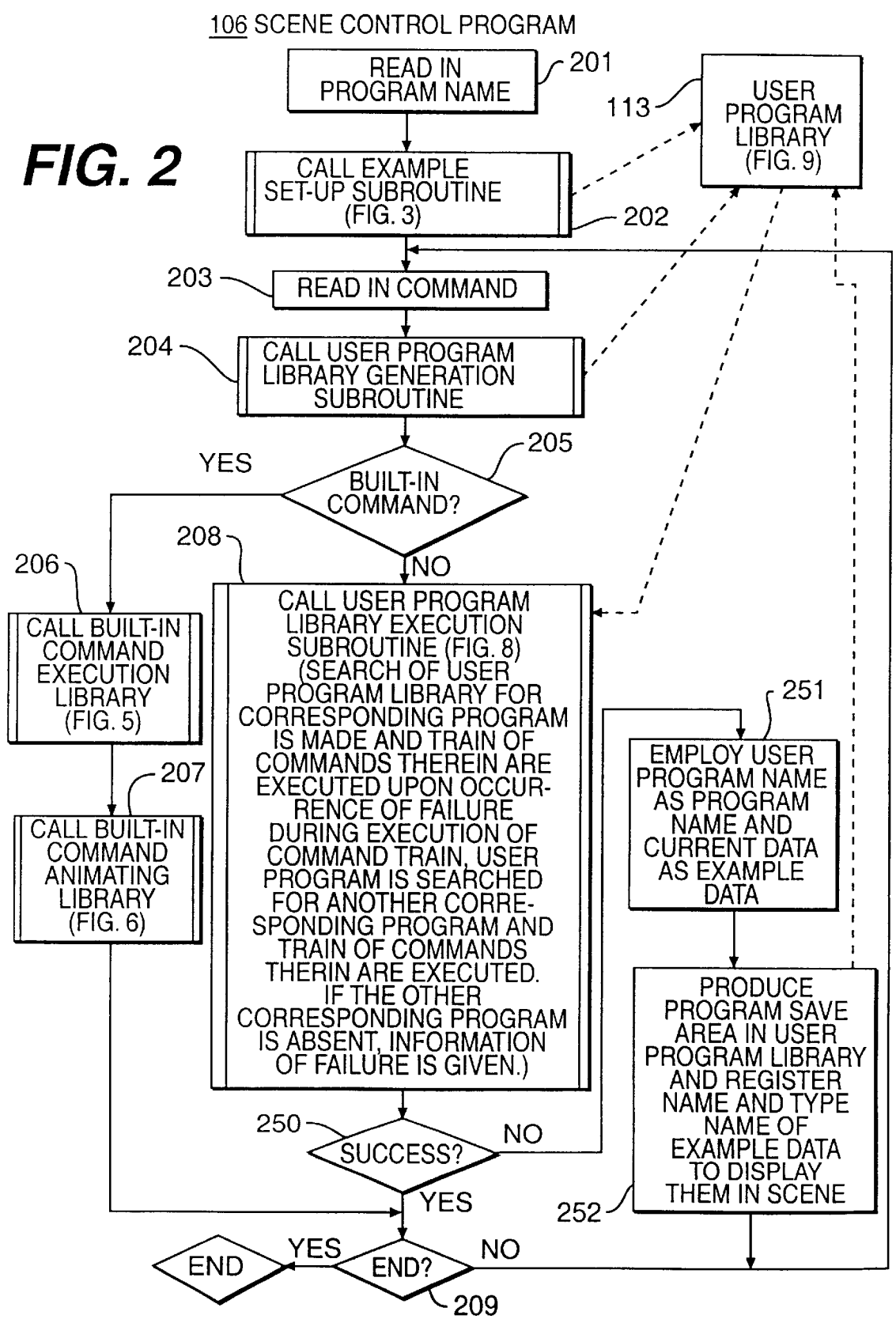
FIG. 2 is a flow chart showing the operation of a scene control program in the system shown in FIG. 1.

As shown in FIG. 2, when the scene control program 106 is started, the desired name of a program to be made which is inputted from the keyboard 103 by the user, i.e., the name "hanoi" in the shown example is first read in (step 201).

(2) Example Step-up Subroutine (Step 202)

Figure 3:
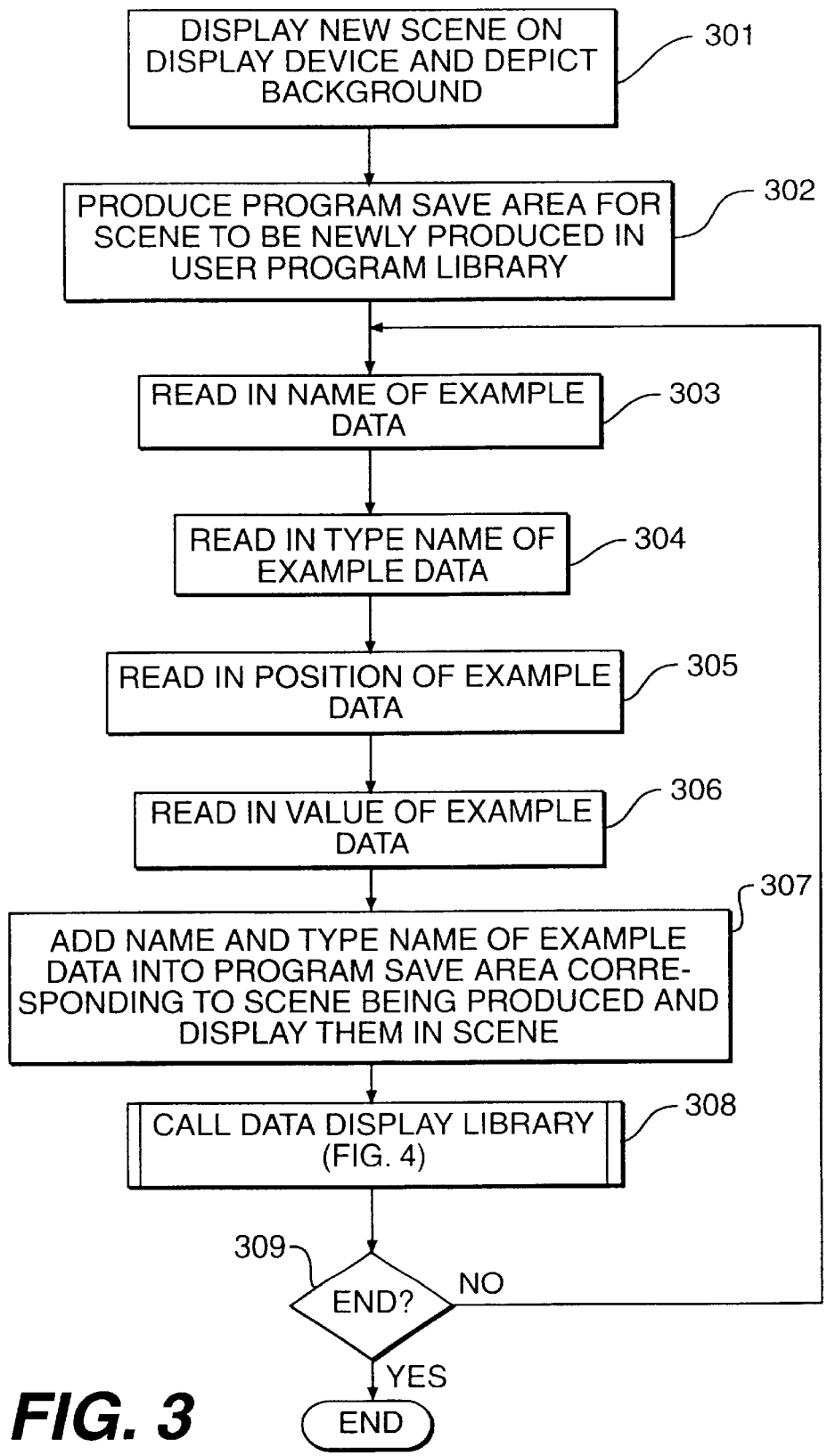
FIG. 3 is a flow chart showing the operation of an example set-up subroutine.

Next, the example set-up routine 107 is called (step 202). FIG. 3 is a flow chart showing the operation of the subroutine 107.

(2a) Initial Processing

As shown in FIG. 3, when the subroutine 107 is started, a new scene 1001 (see FIGS. 10 to 12) is displayed on the display device 101 and a floor having a chequered pattern is depicted as the background (step 301). Next, a program save area 933 (see FIG. 9) corresponding to the first scene 1001 of the Hanoi program is produced in the user program library 113 and scene list 935 is added (step 302).

(2b) Setting-up of Example Data

Next, the flow enters an iteration loop (303–309) in which example data in the scene is set up. In the iteration loop, the input of the name of the example data by the user from the keyboard 103 is first read (step 303). Then, a name indicative of the type of the example data such as "num" in the case of a number or "hanoi" in the case of the Hanoi tower is inputted and read from the keyboard 103 (step 304). Further, the position of the data in an XY coordinate system having the left and lower corner of the scene as its origin is inputted from the keyboard 103. Information of the position of the data is read (step 305). Finally, the value of the data such as a numeric value in the case of a number or the number of saucers mounted and the width of each saucer in the X direction in the case of the Hanoi tower is inputted and read from the keyboard 103 (step 306).

(2c) Storage and Display of Inputs

The read inputs are stored into the program save area 933 on one hand and are displayed as a text in the scene 1001 (see FIG. 20) on the other hand (step 307). For example, if a number N as the first example data with the value of 1 is set up by the user at the left and upper portion in the scene, the name (N) and the type name (num) of the example data are stored into entires 903 and 904 of the program 933 (see FIG. 9) and "N: num" is displayed as a text 1002 in the scene 1001 (see FIG. 10).

2d) Display of Example Data as Icon

The example step-up subroutine 107 thereafter requests to send information related to the inputted example data, that is, the name, type name, position and value to the data display library 108 (step 308) and to visualize the example data on the display device 101.

Figure 4:
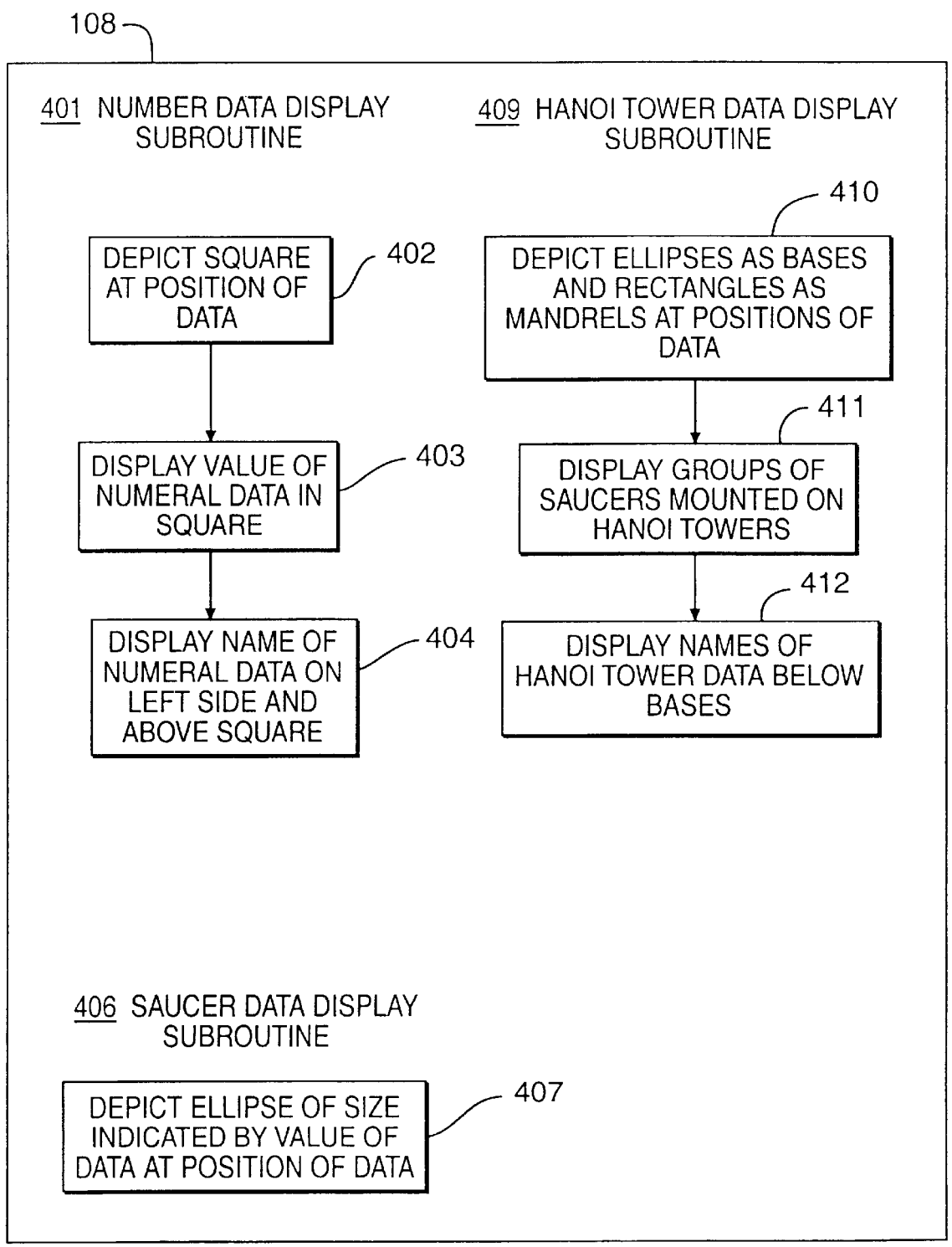
FIG. 4 is a group of flow charts showing the operations of a group of subroutines in a data display library.

FIG. 4 shows the contents of the data display library 108. As shown in FIG. 4, the library 108 is composed of an assembly of plural subroutines. In FIG. 4, the operation of each subroutine is shown by a flow chart. In the case where the display of the number N (the example value is "1") is requested from step 308 (FIG. 3) of the example set-up subroutine 107, as has been mentioned above, a number data display subroutine 401 is selected from the data display library 108 and is executed. The number data display subroutine 401 first depicts a square icon at a designated position of the scene 1001 (step 402), thereafter displays the example value "1" in the square (step 403) and finally displays the data name "N" on the left side of and above the square (step 404). As a result, the number N is visualized as a display 1003 is the scene 1001. Thereby, the number data display subroutine 401 is terminated.

(2e) Setting-up of Other Example Data

After the setting-up of one example data (the number N in the above example) has been completed, the example set-up subroutine 107 inquires of the user about whether or not example data to be set up still remains (step 309 in FIG. 3). In the case where the user inputs "Y" (indicative of an end) from the keyboard 103, the example set-up subroutine 107 is terminated (step 301).

2f) In the case where the user inputs "N" (indicative of incompletion), the setting-up of example data is repeated for the example data (steps 303 to 308). In the programming of the Hanoi tower problem, three Hanoi towers are further set up as example data. The setting-up of example data concerning each Hanoi tower is also made in a manner similar to that in the case of the number. Namely, the example data concerning the three Hanoi towers are stored into the entries 905 to 910 of the user program save area 933 on one hand and are displayed as a text 1007 in the scene 1001 on the other hand, and the three Hanoi towers (the names of which are assumed as being a, b and c in the order from the left) are visualized as displays 1004, 1005 and 1006 in the scene 1001. Since a method of displaying the Hanoi tower (the type name of which is "hanoi") is considerably different from the method of displaying the number (the type name of which is "num"), explanation will now be made of a processing performed in the case where a request of the display of data concerning the Hanoi tower is made to the data display library 108 shown in FIG. 4.

A Hanoi tower data display subroutine 409 first depicts ellipses as based and rectangles as mandrels at designated positions (step 410). Next, in accordance with information given from the user concerning the number of saucers and the sizes thereof, the saucers are displayed on the bases while being sequentially shifted from the bottom (step 411).

The display of the saucers is carried out by a saucer data display subroutine 406. The subroutine 406 depicts as a designated position an ellipse having a width which is equal to the size inputted from the keyboard 103 by the user upon example set-up (step 407). Thereby, the saucer data display subroutine is terminated.

After the display of all of the saucers has been completed, the Hanoi tower data display subroutine 409 displays the names of the Hanoi towers below the bases (step 412). Thereby, the subroutine 409 is terminated.

Figure 10:
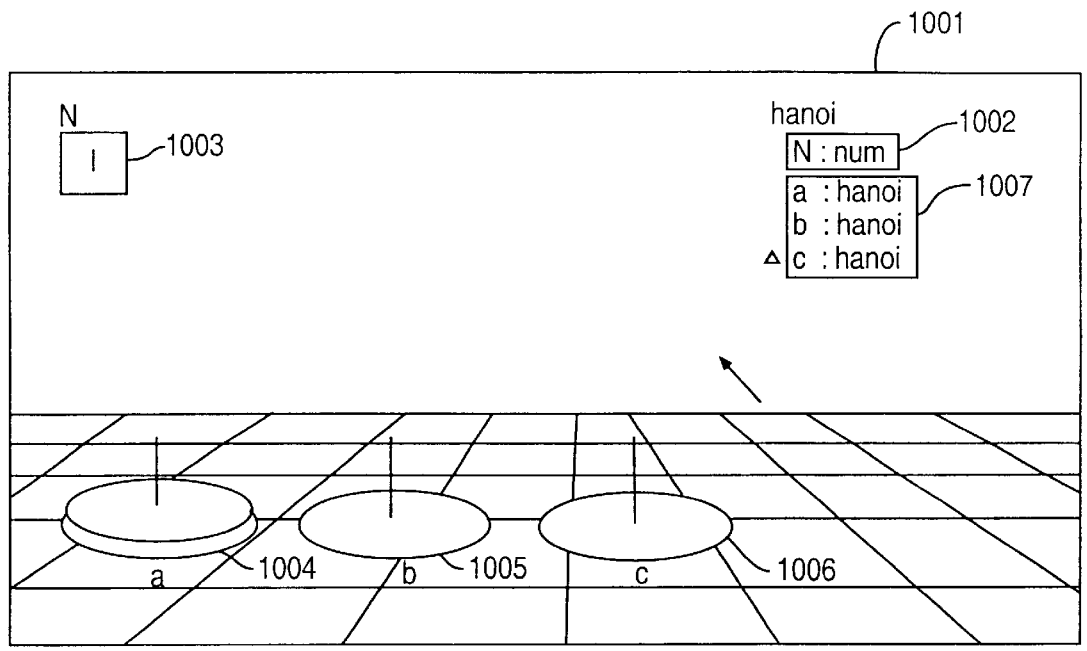
FIGS. 10 to 12 are views showing different display screens in a process of the making of a program for solving the Hanoi tower problem when the number of saucers to be moved is 1.

In the case of the Hanoi tower program, the setting-up of example in the scene 1001 is completed by the above-mentioned processing. The display contents of the scene 1001 are shown in FIG. 10.

(3) Input of Command Train

The scene 1001 shows an example of the Hanoi tower problem in which the number of saucers is only one. In the present embodiment, a general program can be obtained by solving the problem by virtue of specific example.

In the following, the operation of the scene control program 106 shown in FIG. 2 after example set-up (or in and after step 203) will be explained taking by way of example the case where one saucer 1003 is transferred from a to b, i.e., the case where the problem is solved by performing data manipulation on the scene 1001.

After the execution of the example set-up subroutine 107 has been completed in the manner mentioned above, the scene control program 106 enters a loop (steps 203 to 252) in which the operation of registering a command inputted from the keyboard 103 by the user, into the user program library 113 and executing the command is repeated, as shown in FIG. 2.

Figure 11:
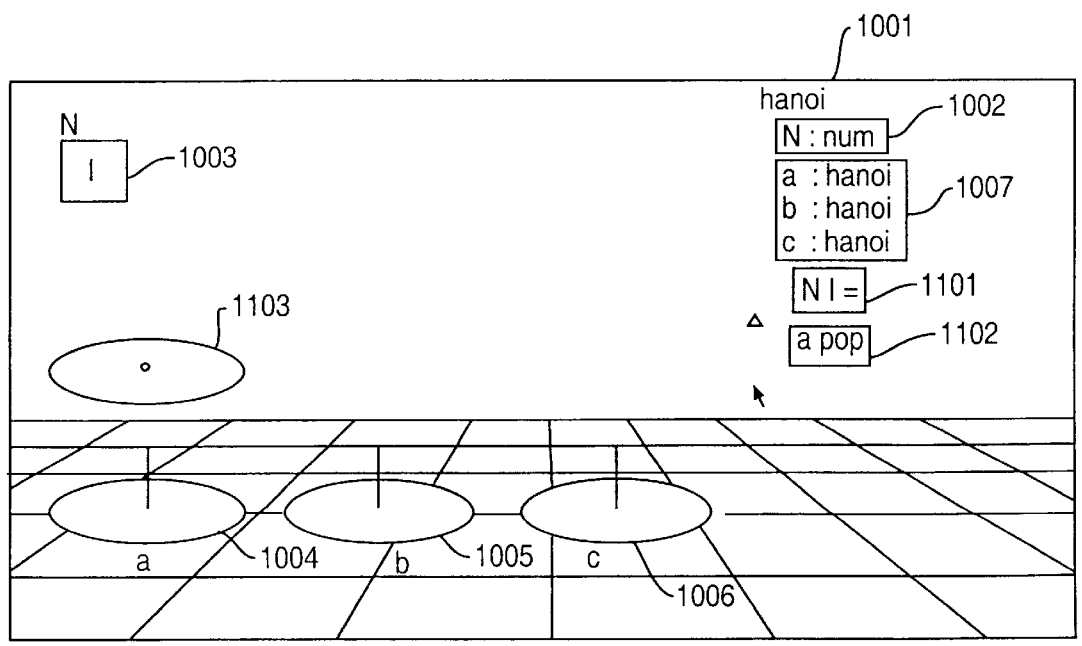

The command inputted by the user has a format in which arguments of the command are arranged with partition blanks interposed therebetween and a command name is lastly designated, as shown by 1101 or 1102 of the scene 1001 in FIG. 11. For example, a coincidence judgement command "N 1=" is for instructing the examination of whether or not a number N is equal to a constant 1.

(3a) Read-in, Storage and Display of Command

Figure 7:
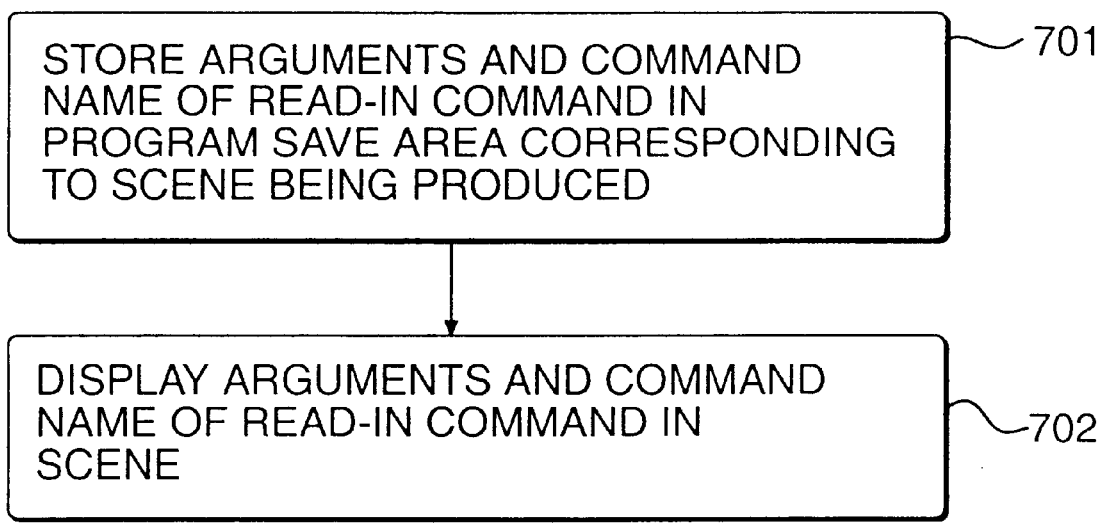
FIG. 7 is a flow chart showing the operation of a user program library generation subroutine.

Returning to FIG. 2, when a command is read in (Step 203), the scene control program 106 calls the user program library generation subroutine 111. FIG. 7 shows the operation of the subroutine 111. As shown in FIG. 7, the subroutine 111 stores the read command into the program save area 933 (step 701) and thereafter displays the command as a text in the scene 1001 (step 702). Thereby, the subroutine 111 is terminated.

For example, when the user inputs a coincidence judgement command "N 1=" from the keyboard 103, the command is stored into an entry of the program save area 933 of the user program library 113 corresponding to the scene 1001 and is also displayed as a text 1101 in the scene 1001, as shown in FIG. 11. The reason why the command inputted by the user is thus displayed in the scene as it is, is that it is contemplated to make it possible for the user to easily confirm what program is being generated.

(3b) Execution of Command (Case of Built-in Command)

Returning to FIG. 2, the scene control program 1066 next examines whether or not the inputted command 1101 is a built-in command (step 205) and calls the built-in command execution library 109 if the inputted command is a built-in command (step 206) and the user program library execution subroutine 112 if the inputted command is not a built-in command (step 208). In the case where the inputted command is the above-mentioned coincidence judgement command 1101, the library 109 is called since that command is a built-in command (step 206).

Figure 5:
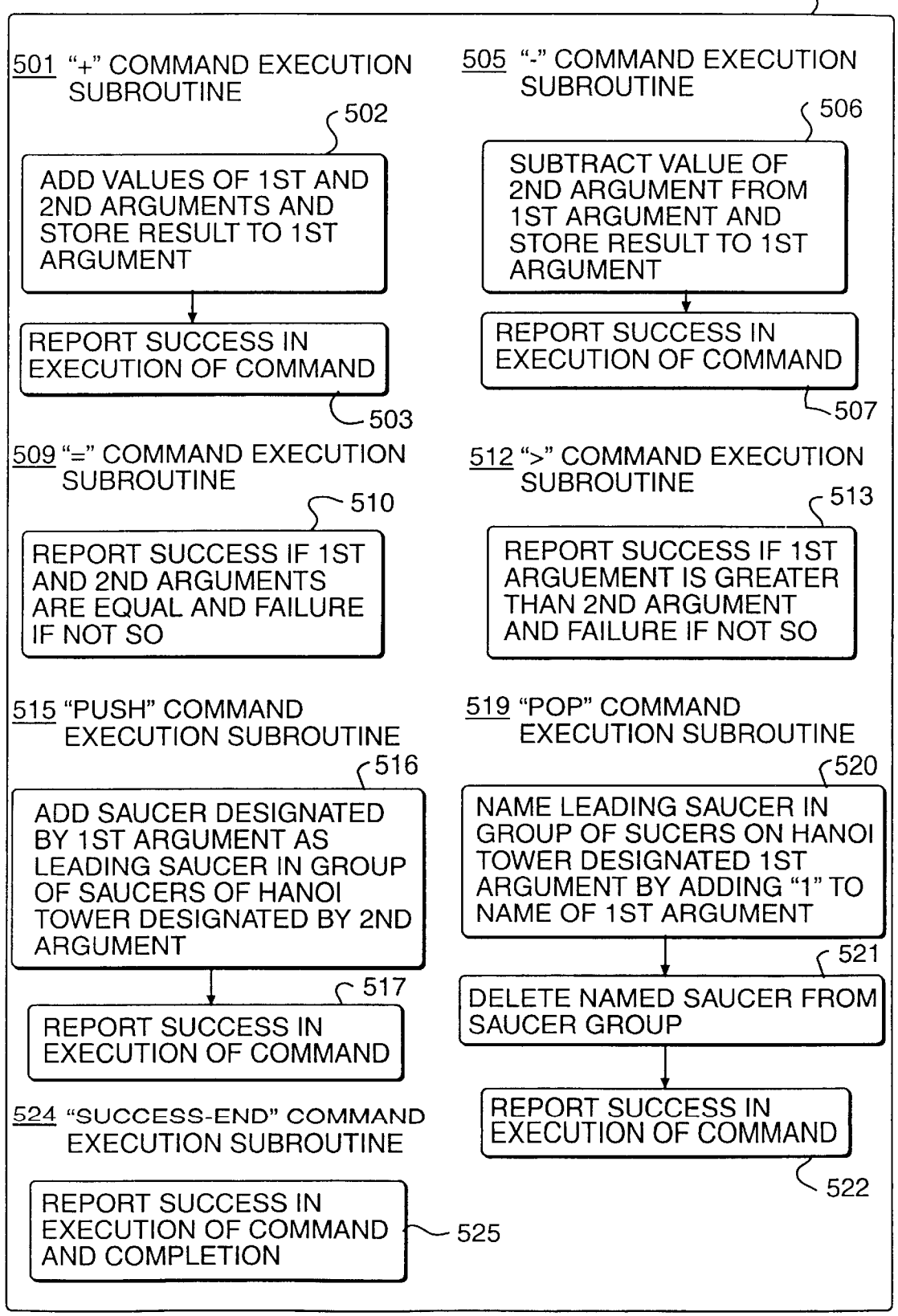
FIG. 5 is a group of flow charts showing the operations of a group of subroutines in a built-in command execution library.

The library 109 is an assembly of subroutines to execute respective commands, as shown in FIG. 5. In the case of the coincidence judgement command "N 1=", a "=" command execution subroutine 509 is selected and called. The subroutine 509 compares N which is the first argument with 1 which is the second argument. If the first and second arguments are equal to each other, a success is reported and if not so, a failure is reported (step 510). In the present example, since the value of the first argument N is set to be "1" upon example set-up, i.e., since the first and second arguments are equal to each other, a success is reported and thereby the subroutine 509 is terminated.

(3c) Animating of Built-in Command

In the case of a built-in command, the scene control program 106 next calls the built-in command animating library 110 to animate the state of execution of the command on the scene for visualization for the user (step 207).

Figure 6:
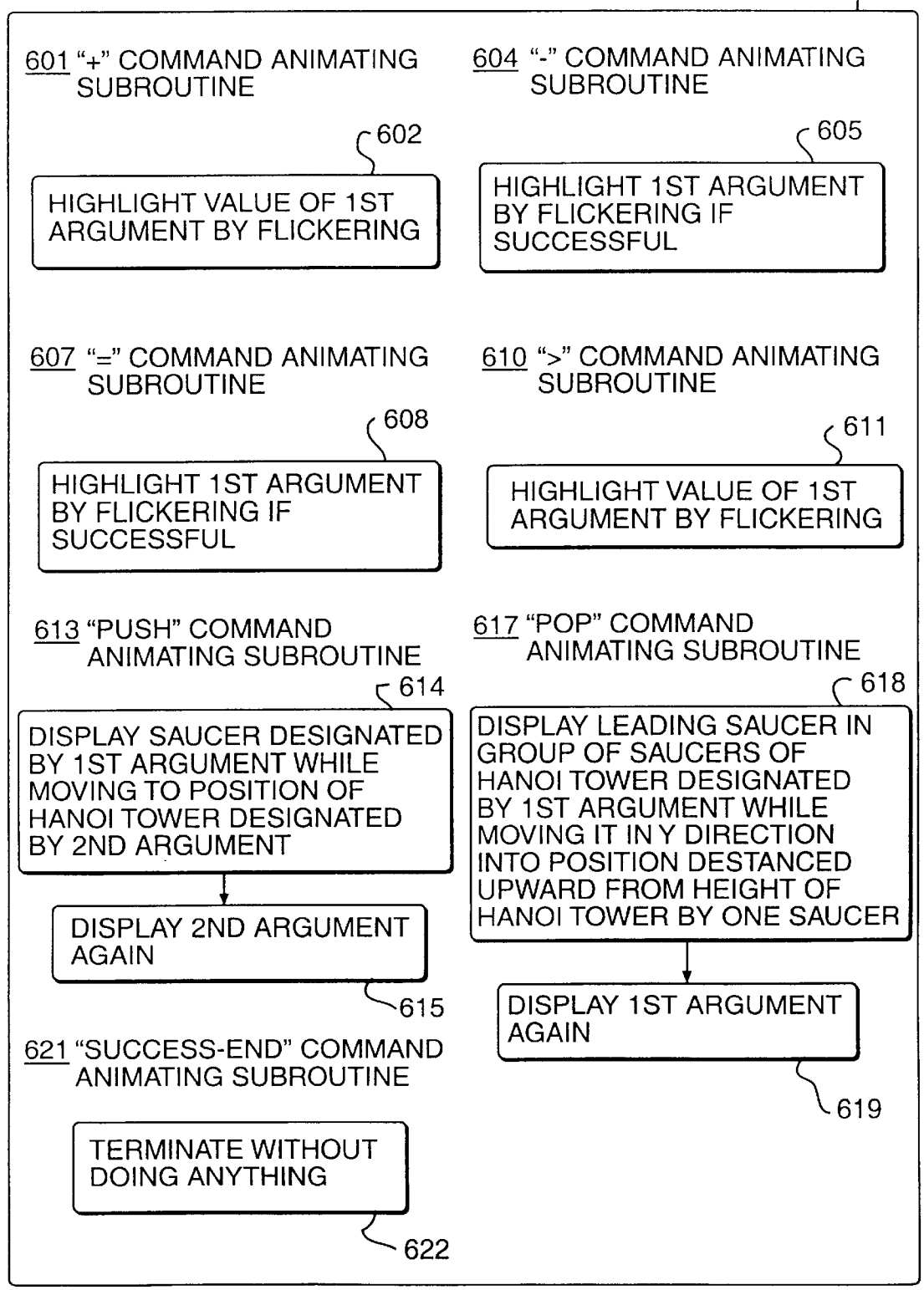
FIG. 6 is a group of flow charts showing the operations of a group of subroutines in a built-in command animating library.

FIG. 6 shows the contents of the built-in command animating library 110. The library 110, too, is an assembly of subroutines corresponding to respective commands. In the case of the coincidence judgement command "N 1=", a "=" command animating subroutine 607 is selected and executed. As shown in FIG. 6, the subroutine 607 flickers a displayed numeral for highlighting or emphasis only when a success is reported as the result of execution by the built-in command execution library 109 (step 608). In the case of the coincidence judgement command "N 1=", since the execution results in a success, the display 1003 is flickered, thereby visually informing the user that the result of comparison gives an equality.

After the animating has been completed, the examination is made of whether or not all of the command inputs by the user have been completed (step 209). If completed, the generation of a scene is terminated (step 210). If not completed, a processing from step 203 for read-in of the next command downward is repeated. The examination of whether or not all of the command inputs have been completed is made by judging whether or not the user inputs from the keyboard 103 a "success-end" command which will be mentioned in later. Since the command 1101 is not the "success-end" command, the scene control program 106 returns to step 203 for read-in of the next command.

(3d) Execution and Animating of Succeeding Commands (3d-1) in the case of the scene 1001 where only one saucer is moved, it is required to take out a saucer from the Hanoi tower 1004 and thereafter to place it on the Hanoi tower 1005. For that purpose, the user inputs a pop command "a pop" as the next command. Like the coincidence judgement command examining whether or not a number N indicative of the number of saucers to be moved is equal to 1, the pop command "a pop" is stored into an entry 912 of the program save area 933 and is also displayed as a text 1102 in the scene 1001 (step 204). Since the "pop" command is a built-in command, a "pop" command execution subroutine 519 (see FIG. 5) is called and executed (step 206).

As shown in FIG. 5, when the "pop" command execution subroutine 519 is called, the leading one of saucers mounted on the Hanoi tower a which is the first argument of the command 1102 is named as a1 to be identifiable thereafter (step 520) and the saucer a1 is then deleted from Hanoi tower data a (step 521). There-after, a success in the execution of the command is reported (step 522), thereby terminating the subroutine 519.

Next, the scene control program 106 animates the execution of the "pop" command, like the case of the coincidence judgement command 1101 (step 207). As shown in FIG. 6, when a "pop" command animating subroutine 617 is called, the leading saucer a1 of the Hanoi tower designated by the first argument is animated by gradually moving it in a Y direction of the scene 1001 to a position which is distanced upward from the length of the mandrel of the Hanoi tower a by one saucer (a1) (step 618). Thereafter, the Hanoi tower a which is the first argument is displayed again (step 619), thereby terminating the subroutine 617. In this re-display, since the saucer is deleted from the Hanoi tower a, the scene 1001 shows a display state shown in FIG. 11 upon completion of the animating of the "pop" command 1102.

Since the "pop" command 1102 is not an end command (step 209), the scene control program 106 thereafter reads in the next command (step 203).

(3d-2) Since the scene 1001 is in a state in which the saucer is taken out from the hanoi tower a, the programming in the example in which the number of saucers to be moved is 1 (one) is completed by placing the saucer a1 on the Hanoi tower b. Namely, the user inputs from the keyboard 103 a push command "a1 b push" which instructs to place the saucer a1 on the Hanoi tower b. This command, too, is added as an entry 913 into the program save area 933 and is also displayed as a text 1201 (see FIG. 12) in the scene 1001 (step 204). Since the command 1201 is a built-in command, (step 205), it is executed by a "push" command execution subroutine 515 in the built-in command execution library 109 (step 206).

As shown in FIG. 5, the subroutine 515 adds the saucer a1 designated by the first argument as the leading saucer of the Hanoi tower b designated by the second argument (step 516) and reports a success in execution of the command (step 517) thereby, the command 515 is terminated.

Next, the scene control program 106 calls a "push" command animating subroutine 613 to the built-in command animating library 110 in order to animate the command 1201 (step 207). As shown in FIG. 6, the subroutine 613 animates the "push" operation by displaying the saucer a1 which is the first argument of the command 1201 while gradually moving the saucer a1 to a position of the Hanoi tower b which is the second argument (step 614). Then, the subroutine 613 displays again in the scene 1001 the Hanoi tower b which is the second argument (step 615). Thereby, the subroutine 613 is terminated. In this re-display, since the saucer is added to the Hanoi tower b, the Hanoi tower b upon completion of the animating of the command 1201 takes a state shown as a display 1105 in FIG. 12.

(3d-3) Since the movement of the saucer has been completed and hence the programming of the example in which the number of saucers to be moved is one is completed, the user inputs a "success-end" command indicative of an end from the keyboard 103.

Figure 12:
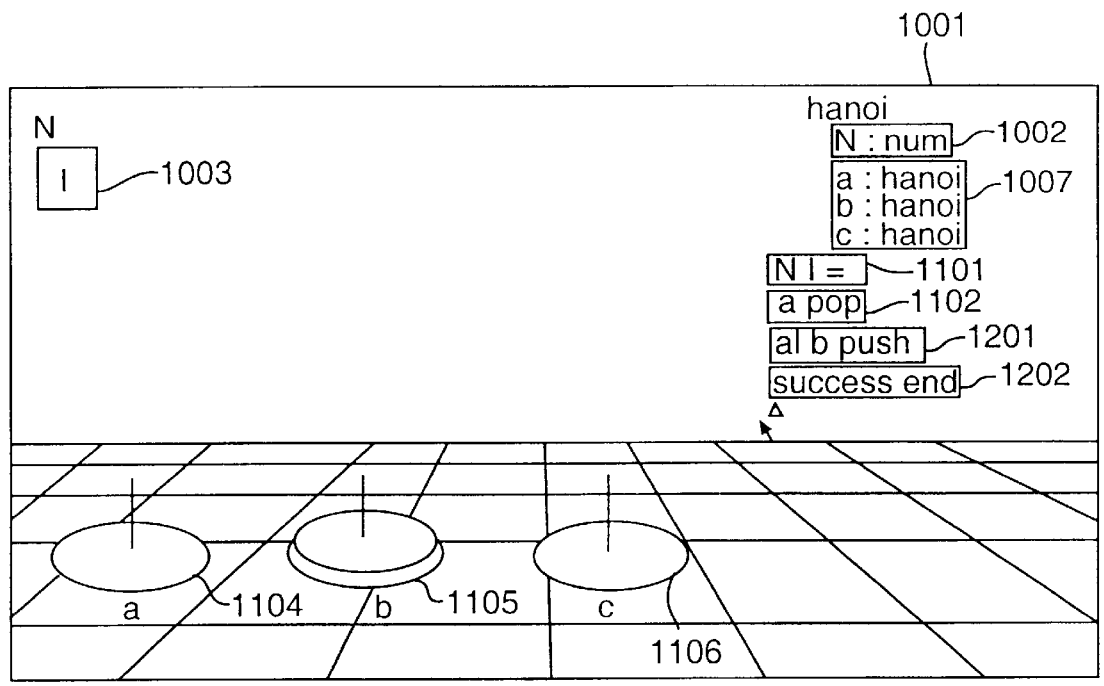

Like the other commands, the "success-end" command, too, is stored as an entry 914 into the program save area 933 for the scene 1001 and is also displayed as a text 1202 in the scene 1001, as shown in FIG. 12. As shown in FIG. 5, this command 1202 is executed by a "success-end" command execution subroutine 524, and the execution of the command immediately results in a success so that the completion of generation of a scene is reported (step 525). Also, as shown in FIG. 6, a "success-end" command animating subroutine 621 is immediately terminated without doing anything (step 622).

When the report of the end by the command 1202 is detected (step 209), the scene control program 106 is terminated.

Figure 9:
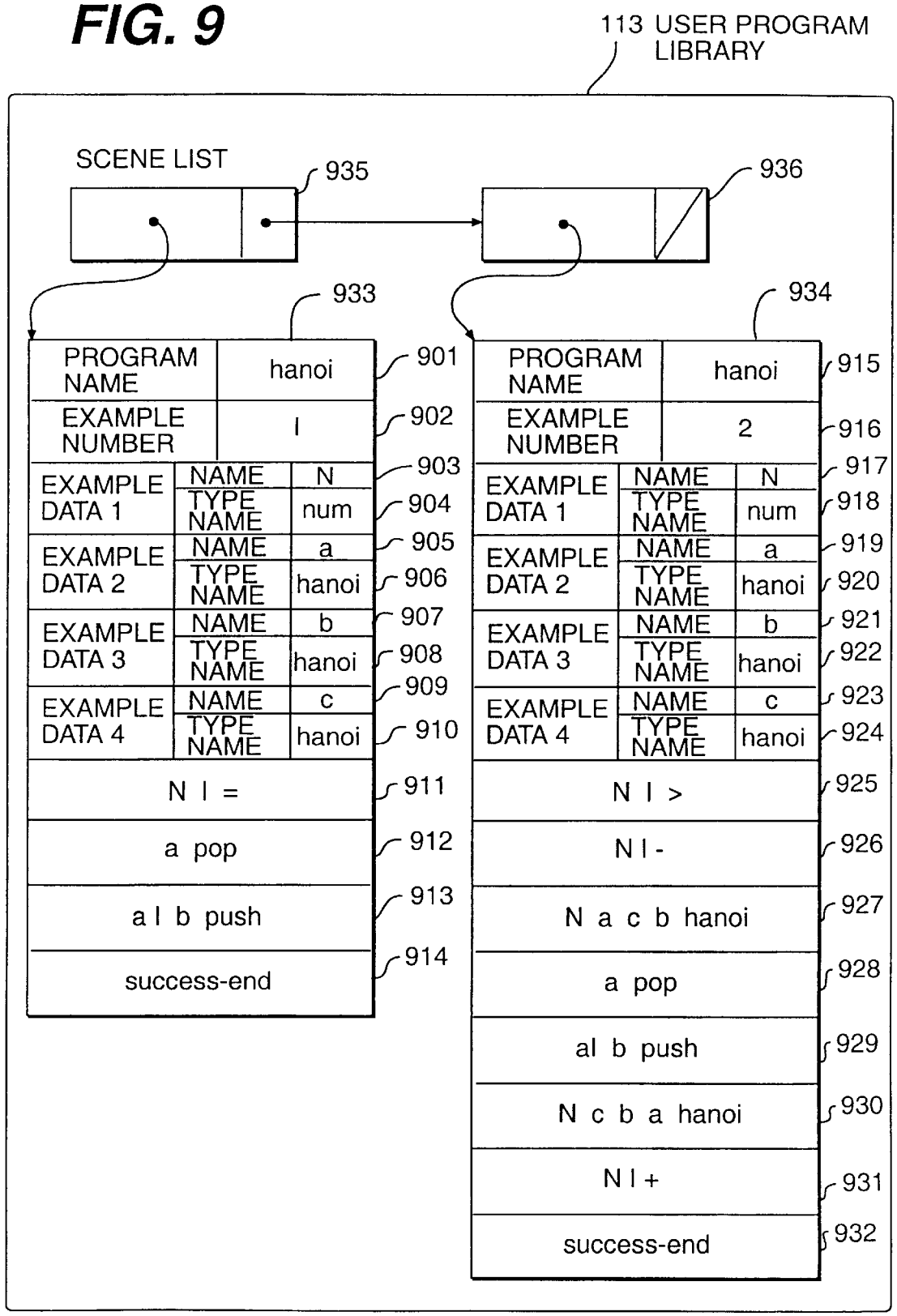
FIG. 9 is a view showing the contents of a user program library.

By the above, the program for solving the Hanoi tower problem on the scene 1001 in the case where the number of saucers to be moved is one, has been completed at the program save area (see FIG. 9).

As has been mentioned in the foregoing, in the program making method of the present embodiment, a problem as an object to be solved is visualized by a concrete graphic image similar to the actual form and each step for solution of the problem is animated. Therefore, there is a feature that the program can be made with great reality.

B. Making of Program Processing Different Example Data

As has already been mentioned, the general solution of the Hanoi tower problem, i.e., the making of a program for transfer of a group of scaucers arbitrary in number from a certain tower to another tower according to the method of the present embodiment can be made by setting up an example of a plurality of saucers, executing the previously made Hanoi tower program for that example, and adding a program in accordance with the execution. Therefore, in the present embodiment, a program is made by use of an example of two saucers. Now, explanation will be made of the process of producing a scene 1301 in the example in which the number of saucers to be moved is 2 (two) and the operation of the scene control program 106.

(1) Setting-up of Example Data

Figure 8:
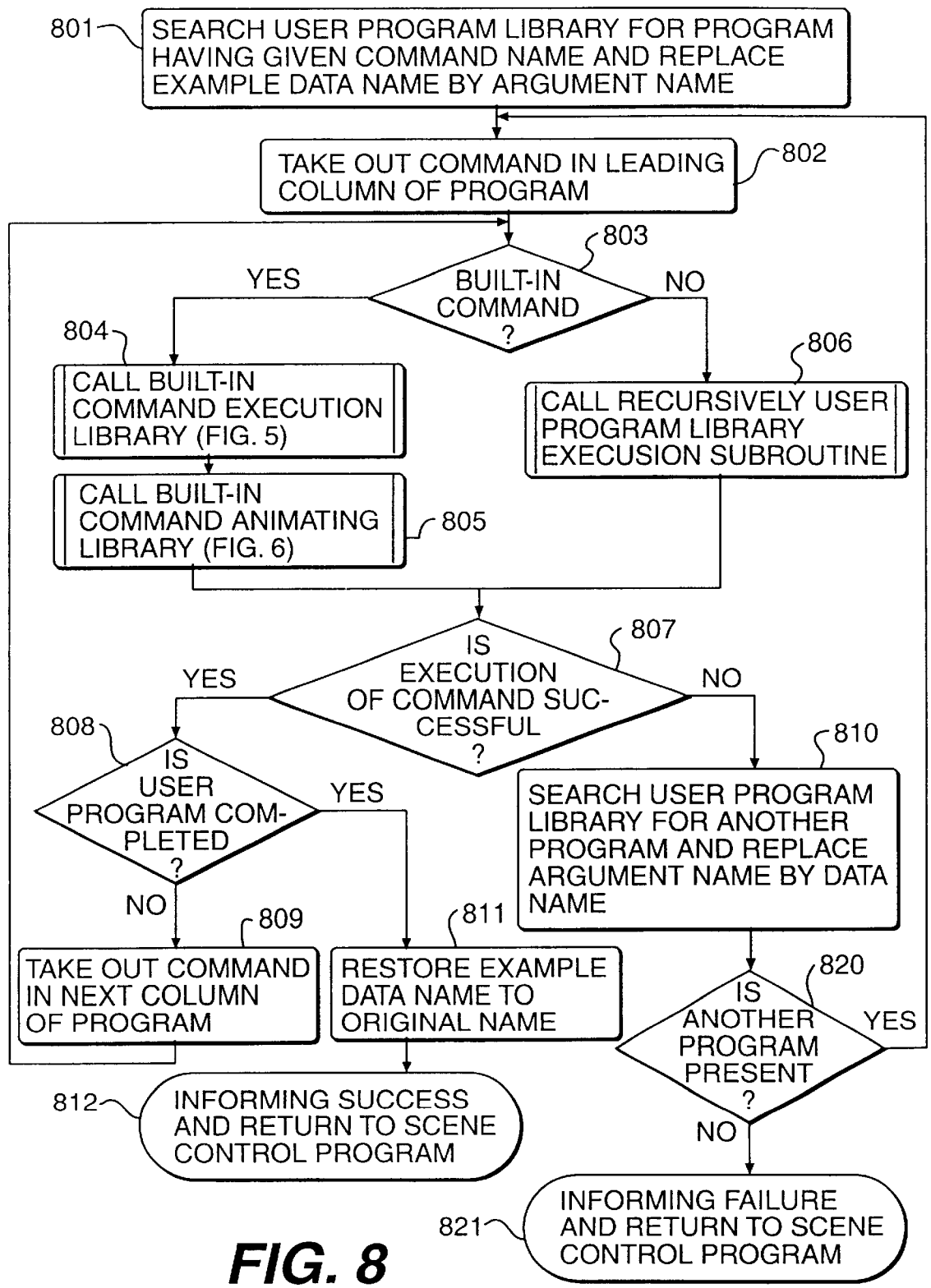
FIG. 8 is a flow chart showing the operation of a user program library execution subroutine.
Figure 13:
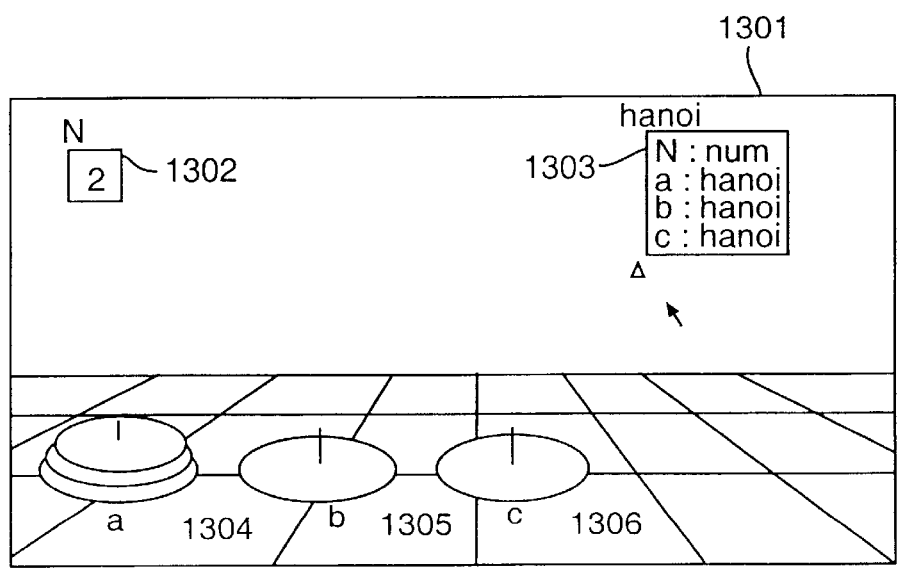
FIGS. 13 to 17 are views showing different display screens in a process of the making of a program for solving the Hanoi tower problem when the number of saucers to be moved is 2.

When the user starts the execution of the scene control program 106, the name of a program is set up (step 201), like the case of the scene 1001 in which the number of saucer to be moved is one. In the present case, the program is named as "example". Next, the example set-up subroutine 107 is called (step 202). In the present example the user sets up from the keyboard an example in which the example value of a number N indicative of the number of saucers to be moved is 2 (two), one of the Hanoi tower has two saucers and the two other tower have no saucer. After the example set-up has been completed, the scene control program 106 enters a loop (or steps 203 to 252) in which commands from the user are successively read in and executed. First, the user inputs a command "N a b c hanoi" from the keyboard 103 to execute the Hanoi tower program. As a result, the scene control program 106 passes through steps 204 and 205 and calls the user command library execution subroutine 112 in step 208. As shown in FIG. 8, in the subroutine 112, a search for a program corresponding to the command "hanoi" is made (step 801), a user program 933 is searched from the scene list 935 and the first command "N 1=" (911) is executed (step 804). In this example, however, since N is 2, the execution of this command results in a failure (step 807), a search for the corresponding program is made (step 810). But, since the corresponding program is not made at this point of time (step 820), information of a failure is given and the flow returns to the scene control program 106 (step 821). Since the execution of the user program library 113 results in a failure (step 250), the scene control program 106 employs the current program name "hanoi" as a program name and the current data as example data (step 251), adds a scene list 936 to "hanoi" program save area 934 in the library 113 to secure the program save area 934, registers names and type names at entires 917 to 924 and displays them in the scene (step 252). A state of the scene 1301 upon completion of the above steps is shown in FIG. 13. As shown in FIG. 13, data 1302, Hanoi tower 1304, 1305 and 1306 named as a, b and c, and a text 1303 showing the names of arguments and types are displayed in the scene 1301.

(2) Read-in and Execution of Commands

Next, the scene control program 106 returns to the loop (or steps 203 to 252) in which the commands from the user are successively read in and executed.

(2a) Comparison Command

First, the user inputs from the keyboard 103 a comparison command "N 1>" which confirms that the number of saucers to be moved is greater than 1. As a result, the scene control program 106 stores an entry 925 into the program save area 934 and also displays a text 1401 in the scene 1301 (step 204). Since the command 1401 is a built-in command (step 205), the command is executed by the built-in command execution library 109 and a success is reported (steps 512 to 514). And, highlighting is made by the built-in command animating library 110 (steps 610 to 612). Thereby, the execution is terminated.

(2b) Decrement Command

Next, explanation will be made of a method in which a program to process the example in which the number of saucers to be moved are two is made by use of the program previously made for the example in which the number of saucers to be moved is one. First, the user inputs from the keyboard 103 a decrement command "N1−" which reduce data N indicative of the number of saucers to be moved by 1 (one). This is made for utilizing the example of N−1 or the scene 1001. When the scene program command 106 reads in the command "N 1−" (step 203), an entry 926 is added to the program save area 934 and a text 1402 is displayed in the scene 1301 (step 204). Since the "−" command is a built-in command, the built-in command execution library 109 is called and executed (step 206). As shown in FIG. 5, the command is executed by a "−" command execution subroutine 505 in the library 109 (step 506). As a result, the value of the data N becomes 1 and a success is reported (step 507).

Next, the built-in command animating library 110 is called (step 207) and the command is executed by a "−" command animating subroutine 604 in the library 110 so that the value of the data N changed from 2 to 1 is highlighted by flickering (step 605). Thereby, the processing for the decrement command 1402 is completed.

(2c) Commands for Hanoi Program

From FIG. 13, it will be understood that the transfer of two saucers from the Hanoi tower a to the Hanoi tower b can be made by transferring the upper one of the two saucers from the Hanoi tower a to the Hanoi tower c, thereafter transferring the lower or remaining one of the two saucers from the Hanoi tower a to the Hanoi tower b, and finally transferring the saucer transferred on the Hanoi tower c onto the Hanoi tower b.

(2c-1) Hanoi Program Execution Command (N a b c hanoi)

First, the user inputs a Hanoi tower program execution command "N a c b hanoi" through the keyboard 103. This command means that saucers, the number of which corresponds to a number indicated by the current value (1) of the data N, should be transferred from the Hanoi tower a to the Hanoi tower c. As has already been mentioned, in the example in which the value of N is 1, the command "N a c b hanoi" is executable since the user program 933 corresponding to the scene 1001 has already been produced on the user program library 113. More particularly, when reads in the command "N a c b hanoi" (step 203), the scene control program 106 adds an entry 927 to the user program save area 934 and also displays a text 1403 indicative of the command in the scene 1301 (step 204). Since the "hanoi" command is not a built-in command but a user command (step 205), the scene control program 106 calls the user program library execution subroutine 112.

FIG. 8 is a flow chart showing the operation of the subroutine 112. As shown in FIG. 8, when the subroutine 112 is called, the first program save area 933 having a program name equal to the command name "hanoi" is searched from the user program library 113 by use of a scene list, so that the example data names N, a, b and c in the area 933 are respectively replaced by argument names N, a, c and b of the command 1403 (step 801). Namely, the names b and c used in the entries 907 and 909 of the area 933 are replaced by c and b, respectively. As a result, the command in the entry 913 is replaced by a command "a1 b push".

(2c-2) Coincidence Judgement Command

The user program library execution subroutine 112 next takes out the coincidence judgement command "N 1=" from the entry 911 which is the first command stored in the area 933 (step 802). Since "the coincidence judgement command" N 1=" is a built-in command (step 803), the built-in command execution library 109 is called and a "=" command execution subroutine 509 (see FIG. 5) in the library 109 is executed (step 804). Since the current value of N is 1, the execution of the command results in a success (step 510). Further, a built-in command animating library 110 is called and a "=" command animating subroutine 607 (see FIG. 6) in the library 110 is executed, so that the icon 1302 (see FIG. 13) of the first argument N is highlighted (step 608).

(2c-3) Pop Command

Since the execution of the coincidence judgement command results in a success (step 807), the examination is made of whether or not a storage entry of the next command is present in the user program save area 933 (step 808). Since the entries 912 to 914 still remain, a pop command "a pop" stored in the next entry 912 is taken out (step 809) and executed. Since the "pop" command is a built-in command (step 803), the built-in command execution library 109 is called and a "pop" command execution subroutine 519 (see FIG. 15) in the library 109 is executed (step 804) so that the upper one of the two saucers of the Hanoi tower a is named as a1 (step 520) and is deleted from the data a (step 521). Next, the built-in command animating library 110 is called and a "pop" command animating subroutine 613 (see FIG. 16) in the library 110 is executed so that the motion of the saucer rising in the Y direction is animated in the scene 1301 (step 618).

(2c-4) Push Command

What is next executed by the user program library execution subroutine 112 is a push command stored in the entry 913. Since the data name b in the entry 913 has been replaced by c, as has been mentioned above, a "a1 c push" command is executed by the built-in command execution library 109 (step 804). Then the process of the execution is animated by the built-in command animating library 110 (step 805). Namely, a "push" command animating subroutine 613 (see FIG. 6) in the library 110 is executed so that how the saucer a1 is placed onto the Hanoi tower c is animated or displayed on the display device 101 (steps 614 and 615).

(2c-5) End Command

A command in the next entry 914 is a "success-end" command. The execution of this command immediately results in a success (step 525) and the command is terminated.

Figure 14:
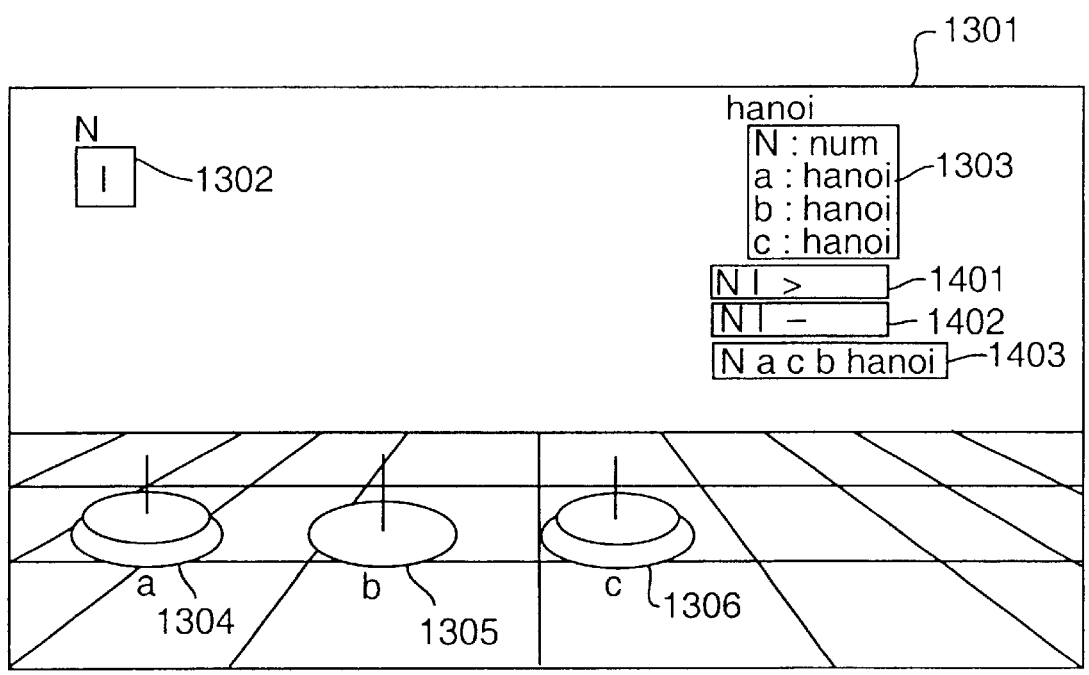

Since all of the user programs in the program save area 933 have been completed (step 808), the example data name is restored to its original name (step 811) and information of a success is made, thereby terminating the call of the user program library execution subroutine 112. FIG. 14 shows a display state of the scene 1301 at this stage of time.

(3) "pop" Command (a pop) and "push" Command (a1 b push

Figure 15:
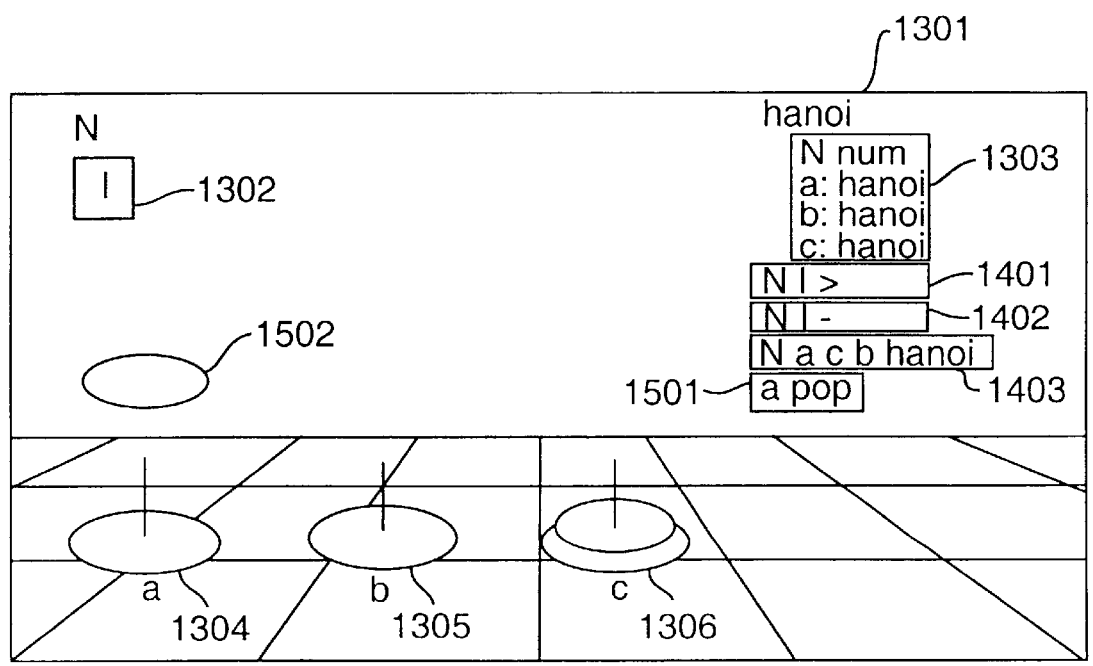
Figure 16:
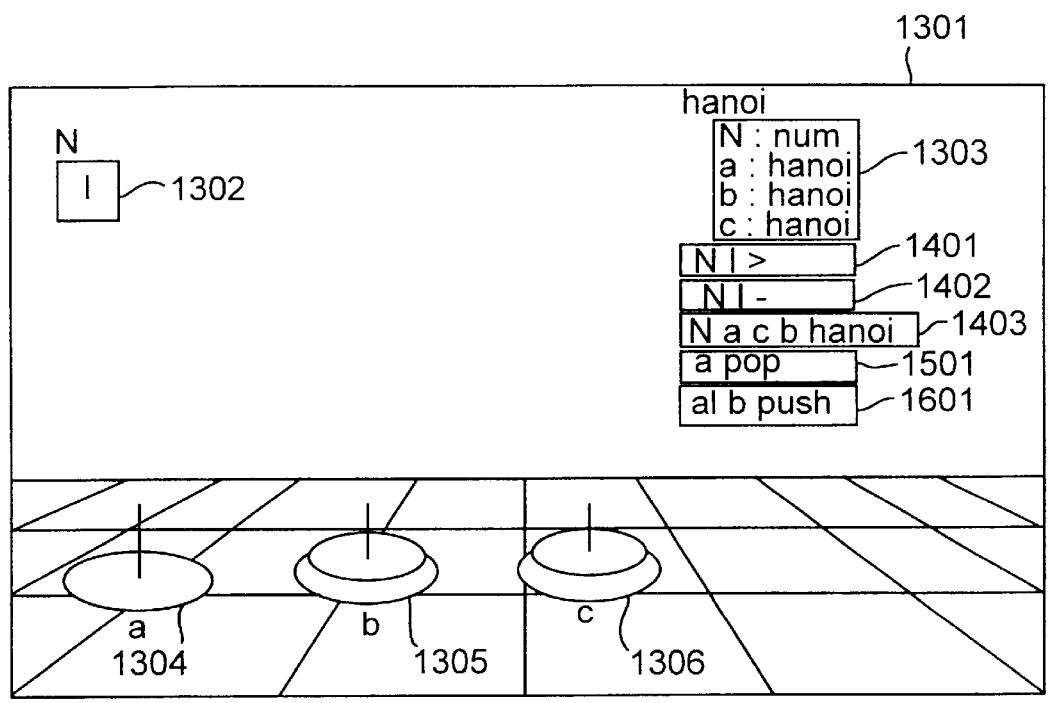

Since the upper one of the two saucers on the Hanoi tower 1304 has been transferred to the Hanoi tower 1306, the user next moves the remaining saucer on the Hanoi tower 1304 to the Hanoi tower 1305. For that purpose, a command "a pop" is inputted from the keyboard 103, as shown in FIG. 15, and a command "a1 b push" is subsequently inputted, as shown in FIG. 16. Processings for these commands are the same as those for the command 1102 in FIG. 11 and the command 1201 in FIG. 12. Entries 928 and 929 are added to the program save area 934, as shown in FIG. 9, and texts 1501 and 1601 indicative of the commands are displayed in the scene 1301 (step 204). The movement of the saucer from the Hanoi tower 1304 to the Hanoi tower 1305 is animated on the scene 1301 (steps 206 and 207).

(4) Hanoi Program Execution Command (N c b a hanoi)

The solution of the Hanoi tower problem in the example in which the number of saucers to be moved is two, can be obtained from the state shown in FIG. 16 by moving the saucer on the Hanoi tower 1306 to the Hanoi tower 1305. For that purpose, the concept of induction is used in a manner similar to that mentioned before. Namely, there is utilized the fact that the program 933 for the example in which the number of saucers to be moved is 1 (that is, N−1), has already been obtained through the generation of the scene 1001 for solving that example. Therefore, the user inputs a Hanoi program execution command, "N c b a hanoi" from the keyboard 103 (step 203).

The scene control program 106 processes this command in a similar manner to the case of the command 1403 in FIG. 14. Namely, an entry 930 is added to the program save area 934 and a command text 1701 is displayed in the scene 1301 (step 204). Since the command 1701 is not a built-in command but a command defined by the user (step 205), the user program library execution subroutine 112 is called (step 208).

As shown in FIG. 8, the subroutine 112 searches for the program 933 having the command name "hanoi" and replaces the example data names N, a, b and c therein by N, c, b and a which are the names of arguments of the command 1701 (step 801). As a result, the contents of the entry 912 of the program 933 are replaced by "c pop" and the contents of the entry 913 thereof are replaced by "c1 b push". All commands stored in the entries 911 to 914 are built-in commands and are executed by the built-in command execution library 109 (step 804).

The process of execution is animated on the scene 1301 by the built-in command animating library 110 (step 805). Since the current value of N is 1, the execution of the "N 1=" command 911 results in a success (step 510) and the display 1302 is highlighted by flickering (step 608). As the result of execution of the "c pop" command 912, the saucer c1 is deleted from the Hanoi tower c (steps 520 to 522) and the rising motion of the saucer c1 is animated (steps 618 and 619). As the result of execution of the next command 913 ("c1 b push"), the saucer c1 is added onto the Hanoi tower b (steps 516 and 517) and the motion of the saucer c1 toward the Hanoi tower b is animated (steps 614 and 615).

Since the execution of the next command 914 ("success-end") immediately results in a success and an end is reported (step 525), the user program is completed (step 808), so that the example data names are restored to the original names or the contents of the entries 912 and 913 are restored to "a pop" and "a1 b pop", respectively (step 811). Further, information of a success is given thereby completing the call of the subroutine 112 (step 812).

Figure 17:
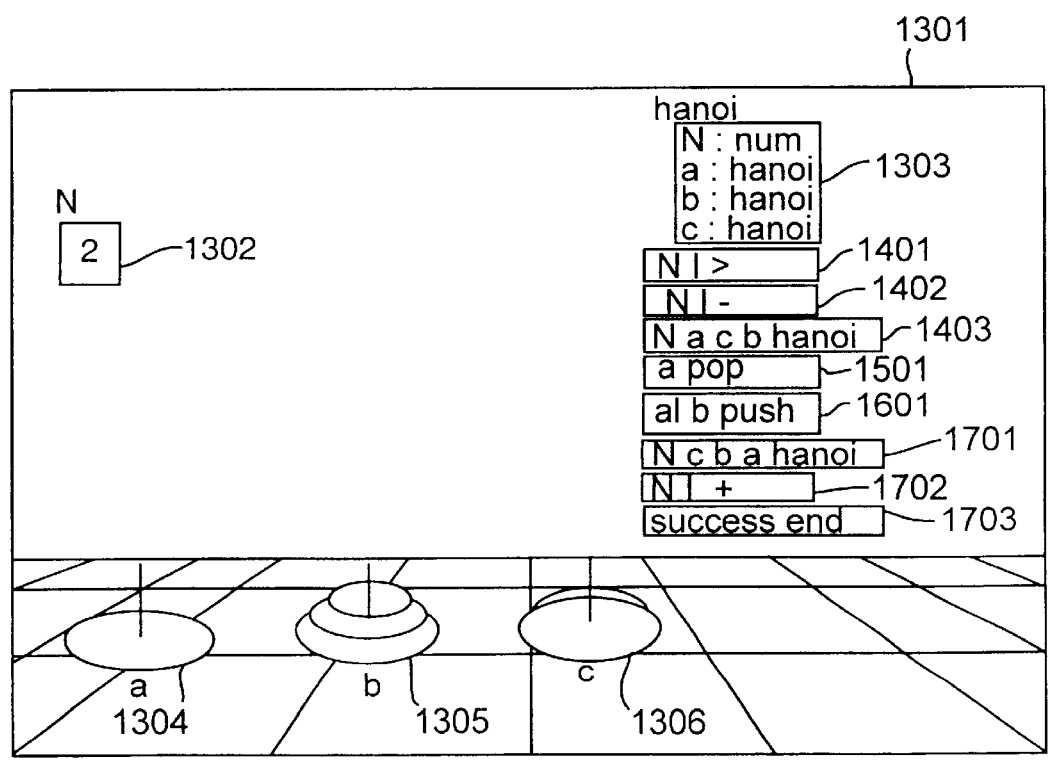

As the result of the above procedure, the two saucers which were on the Hanoi tower 1304 in the state shown in FIG. 13 have been moved to the Hanoi tower 1305, as shown in FIG. 17.

The user further inputs commands "N 1+" and "success-end" from the keyboard 103 to restore the value of N which was decremented by 1 by the command 1402, thereby terminating the generation of the scene 1301. FIG. 17 shows a state of the scene 1301 at this point of time, i.e., a state in which the Hanoi tower problem in the example in which the value of the numeral data 1302 indicative of the number of saucers to be moved is 2 has been solved.

As apparent from the foregoing, according to the program making method of the present invention, a program can be made with a feeling as if the user manipulates a real thing.

The program 933 and 934 in the user program library 113 obtained through the generation of the scenes 1001 and 1301 are ones made in conjunction with the example in which the number of saucers to be moved is 1 and the example in which it is 2. So as long the problem of Hanoi tower is concerned, those programs are operable in the case where the number of saucers to be moved is arbitrary or it is not necessary to add a further program for solving the Hanoi tower problem in an example in which the number of saucers to be moved is other than 1 and 2. In the following, this will be explained for confirmation.

Now assume by way of example the case where the value of data N indicative of the number of saucers is 3 with three saucers mounted on the Hanoi tower a and with no saucer mounted on the Hanoi towers b and c. In this case, if the user inputs a command "N a b c hanoi" from the keyboard 103 (step 203), the user program library execution subroutine 112 is called (step 208) since the "hanoi" command is not a built-in command (step 205). As shown in FIG. 8, the program 933 is searched and commands in the program 933 are successively executed since example data names and argument names coincide with each other.

However, since the value of N is 3, the execution of the command 911 ("N 1=") results in a failure (step 510) and hence the subroutine 112 receives the report of failure in the execution of command (step 807) and takes out from the user program library 113 the program 934 which is another program having the same command name "hanoi" (step 810). Then, commands in the program 934 are successively executed. Since the example value of N is 3, the execution of the command 925 ("N 1>") results in a success and the value of N is changed to 2 by the next command 926 ("N 1−"). The next command 927 ("N a c b hanoi") which is a command to instruct the movement of N (two) saucers from the Hanoi tower a to the Hanoi tower c, can be processed by the generation of the scene 1301 for the example in which N is 2. Particularly, since the "hanoi" command is not a built-in command (step 803), the subroutine 112 is recursively called (step 806).

As well known, the recursive call is a procedure call in a form in which in a certain subroutine the same subroutine is called again. The recursive call is possible in many programming languages, for example, PASCAL, C and LISP. If the scene control program 106 and the group of subroutines 107 to 112 are made by use of those languages, the recursive call in step 806 can be easily realized. When the subroutine 112 is recursively called by the command 927 ("N a c b hanoi"), the program 933 is taken out and each command is executed after replacement of example data name. At this time, too, the execution of the command 911 ("N 1=") results in a failure. The program 934 is taken out again and is executed after replacement of the example data name "N a b c" by argument name "N a c b".

After N has been decremented by 1 by the command 926 so that the value of N is 1, the command 927 (turned to "N a c b hanoi" through replacement) which is not a built-in command appears in the program 934 and a recursive call occurs (step 806). Therefore, the program 933 is taken out again and is executed. At this time, the execution of the command 911 ("N 1=") results in a success.

Then, the execution of each of the remaining commands 912 to 914 being built-in commands results in a success. Thereby, the second recursive call of the subroutine 112 is completed. By the execution of the command 931 ("N 1+") in the case of N=1, N becomes 2. Thereby, the first recursive call is also completed. The execution of the command 927 ("N a b c hanoi") also results in a success and is completed.

As the execution of this command 927, the two saucers are transferred from the Hanoi tower a to the Hanoi tower c. By the next commands 928 ("a pop") and 929 ("a1 b push"), the saucer having remained on the Hanoi tower a is moved to the Hanoi tower b. The next command 930 ("N c b a hanoi") to instruct the movement of the two saucers from the Hanoi tower c to the Hanoi tower b is executable since the example of N=2 has already been settled as the scene 1301. (Like the case of the command 927, a recursive call of the subroutine 112 occurs.)

By the command 927, the two saucers having been transferred to the Hanoi tower c are moved to the Hanoi tower b so that the saucers which are three in total are placed on the Hanoi tower b. By the next commands 931 ("N 1+") and 932 ("success-end"), the execution in the case where the number of saucers to be moved is 3 is terminated. From the above explanation concerning the case where N is equal to 3, it is apparent that the execution is possible even in the case where N is greater than 3.

The foregoing embodiment mentioned taking the Hanoi tower problem by way of example aims at comprehensibly displaying data concerning an object to be processed in accordance with the progression of a program. However, the mere display of the object to be processed does not always give complete impartment of the progression of the program. For example, as interpretation of the state, in which the movement of a saucer is being stopped in the example of the Hanoi tower, can be considered three cases including the case (1) where the program has been normally terminated, the case (2) where the program has been abnormally terminated and the case (3) where the program is in the course of progression and re-depiction by a display device is awaited.

Therefore, there is a case where the user cannot judge which of all the cases the current case corresponds to. Also, when a saucer involves a small movement which is hard to make out or when the saucer disappears behind another because the depiction is made three-dimentionally, there may be a case where the user cannot recognize whether or not the program is operating.

In order to comprehensibly display not only an object to be processed but also the program, the following description will be made in conjunction with a second embodiment.

In the second embodiment, a program is personified and is displayed on a display device as a secretary who has human shape. The making and execution of the program can be made as if request upon the secretary is performed for an operation, thereby information of the progression of the program can be given as the action or motion of the secretary, or the motion of an object(s) to be processed which is handled by the secretary. For example, in the case of the Hanoi tower problem, if (1) the normal termination of a program, (2) the abnormal termination of the program and (3) the course of progression of the program are preliminarily defined as the motions of the secretary, the state of progression of the program is obvious. Also, a user has no need to be sensible of all of many objects displayed on a display device but is only required to pay attention to the secretary and anyone manipulated or handled by the secretary and hence the user can have a sense of assurance.

In the following, description will be made of constituent elements of a system according to the present embodiment together with technologies associated therewith and explanation will thereafter be made of an example of causing the secretary to call up or telephone, an example of manipulating a vertual computer terminal, and so forth.

In those examples, the secretary and the object(s) to be processed by handled by the secretary are arranged in a three-dimensional space and a scene having a great reality is displayed in the display device. Therefore, there is provided a method of making a program and providing executing environment with which the user is familiar.

A. Outline

Figure 19:
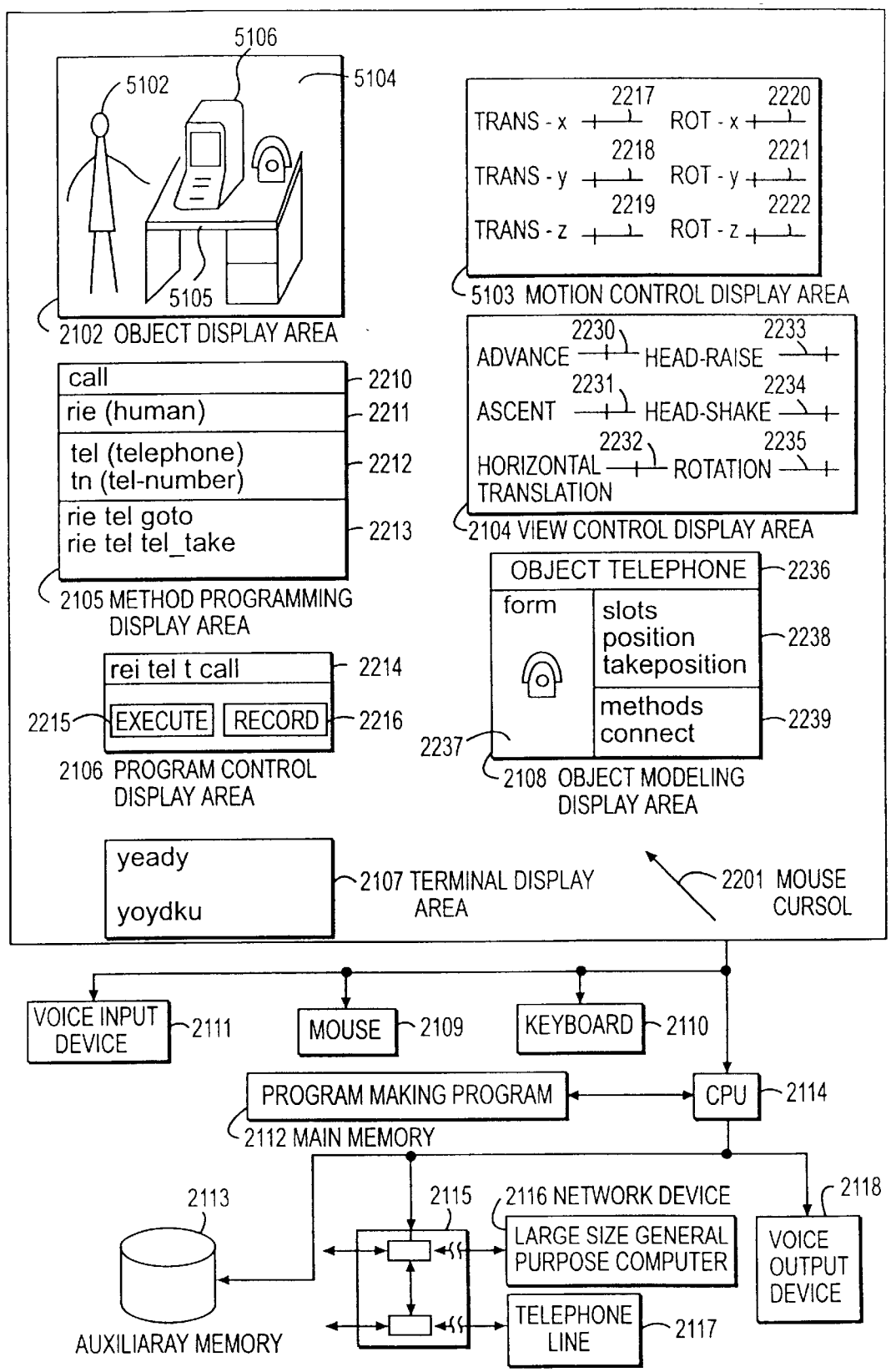
FIG. 19 is a block diagram of the whole of a system for realizing a second embodiment of the present invention.

FIG. 19 shows in block diagram the construction of a program making system according to the second embodiment of the present invention. As shown in the figure, the system comprises a display device 2101, three input devices including a mouse 2109, a keyboard 2110 and a voice input device 2111, a main memory 2112 in which a program 2010 for making a program is stored, an auxiliary memory 2113, a CPU 2114, a network device 2115 for connection with a large size general purpose computer 2116 and a telephone line 2117, and a voice output device 2118.

A display screen of the display device 2101 includes display areas 2102 to 2108, as shown in FIG. 19. On an object display area 2102 are preliminarily displayed three-dimensional figures of various fixtures in an office space when observed from a virtual TV camera (not shown) placed at a certain point. The fixtures include, for example, a telephone 5104, a desk 5105, a terminal 5106 and a human 5102 representative of a standing secretary. In the present embodiment, an object termed in an object oriented computation model is defined for each of those figures. These figures are utilized as icons of the corresponding objects. By virtue of those icons, a desired program is made as a method for the human 5102. In order that upon execution of the made program the state of execution can be recognized by an operator, the present embodiment causes the human 5102 to make a motion corresponding to the state of execution of the program upon making of the program. A command to instruct this motion is inputted as a part of the program to be made. As will be mentioned in later, the programming is made while moving the human 5102. Sliders 2217 to 2222 for designating the motion are displayed on a motion control display area 2103. Sliders 2230 to 2235 for controlling the position or posture of the virtual TV camera are displayed on a view control display area 2104 in order to change a field of view in which the office space is observed. On a method programming display area 2105 are displayed commands and so forth which are inputted to make the program. On a program control display area 2106 are displayed menus and so forth for making control such as execution or storage of commands which are inputted by the operator. On a terminal display area 2107 is displayed control information which informs the operator of the state of the terminal including the display device 2101. On an object modeling display area 2108 is displayed information concerning an object corresponding to an icon selected by the operator among various icons displayed on the object display area 2102. Reference numeral 2201 designates a mouse cursor shown on the display screen.

Figure 20:
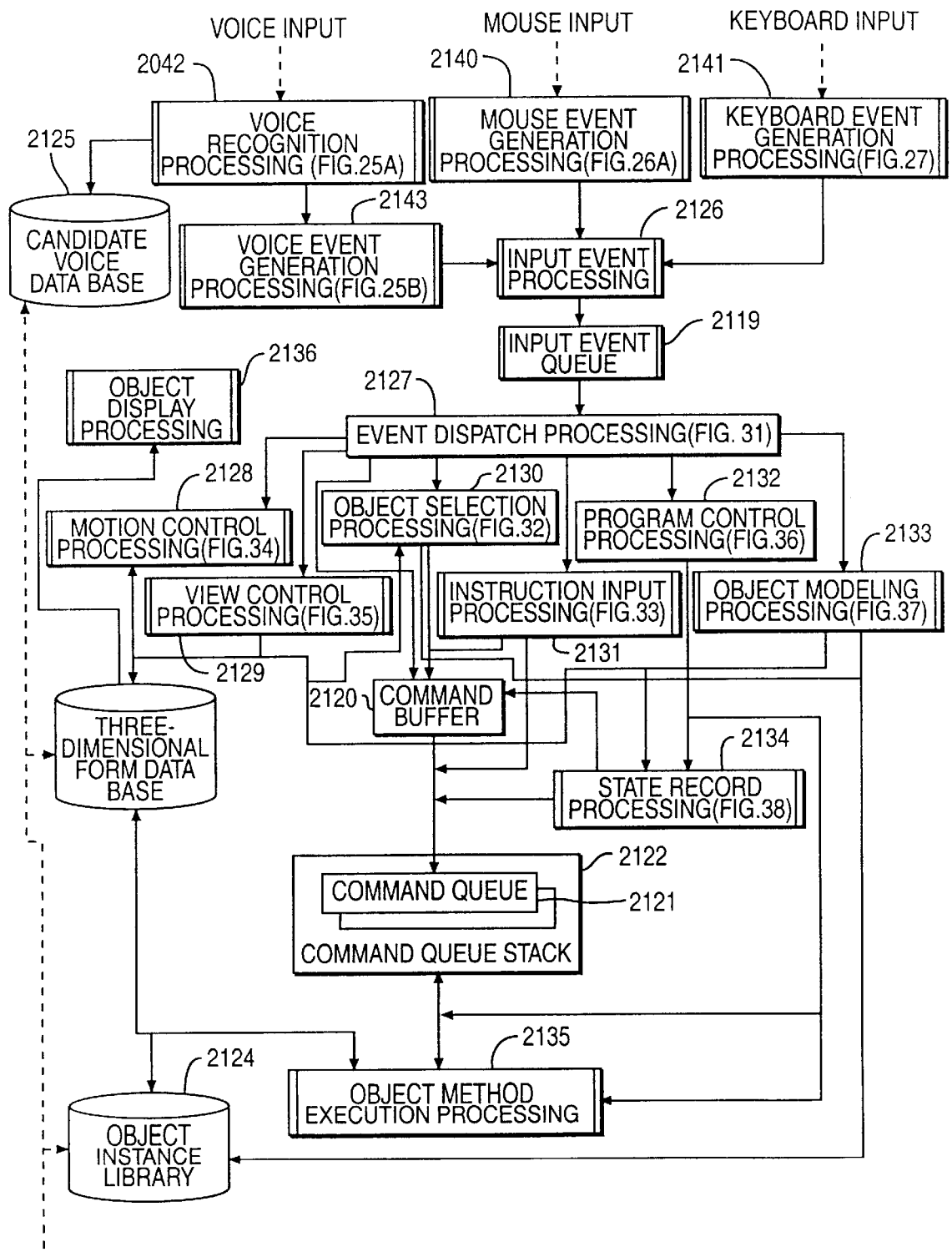
FIG. 20 shows functional blocks of a program making program held in a main memory shown in FIG. 19 and data bases associated therewith.

In FIG. 20, reference numerals 2119, 2120, 2266 to 2136 and 2140 to 2143 designate various modules of the program making program 2010 preliminarily prepared. The program making program 2010 not only decides user inputs to produce commands but also executes the commands.

Figure 21C:
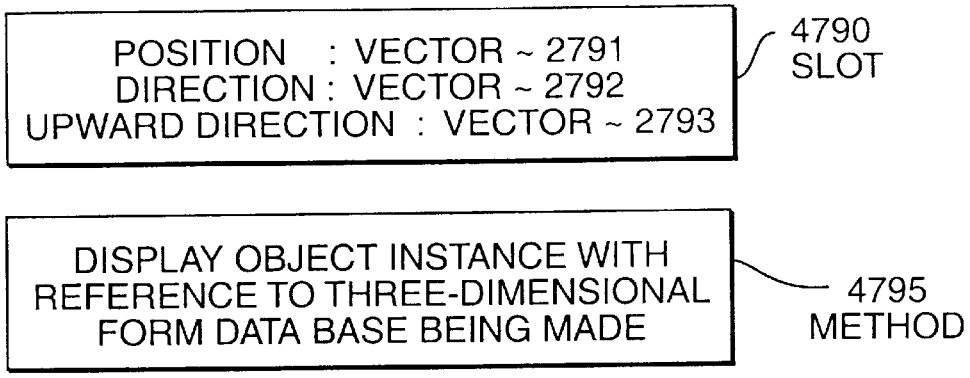
Figure 22:
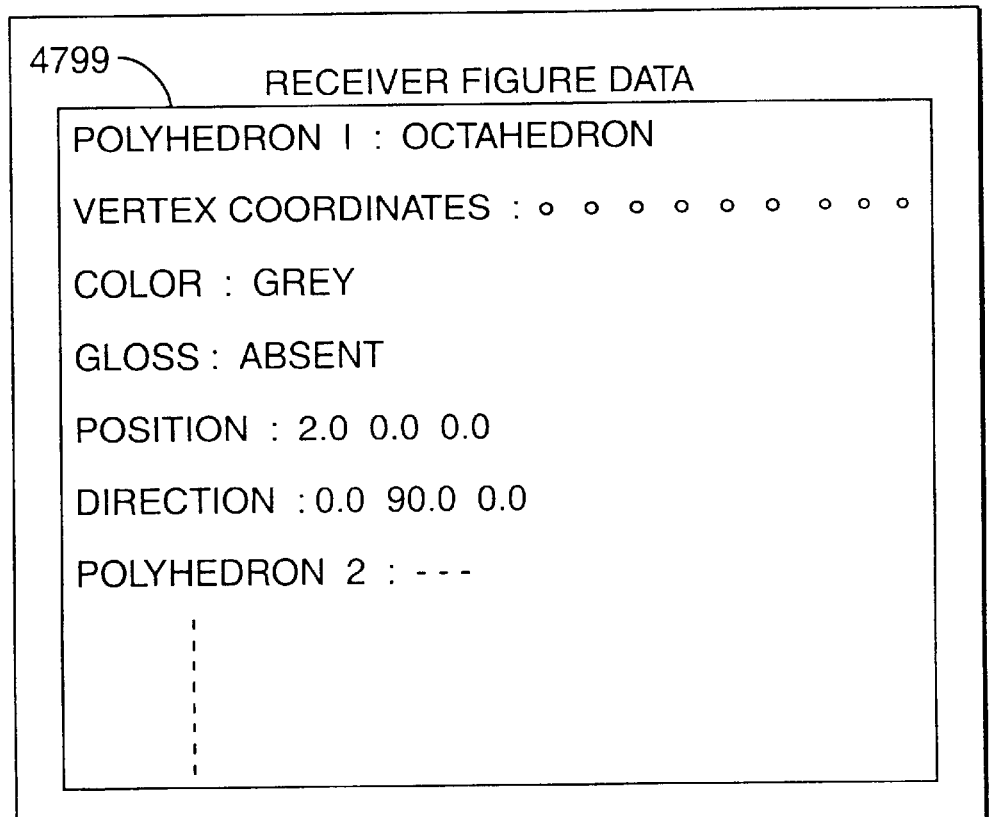
FIG. 22 is a view showing an example of figure data in a three-dimensional data base shown in FIG. 20.
Figure 23:
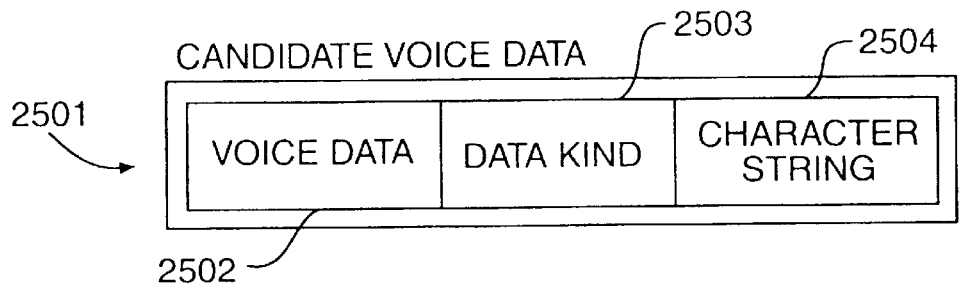
FIG. 23 is a view showing the structure and processing of candidate voice data in a voice data base shown in FIG. 20.

For the program making program 2010 are preliminarily stored, in the main memory 2112, three data based including (1) an object instance library 2124 which stores information of each object or an object instance, each object instance being composed of structure data of each object, an object slot and an object method, examples of the object instance being shown in FIGS. 21A to 21C, (2) a three-dimensional form data base 2123 which is an assembly of graphic or figure data of a three-dimensional icon representative of each object, an example of the figure data being shown in FIG. 22, and (3) a candidate voice data base 2125 which is used for recognition of a voice from the voice input device 2111, an example of the candidate voice data being shown in FIG. 23.

Those data are originally stored in the auxiliary memory 2112 but are properly placed in the main memory 2112 as required by the program making program 2010.

The outline of processings performed by the program making program 2010 will now be described.

(1) User input information from the three input devices including the mouse 2109, the keyboard 2110 and the voice input device 2111 is interpreted by processings 2119, 2126, 2127 and 2140 to 2143 to produce a command which in turn is stored into a command buffer 2120 and is added into a command queue 2121 at the top of a command queue stack 2122. These processings are performed by the processings 2119, 2126, 2127 and 2140 to 2143 shown in FIG. 20. The inputted command may include a command to cause the human icon 5102 or the like to make a desired motion. At this time, various sliders in the motion control display area 2103 are manipulated.

(2) In an object method execution processing 2135, a command is fetched from the command queue 2121 and is executed referring to the three-dimensional form data base 2123 and the object instance library 2124. More particularly, when a command is fetched, if a method included in an object to which an object instance designated by that command belongs, is previously defined, a proper program library designated by that method is executed. If the command is for moving, for example, the human icon 5102, the display of a three-dimensional icon corresponding to that object or person 5102 is properly changed in the form of animation. Thereby, the user can know which of commands was executed upon making of the program. Upon display in the form of animation, the three-dimensional form data base concerning the object is properly updated by an object method execution processing 135 in accordance with the above program library and an object display processing 2136 changes the display on the object display area 2102 in immediate response to the result of updating. While a three-dimensional image is thus displayed in the form of animation by the execution of the command, a voice for informing the operator of the state of execution of the command is outputted by the voice output device 2118 in accordance with the execution of the command.

(3) A method requested by the command fetched from the command queue 2121 is not defined in methods included in an object designated by that command, a new method is created by use of the object method execution processing 135.

(4) When the execution of the command results in any trouble, a failure in execution of the command is reported. In this case, re-programming of the method designated by the executed command is made. The re-programming is, too, carried out by use of the object method execution processing 135.

Thus, the processing 2135 exhibits various functions in accordance with circumstances. The command queue stack 2122 operates to control the processing 2135.

(5) A three-dimensional form icon corresponding to each object instance can be changed in position on display state at any point of time. This change is made by moving valuators (vertical solid line portions) of the sliders 2217 to 2222 on the motion control display area 103 right and left by virtue of the mouse. In the course of the programming, the result of change is not stored in a program being made as an instruction. When a "record" button 2216 in the program control display area 2106 is selected by the mouse, a command train to revive motions or positional changes until the change of the three-dimensional form icon is reached is produced and this command train is recorded in the program being made.

(6) Like the case of item (5), the state of an icon with a three dimensional form projected onto the object display area 2102 can be changed at any point of time. Also, like the case of item (5), the "record" button 2216 is selected by the mouse so that a command to revive the state is produced and is recorded in the program.

As mentioned above, one feature of the present embodiment lies in that during the making of a program, a command to cause the human icon 2310 assigned for this program to make a required motion is inputted as a part of a train of commands which belong to the program to be made. Further, upon making of the program, this command is executed to visually inform the operator of the state of execution of the inputted command. Also, in the present embodiment, the human icon is involved and a three-dimensional figure is utilized as an icon as it is. Other features of the present embodiment will become apparent from the following detailed description.

B. Constituent Elements of system

Prior to detailed description of processings performed by the system according to the present embodiment, detailed description will now be made of respective constituent elements of the system.

B.1 Data Bases

1. Three-dimensional Form Data Base 2123 (FIG. 22)

In the present embodiment, versions of three-dimensional figures representative of a human, a telephone, a desk and so forth placed in an office space when observed from a camera positioned in the office space are displayed on a display screen and the displayed figures are used as icons for representing the respective corresponding objects.

The three-dimensional form data base 2123 stores data of such three-dimensional figures therein. As shown in FIG. 22 by way of example, data of each three-dimensional figure is composed of the type and position of each of a plurality of polyhedrons which form the three-dimensional figure, attributes such as color and gloss of each polyhedron, and a transformation matrix. FIG. 22 shows a part of the three-dimensional figure data 4799 of a receiver object instance 4754 which is a subordinate element of a telephone object instance 4750 shown in FIG. 21B. In the shown example, an octahedron is demonstrated together with the vertex coordinates, color, gloss, position and direction of the octahedron.

2. Object Instance Library 2124 (FIGS. 21A to 21C)

The object instance library 2124 holds information of various objects. For example, object structure data, an object slot and an object method. FIGS. 21A, 21B and 21C show specific examples of object instances which correspond to the human, telephone and camera, respectively. Explanation will now be made taking a human object instance 4701 of FIG. 21A registered in the object instance library 2124 by way of example.

A slot 4711 is the name of an attribute possessed by the human object and has a slot value. The slot 4711 designates the name of each attribute and the type of data to that attribute. The example of FIG. 21A shows that the slot 4711 of the human object instance 4701 has the names of three attributes including a position 4720, a direction 4721 and a name 4722 and data related to the three attributes are stored as data of types which are termed vector, vector and character string, respectively.

An object method is a procedure inherent in the associated object and includes in an example of FIG. 21A the name of each method or procedure and a train of commands and a set of argument objects corresponding to the method name. The call of methods upon execution is made in the order of definition. In the example shown in FIG. 21A, there are defined a "call" method 4712, a "goto" method 4713, a "let-take" method 4714, a "connect (1)" method 4715 and a "connect (2)" method 4716. Though two "connect" methods are defined, the sequencing is made in order to represent the order of definition.

In the present embodiment, the object has elements which form a tree structure. Each element too is an object. The same holds for the object instance. As apparent from object structure data 4702 shown in FIG. 21A, a human object instance 4703 has a body object instance 4704 as its subordinate element. The body object instance 4704 has as its subordinate elements a right and upper arm ("ruarm") object instance 4708, a left and upper ("luarm") object instance 4705, and so forth. The "ruarm" object instance 4708 has a right and lower arm ("rlarm") object instance 4709 as its subordinate element and the "rlarm" object instance 4709 has right hand ("rhand") object instance 4710 as its subordinate element. A specific example of the object instance as an element is omitted from the illustration and detailed explanation for the same of simplification.

In the present embodiment, each element has a three-dimensional form. The three-dimensional form is stored in the three-dimensional form data base 2123 (FIG. 20). Also, the object instance (not shown) of each element processes as its attributes the attribute of translatability and the attribute of rotatability. In the example shown in FIG. 21A, an element whose attribute of translatability assumes "translatable" is described with (+) and an element whose attribute rotatability assumes "rotatable" is described with (*). This equally holds for the other figures, for example, FIG. 21B and FIG. 21C.

In the case where the attribute of translatability or the attribute of rotatability of an element assumes "not translatable" or "not rotatable", that element cannot be translated or rotated. In the example shown in FIG. 21A, the attribute of translatability of each of the subordinate elements of the human object instance 4703 assumes "not translatable". This realizes a natural condition that each articulation of a human is rotatable but is not translatable.

A camera object instance 4780 (FIG. 21C) exists as an instance for a special object. The camera object instance 4780 has as its slot 4790 three attributes including a position 4791 which represents the position of the camera, a lateral direction 4792 which represents a horizontal direction of the camera and an upward direction 2027 which represents a vertical direction of the field of view of the camera. And, vector types of data are stored as data related to the three attributes, respectively. Also, this camera object instance 4780 has a built-in method as a method 4795. This method transforms data of various three-dimensional figures in the three-dimensional form data base 2123 into data in a coordinate system on the object display area 2102 (FIG. 19), performs shading and/or rendering in order to provide more reality and displays the obtained figures on the object display area 2102.

The object display processing 2136 (FIG. 20) is executed in the case where the three-dimensional form data base 2123 or the object instance library 2124 is updated or in the case where it is required to display by other display update control.

The object instance library 2124 is modified when an object instance is generated or deleted.

3. Candidate Voice Data Base 2125 (FIG. 23)

The candidate voice data base 2125 is a data base which stores a plurality of candidate voice data 2501 shown in FIG. 23 used when a voice inputted from the voice input device 2111 is to be recognized. The candidate voice data 2501 is composed of a voice data field 2502, a data kind field 2503 and a character string field 2504. The voice data field 2502 stores the voice input as it is, the data kind field 2503 represents the kind of candidate voice data and the character string field 2504 includes a character string outputted as the result of voice recognition. The data kind 2503 represents one of "object instance", "object method", "built-in instruction code" and "program control".

Candidate voice data preliminarily registered includes the following:

(1) candidate voice data related to a built-in instruction (FIG. 23) which will be mentioned in later, the data kind of this candidate voice data being "built-in instruction code";

(2) candidate voice data related to an object instance such as the camera object instance preliminarily defined as a built-in object instance, the data kind of this candidate voice data being "object instance";

(3) candidate voice data corresponding to a voice input of "execute" from the operator, the data kind of this candidate voice data being "program control" and the character string thereof being "execute"; and (4) candidate voice data corresponding to a voice input of "record" from the operator, the data kind of this candidate voice data being "program control" and the character string thereof being "record".

B.2 Processings

Description will now be made by various processings by the program in the present system shown in FIG. 20

1. Input Processing

An input to the system is effected by use of the keyboard 2109, the mouse 2110 or the voice input device 2111.

Figure 24A:
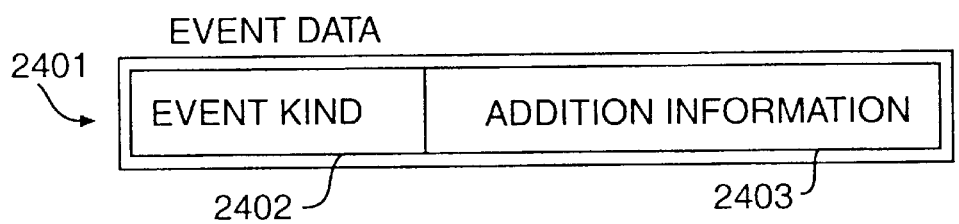
FIGS. 24A and 24B are views for explaining the structure event data processed by the program shown in FIG. 20 and an input event processing.

1.1 Event Data (FIG. 24A)

As will be mentioned in later, a voice event generation processing 2143, a mouse event generation processing 2140 or a keyboard event generation processing 2141 generates event data in response to the input to the system.

The event data 2401 is composed of an event kind field 2402 and an addition information field 2403, as shown in FIG. 24A. The event kind 2402 is one of "motion control", "view control", "object selection", "program control", "instruction input", "object modeling" and "keyboard". The addition information 2403 is different depending on the event kind. When the event kind is either object selection", "instruction input" or "keyboard", the event data is used for providing a command which forms a program to be made or for providing a part of that command. The other kind of event data does not take direct part in the generation of a command.

1.2 Voice Processing 1.1.1 Voice Input

A processing which is to be performed by the program to be made is inputted by the operator from the voice input device 111 in the form of a voice as if an instruction was made to the human icon 5102. For example, "take telephone" is inputted. In those voice input processing, the inputted voice is recognized to generate one or plural required event data. Not only the voice to instruct the processing but also a voice related to the execution of a produced command, for example, "execute" can be inputted from the voice input device 111. In either kind of voice, it is necessary that the voice is an expression preliminarily registered.

Figure 25A:
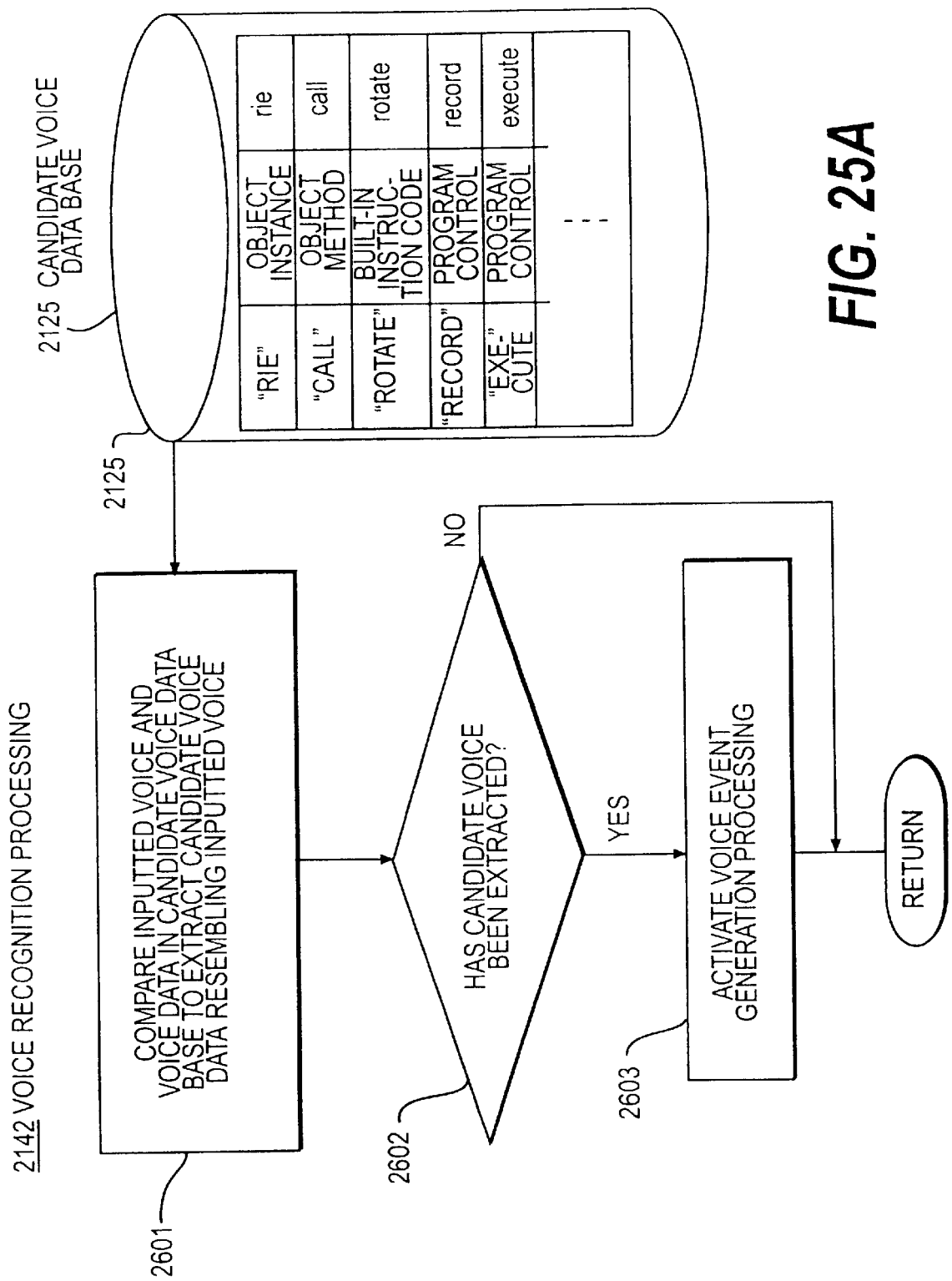
FIGS. 25A and 25B are flow charts concerning a voice input processing.

1.1.2 Voice Recognition Processing 2142 (FIG. 25A)

As shown in FIG. 25A, in a voice recognition processing 2142, different parts of the input voice sent from the voice input device 2111 are compared with the voice data 2503 of all the candidate voice data 2501 (FIG. 23) in the candidate voice data base 2125 to extract candidate voice data having most resemblance to the respective voice parts (step 2601) and a voice event generation processing 2143 is activated for each voice part (step 2603). In the case where no candidate voice resembling the input voice is present (step 2602), no output is produced.

Figure 25B:
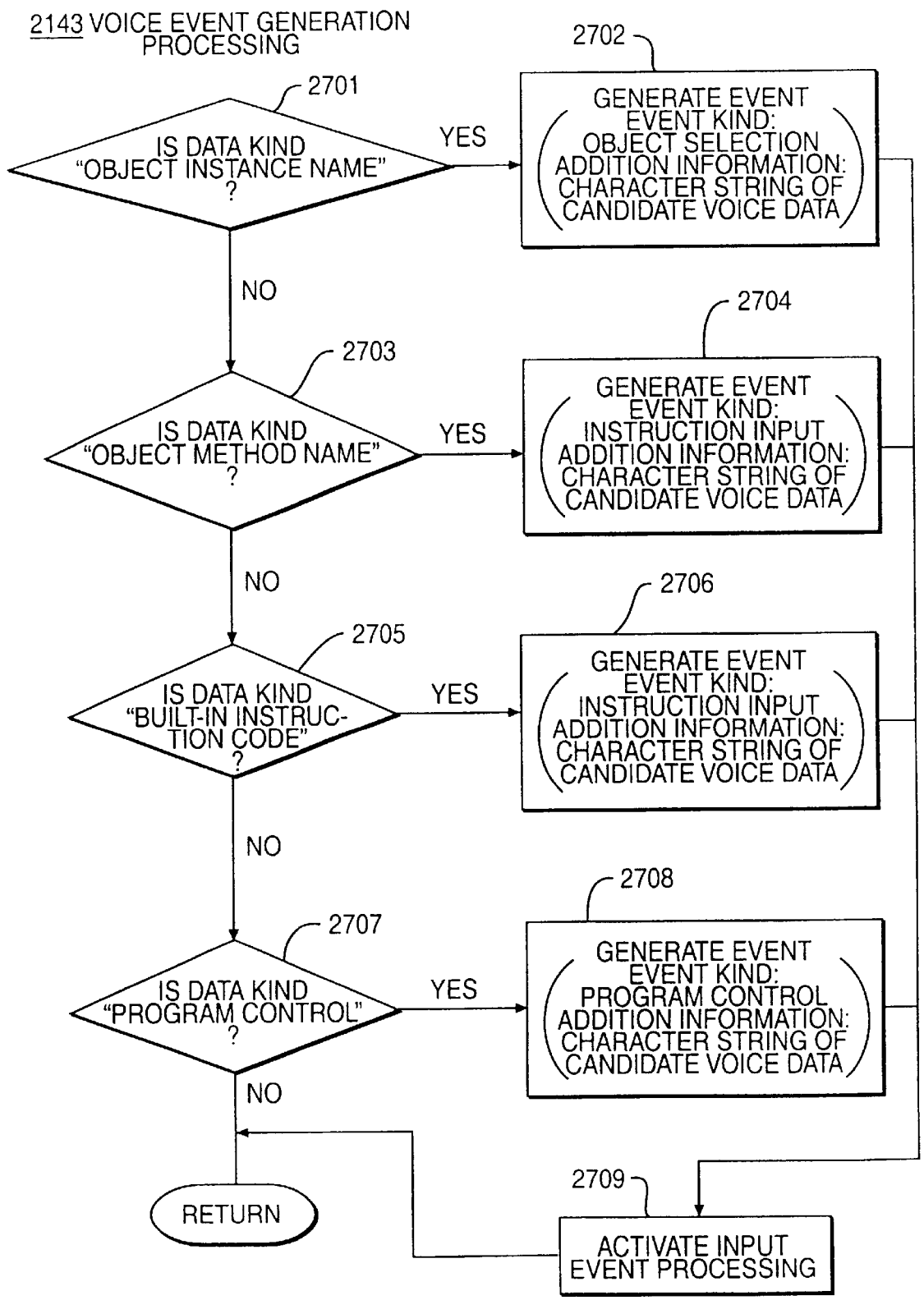

1.2.3 Voice Event Generation Processing (FIG. 25B)

As shown in FIG. 25B, the data kind field in the candidate voice data extracted in the voice recognition processing 2142 examined (steps 2701, 2703, 2705 and 2707) to generate a specified event kind of event data depending on the data kind (steps 2702, 2604, 2706 and 2708), thereby activating an input event processing 2126 (step 2709).

The event data generated will be mentioned justinbelow. Upon generation of the event data, the character string field 2504 of the extracted candidate voice data 2501 is used as the addition information field 2403 of the event data 2401 as it is.

For example, as in the case of "telephone" in an input voice of "take telephone", the data kind of candidate voice data extracted for a voice part representing an object to be processed may be "object instance". In this case (step 2701), there is generated event data the event kind of which is "object selection" (step 2702).

For example, as in the case of "take" in the input voice of "take telephone", the data kind of candidate voice data extracted for a voice part representing the contents of a processing may be "object method". In this case (step 2703), there is generated even data the event kind of which is "instruction input" (step 2704).

The data kind of candidate voice data extracted for a part of an input voice representing a built-in instruction (which will be mentioned in later) is "built-in instruction code". In this case (step 2705), there is generated event data the event kind of which is "instruction input" (step 2706).

The three event data are generated when the operator inputs by a voice an object instance or object method for the object-to-be-processed field by or the argument field of a command to be produced or an instruction code of that command.

For example, as in the case of an input voice of "record" or "execute", the data kind of extracted candidate voice data may be "program control". In this case (step 2707), there is generated event data the event kind of which is "program control" (step 2708).

The event data generated for the input voice of "execute" instructs the execution of a command generated just before but is not used for production of a new command. The input voice of "record" is used for command production.

Figure 26A:
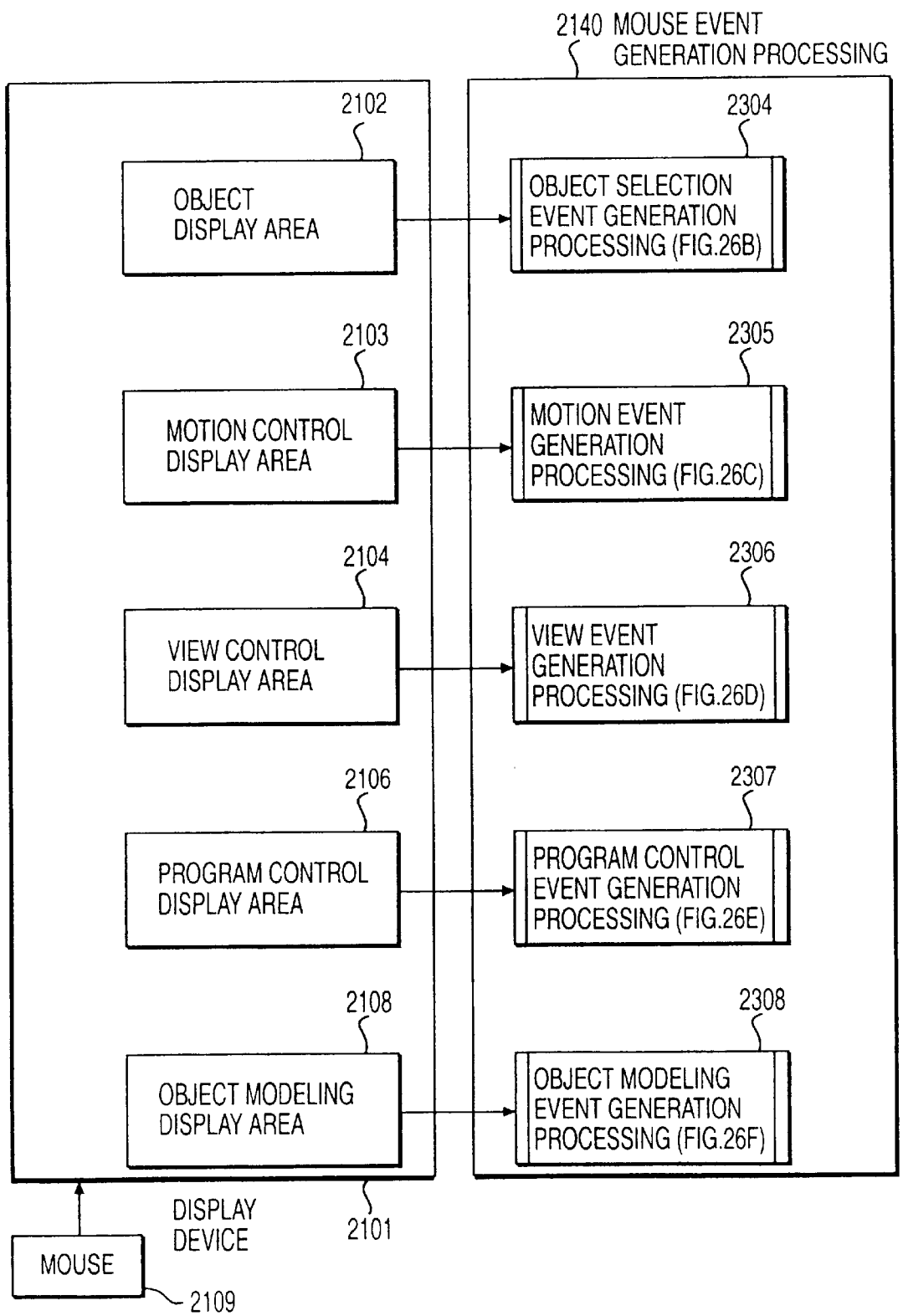

1.3 Mouse Input and Mouse Event Generation Processing 2140 (FIG. 26A)

By placing the mouse cursor 2201 on either one of the display areas 2102 to 2104, 2106 and 2108 in the display device 2101 shown in FIG. 19, the inputting using the display screen becomes possible.

A mouse event generation processing is a general term for event generation processings by the mouse and includes an object selection event generation processing 2304, a motion event generation processing 2305, a view event generation processing 2306, a program control event generation processing 2307 and an object modeling event generation processing 2308 which will be mentioned hereinafter. These processings 2304 to 2308 are activated when the mouse cursor 2201 is placed on the display areas 2102, 2103, 2104, 2106 and 2108, respectively, as shown in FIG. 26A.

Event data generated in the object selection event generation processing 2304 is used for command production but event data generated in the other processings 2305, 2306 and 2308 are not used for command production. Event data generated in the processing 2307 may includes one which is used for command production and one which is not used for command production.

1.3.1 Object Selection Event Generation Processing 2304 (FIG. 26B)

This processing is executed when an object instance used for the object-to-be processed field or the argument field of a command to be generated is inputted by the operator by means of the mouse. Namely, the operator moves the mouse cursor 2201 onto an icon in the object display area 2102 representative of an object instance to be inputted and depresses a mouse button (not shown). In response to this mouse operation, the object selection event generation processing 2304 is activated. As shown in FIG. 26B. The object instance selected by the mouse operation is recognized referring to the three-dimensional form data base 2123 (step 2801) and there is generated event data having "object selection" which is stored as the event kind and a character string representing the selected object instance which is stored as addition information 2802). In the case where the selected object instance is a constituent element of another object instance, a character string including the name of a superordinate object instance and the name of the selected object instance chained by a period "." in the order from the superordinate one to the subordinate one is stored in the information field. And, the input event processing 2126 (FIG. 20) is activated (step 2803).

1.3.2 Motion Event Generation Processing 2305 (FIG. 26C)

This processing is activated when the operator instructs the translation (or rotation) of an icon in the object display area 2102 by use of the motion control display area 2103. Six valuators 2217 to 2222 are displayed on the motion control display area 2103, as shown in FIG. 19. In the case where either one of the six valuators is manipulated by the mouse 2109, there is generated event data having "motion control" which is stored as the event kind and the name of the manipulated valuator and the value of a scale on a supporting guide of a slider of the valuator (that is, the amount of translation or the amount of rotation) which are stored as addition information (step 2901). And, the input event processing 2126 (FIG. 20) is activated (step 2902). Prior to manipulation of the valuator, the object selection must be made for the object display area 2102.

1.3.3 View Event Generation Processing 2306 (FIG. 26D)

This processing performs the same processing as the motion event generation processing 2305 excepting the generation of event data stored with the view control as the event kind using six valuators 2230 to 2235 in the view control display area for the mouse input (steps 3001 and 3002 in FIG. 26D).

1.3.4 Program Control Event Generation Processing 2307 (FIG. 26E)

In the case where the mouse button (not shown) is depressed when the mouse cursor 2201 is placed on the "execute" button 2215 (FIG. 19) in the program control display area 2106, there is generated event data which has "program control" stored as the event kind and "execute" stored as addition information. This event data is used for instructing the execution of a command completed just before. This is similar to the case of the voice input of "execute". Similarly, in the case where the "record" button 2216 is depressed, there is generated event data which has "program control" stored as the event kind and "record" stored as addition information (step 3101). In either case, the input event processing 2126 (FIG. 20) is activated (step 3102). The "record" button 2216 is depressed when the translation or rotation of an icon displayed on the object display area 2102 or the camera (not shown) is followed by the production of a command to execute the translation or rotation. The voice input of "record" is similarly used.

1.3.5 Object Modeling Event Generation Processing 2308 (FIG. 26F)

A mouse input in the object modeling display area 2108 cansels the generation of event data which has "object modeling" stored as the event kind and input information stored as addition information (step 3201). And, the input event processing 2126 (FIG. 20) is activated (step 3202). The generated event data is used for production or modification of an object instance but does not take direct part in the production of a command.

1.4 Keyboard Event Generation Processing 2141 (FIG. 27)

An input by the keyboard 2110 (FIG. 19) is sent to a keyboard event generation processing 2141 for every key operation.

As shown in FIG. 27, in the case where the mouse cursor 2201 is placed on the object modeling display area 2108 (step 3301), there is generated event data which has "object modeling" stored as the event kind and a key code stored as addition information (step 3302).

In the case where the mouse cursor 2201 is not placed on the object modeling display area 2108 and the key code does not include a return code (step 3303), there is generated event data which has "keyboard" stored as the event kind and the key code stored as addition information (step 3304). The key input in a state in which a return code is not inputted is the input of information necessary for command production but is not the final input for command production. Therefore, the addition information of this event data is utilized as data which forms a part of a command to be produced.

In the case where the mouse cursor 2201 is not placed on the object modeling display area 2108 and the key code includes a return code at its end (step 3303), there is generated event data having an event kind field in which "instruction input" is stored and an addition information field which is empty (step 3305). The return code is inputted by the operator as the final information necessary for production of a command, that is, in order to indicate that the input of an instruction code has been completed. Accordingly, this event data indicates that the command is to be perfected by the preceding input data. Thereafter, the input event processing 2126 (FIG. 20) is activated (step 3306).

Figure 24B:
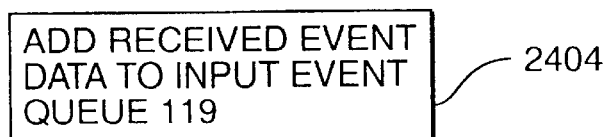

1.5 Input event processing 2126 (FIG. 24B)

When the input event processing 2126 is activated by each of the voice event generation processing 2143, the mouse event generation processing 2140 and the keyboard event generation processing 2141, as shown in FIG. 20, the input event processing 2126 adds the event data 2401 generated by each event generation processing to an input event queue 2119 (step 2404).

The input event queue 2119 is realized as a first-in first-out queue and the input event processing 2126. The input event processing 2126 causes the storage of the event data into the input event queue 2119 from the last of the input event queue 2119. On the other hand, an event dispatch processing 2127, which will be mentioned in the next place, fetches the event data out of the input event queue 2119 from the earlier stored event data. Thereby, the input data is processed in the order of generation without being destroyed or lost.

2. Interpretation and Processing of Input Event

The event data thus stored in the input event queue 2119 are interpreted and processed one by one by the event dispatch processing 2127.

Figure 28:
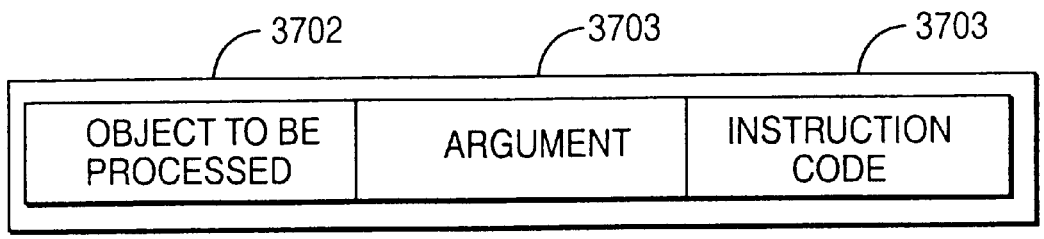
FIG. 28 shows the format of a command.

2.1 Command (FIG. 28)

Figure 35:
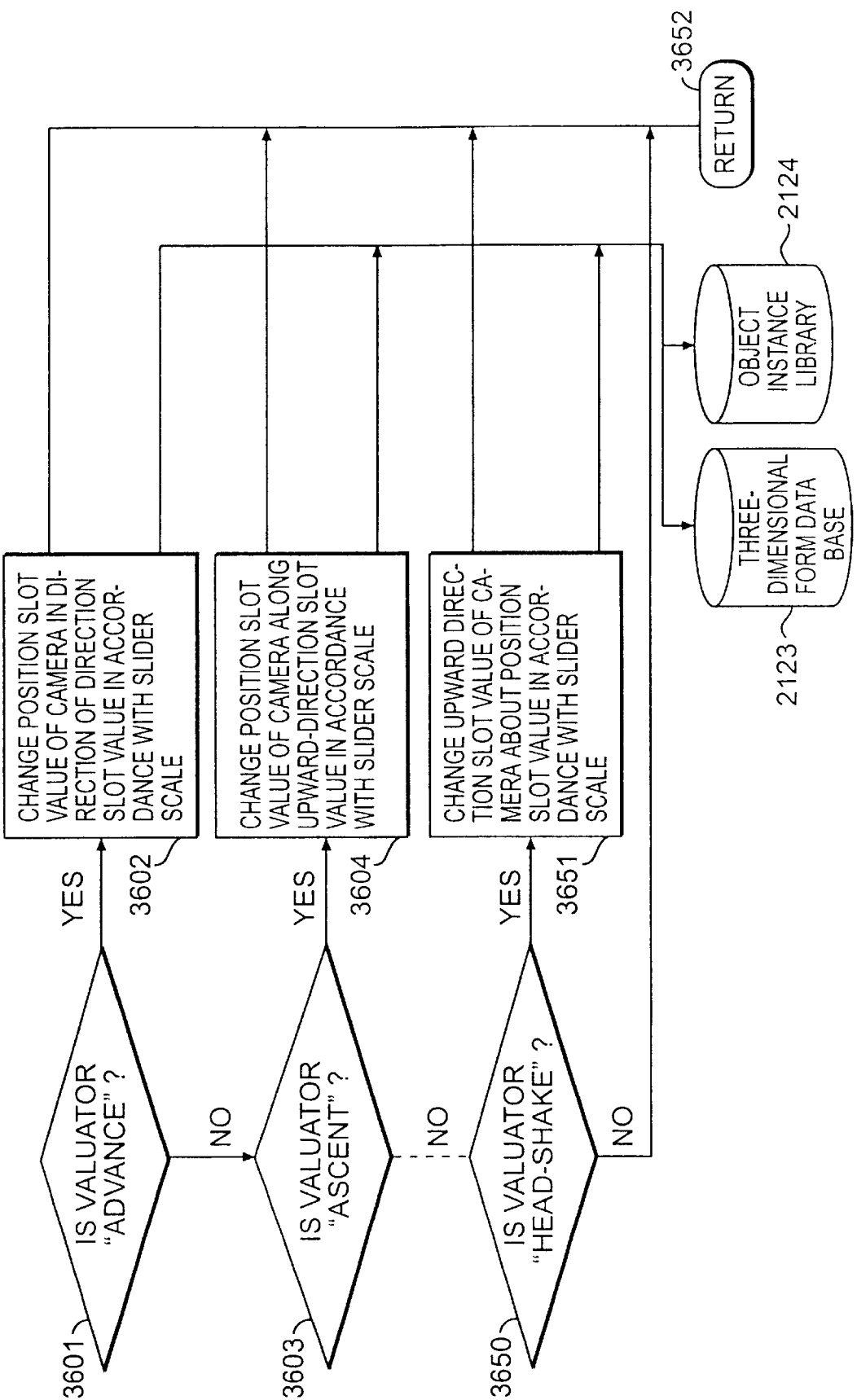

The format of a command 3701 forming a program to be made is shown in FIG. 35. Namely, the command 3701 is composed of three parts each of which includes a character string and which are partitioned from each other by a null character.

(1) A first part 3702 is an object to be processed. This corresponds to a designated object termed in an object oriented model. The name of an object instance to be processed is stored in the part 3702. As this object instance is stored either the name of the object instance of an object itself, the name of a certain constituent element of that object instance, the name of a slot of that object instance, or a character string indicating that a object to be processed is not present. The case of the absence of the object to be processed is limited to a special built-in command.

The name of the constituent element of the object instance is represented by the name of the object instance and the name of the constituent element with a period (.( being interposed therebetween and the name of the slot of the object instance is represented by the name of the object instance and the name of the slot with a sharp (#) being interposed therebetween. Thus, the name is uniquely given in the system.

(2) A second part 3703 is an argument. The argument is composed of an arbitrary number of argument objects. The argument objects are partitioned from each other by a null character. The number of argument objects is different depending on the method. The argument object is either the above-mentioned object instance or an atom. The atom is either an integer, a floating point number or a character string.

(3) A third part 3704 is an instruction code. The instruction code is either the name of a method of the object instance or a built-in instruction command.

The command buffer 2120 is a temporary storage place for the command 3701 and one or plural event data or respective parts of the respective event data are stored in the command buffer 2120 in a front stuffing manner, thereby completing one command.

Event data used for command production is limited to one the event kind of which is either "object selection", "instruction selection" or "keyboard".

Figure 29:
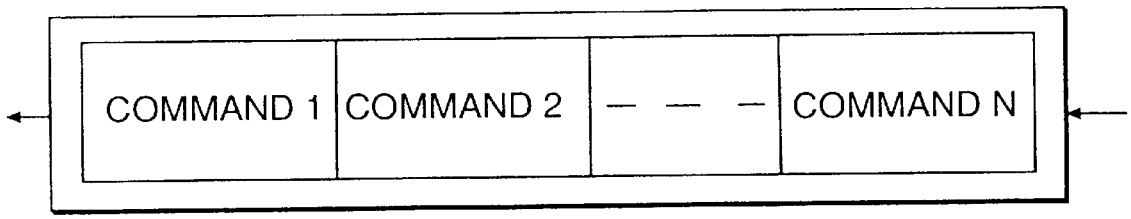
FIG. 29 is a view showing the structure of a command queue.

2.2 Command Queue 2121 (FIG. 29)

As shown in FIG. 29, the command queue 2121 holds as a first-in first-out queue a plurality of commands completed by means of the command buffer 2120. In the case where a new command is to be stored into the command queue 2121, it is added next to the lastly stored command. The fetch of a command from the command queue 2121 is made starting from the earliest stored one of commands stored.

The command queue 2121 may be generated or erased in accordance with the conditions of execution of the program.

Figure 30:
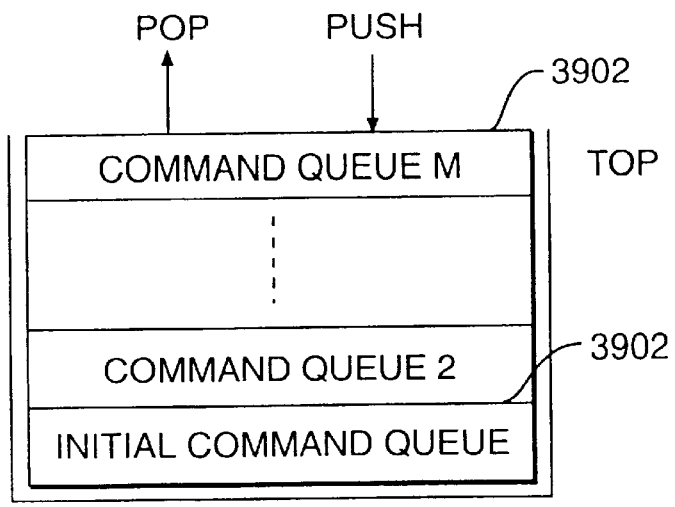
FIG. 30 is a view showing the structure of a command queue stack.

2.3 Command Queue Stack 2122 (FIG. 30)

The command queue stack 2122 is a stack for storing a plurality of command queues 2121, as shown in FIG. 30, and it is prepared with only one in number in the system. The operation for the stack includes a push operation and a pop operation. The push operation is an operation of adding a new command after the lastly pushed command queue and the pop operation is an operation of fetching the lastly pushed command queue.

An initialcommand queue 3903 is placed at the bottom of the stack.

Figure 31:
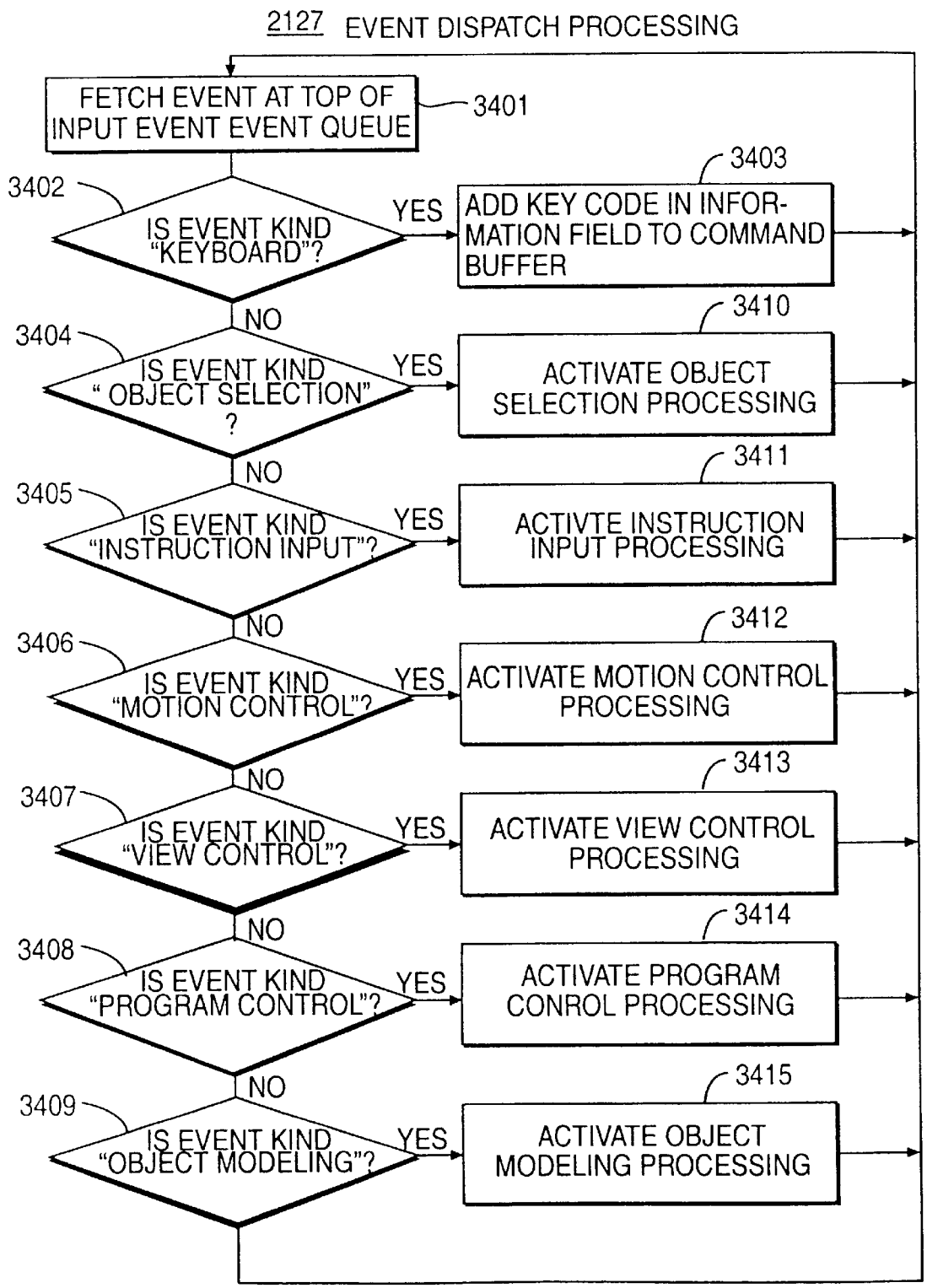
FIG. 31 is a flow chart of an event dispatch processing for interpretation of a user input.

2.4 Event Dispatch Processing 2127 (FIG. 31)

As shown in FIG. 31, the event dispatch processing 127 fetches event data one by one by from the top of the input event queue 2119 (see FIG. 20) (step 3401) and selectively performs the following processings in accordance with the kind of event. In the case where the event queue 2119 is empty, the event dispatch processing 2127 makes nothing.

If the event kind is "keyboard" (step 3402), the event data is data for command production but is not the final data for command production, as has been mentioned in conjunction with the keyboard event generation processing 2309. Namely, the key code in the addition information field of this event data represents an object to be processed or an argument. Accordingly, the key code in the addition information field is stored into the command buffer 2120 (step 3403). The storage location is a vacant region in the command buffer 2120 which lies as forward as possible.

On the other hand, if the event kind is either "object selection", "instruction input", "motion control", "view control", "program control" or "object modeling" (steps 3404 to 3409), an object selection processing 130, an instruction input processing 2131, a motion control processing 2128, a view control processing 2129, a program control processing 2132 or an object modeling processing 133 is activated (steps 3410 to 3415). In the object selection processing 2130 and the instruction input processing 2131, the event data is stored into the command buffer 2120 for command production, as will be mentioned in later.

If step 3403, 3410, 3411, 3412, 3412, 3414 or 3415 has been carried out, the flow is returned to a processing for the leading event data in the input event queue 2119 (FIG. 20).

2.5 Object Selection Processing 2130 (FIG. 32)

When the event kind of event data interpreted by the event dispath processing 2127 is "object selection", the object selection processing 2130 is activated. Such event data is generated when the operator selects an object instance or the like to be used for the object-to-be-processed field or the argument field of a command by means of the mouse, as has already been mentioned.

As shown in FIG. 32, in the object selection processing 2130, a null character is added succeeding addition information in the event data sent from the event dispatch processing 2127 (which information represents the object to be processed or the argument) and the resultant is stored into the command buffer 2120 in a front stuffing manner (step 4001).

2.6 Instruction Input Processing 2131 (FIG. 33)

When the event kind of event data interpreted by the event dispatch processing 2127 is "instruction input", the instruction input processing 2131 is activated. As has already been mentioned, such event data is generated simultaneously with the input of the final information (or an instruction code) in information used for a command to be produced or by an input after that input. Namely, it is generated in response to an input by the operator from the voice input device 2111 or the keyboard 2110.

As shown in FIG. 33, in the instruction input processing 2131, addition information of the event data sent from the event dispatch processing (the last of which information is an instruction code) is stored into the command buffer in a front stuffing manner, thereby completing a command (step 4101). Further, the completed command is added to the last of a command queue at the top of the command queue stack 2122 (step 4102) and the command buffer is cleared (step 4103).

Figure 34:
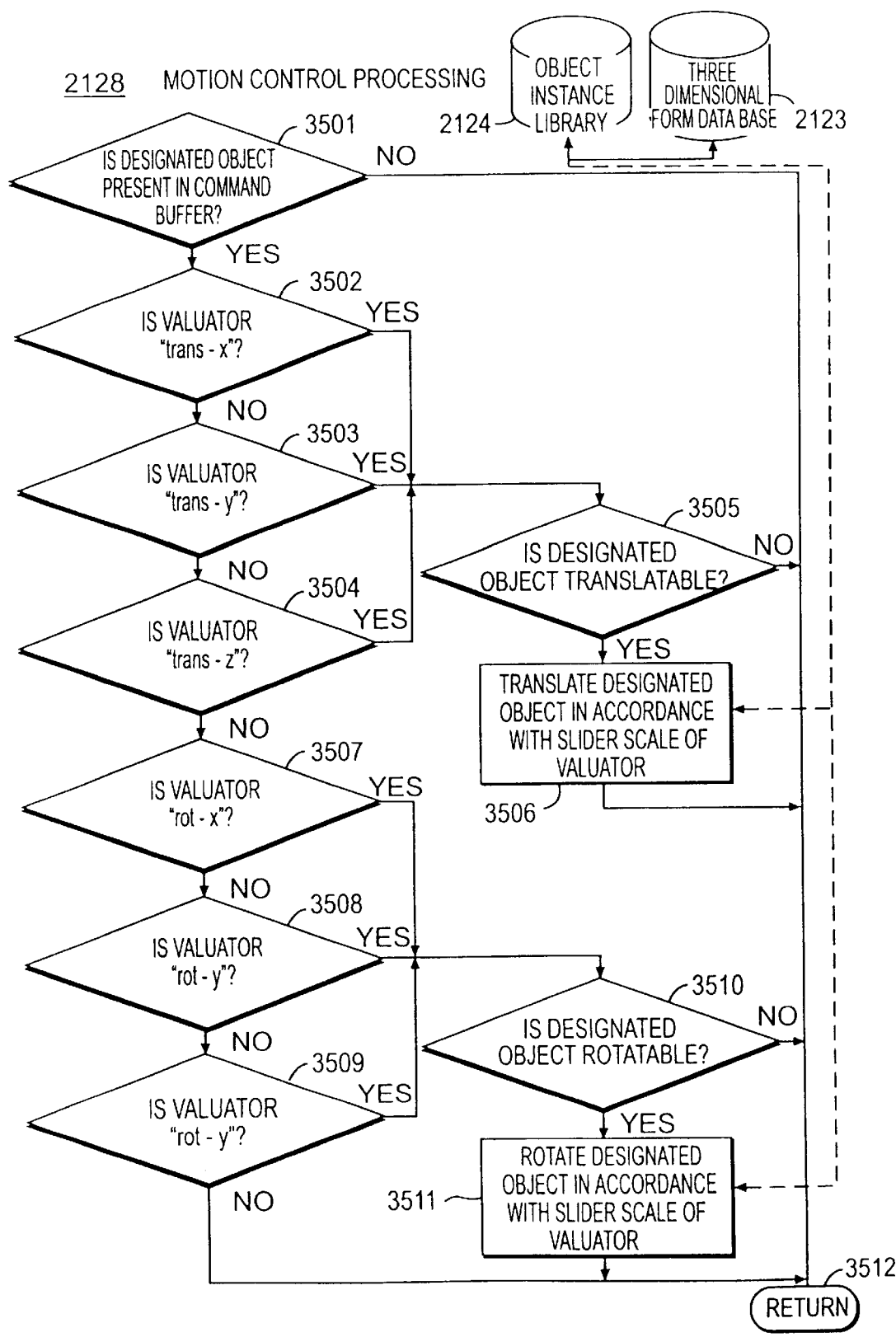

2.7 Motion Control Processing 2128 (FIG. 34)

This processing 2128 is activated when the kind of event data interpreted by the event dispatch processing 2127 is "motion control". As has already been mentioned, such event data is generated when the operator manipulates a valuator in the motion control display area 2103 to translate or rotate an icon in the object display area 2102. As has already been mentioned, object selection for designating an icon to be translated, rotated or transformed (or deformed) must be made prior to the valuation manipulation. In other words, it is required that the name of an object instance to be motion-controlled has already been stored in the objecto-to-be-processed field in the command buffer 5120 as the result of object selection.

In the motion control processing 2128, an icon for an object instance designated by the object-to-be-processed field is translated or rotated in accordance with the valuator name and the amount of translation or the amount of rotation stored in an addition information field of the event data given from the event dispatch processing 2127. The translation or rotation is realized by modifying figure data in the three-dimensional shape data base 2123. (In the case where no object to be processed is stored in the command buffer 2120, the following processing is not performed.)

More particularly, as shown in FIG. 34, in the case where the valuator name is "trans-x" 2217 for translation in x-direction (step 3502), the attribute of an object instance which is an object to be processed is examined referring to the object instance library 2124 (step 3505) and the confirmation of "translatable" is followed by translating an icon corresponding to the object instance designated as the object to be processed in the x-direction (step 3506).

In step 3505, even in the case where the attribute of the object to be processed assumes "not translatable", the following is performed. Namely, if the object to be processed is a constituent element of any object, the attribute of a superordinate element of that constituent element is examined from the object instance library 2124. And, if the attribute of the superordinate element assumes "translatable", the object to be processed is judged as being "translatable" and the object to be processed is translated in step 3506 by translating the superordinate element. In the case where none of superordinate elements of the object are translatable, no processing is performed.

Also in the case where the valuator name is "trans-y" 2218 for translation in y-direction 2218 or "trans-z" 2219 for translation in z-direction, a similar processing performed (steps 3503 to 3506).

In the case where the valuator name is "rot-x" 2220 for rotation about x-axis (step 3507), the attribute of the object to be processed is examined (step 3510) and the confirmation of "rotatable" is followed by rotating the object to be processed about the x-axis in accordance with the value of the valuator (step 3511). In step 3510, even in the case where the attribute of the object to be processed assumes "not rotatable", the following is performed. Namely, if the designated object is a constituent element of any object, the attributes of superordinate elements of the constituent element are examined. And, if a "rotatable" superordinate element is present, the designated object is judged as being "rotatable" and the designated object is rotated in step 3511 by rotating that superordinate element. In the case where none of superordinate elements of the object are rotatable, no processing is performed. The examination of the attribute is made referring to the contents of the object instance library 2124. Also in the case where the valuator name is "rot-y" 2221 for rotation about y-axis or "rot-z" 2222 for rotation about z-axis, a similar processing is performed (steps 3508 to 3511).

2.8 View Control Processing 2129 (FIG. 35)

As shown in FIG. 35, the view control processing 2129 controls the position of a camera (not shown), the horizontal direction of a field of view of the camera or the vertical direction thereof in accordance with the kind of a manipulated valuator and the slider scale of the valuator (steps 3601 to 3604, 3650 and 3651). Six valuators 2230 to 2235 (FIG. 19) means an advance instruction, an ascent instruction, a horizontal-translation instruction, a heat-raise instruction, a heat-shake instruction and a rotation instruction, respectively.

For example, in the case where an advance valuator 2230 is manipulated (step 3601), the position slot value 4791 of the object instance camera 4780 (FIG. 21C) is changed in a direction of the direction slot value 4792 in accordance with the slider scale value which is the value of addition information of the event data (step 3602).

By translating or rotating the object instance camera 4780, it is possible to select a desired view on the object display area 2102. Like the case of the motion control processing 2128, the translation or rotation is made referring to the object instance library 2124 and the three-dimensional form data base 2123 and three-dimensional figure data for the object is updated after the translation or rotation.

Figure 36:
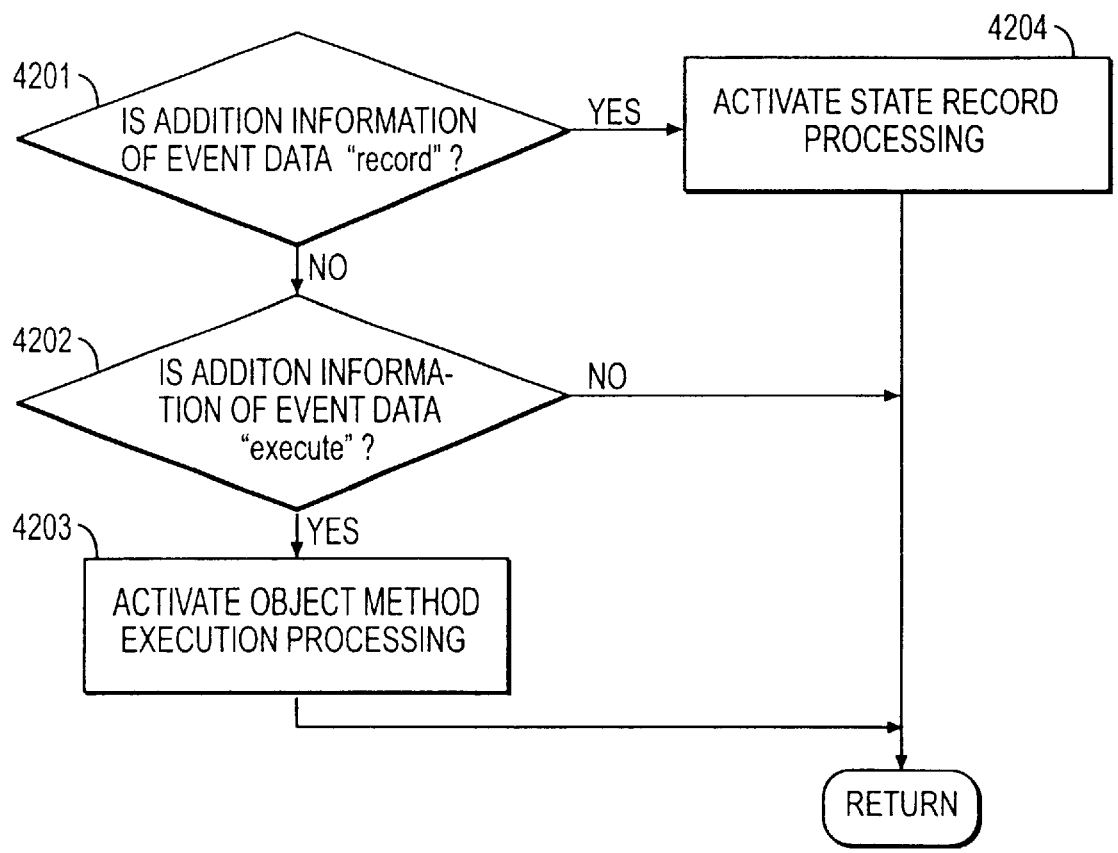

2.9 Program Control Processing 2132 (FIG. 36)

This processing is activated when the data kind in event data interpreted by the event dispatch processing 2127 is "program control". As has already been mentioned, such event data is generated when "record" or "execute" is indicated by a voice input, a mouse input or a keyboard input.

As shown in FIG. 36, the program control processing 2132 activates a state record processing 2134 (FIG. 20) (step 2404) if the addition information in the event data is "record" (step 4201) and activates the object method execution processing 2135 (FIG. 20) (step 4203) if the additional information is "execute" (step 4202).

Figure 37:
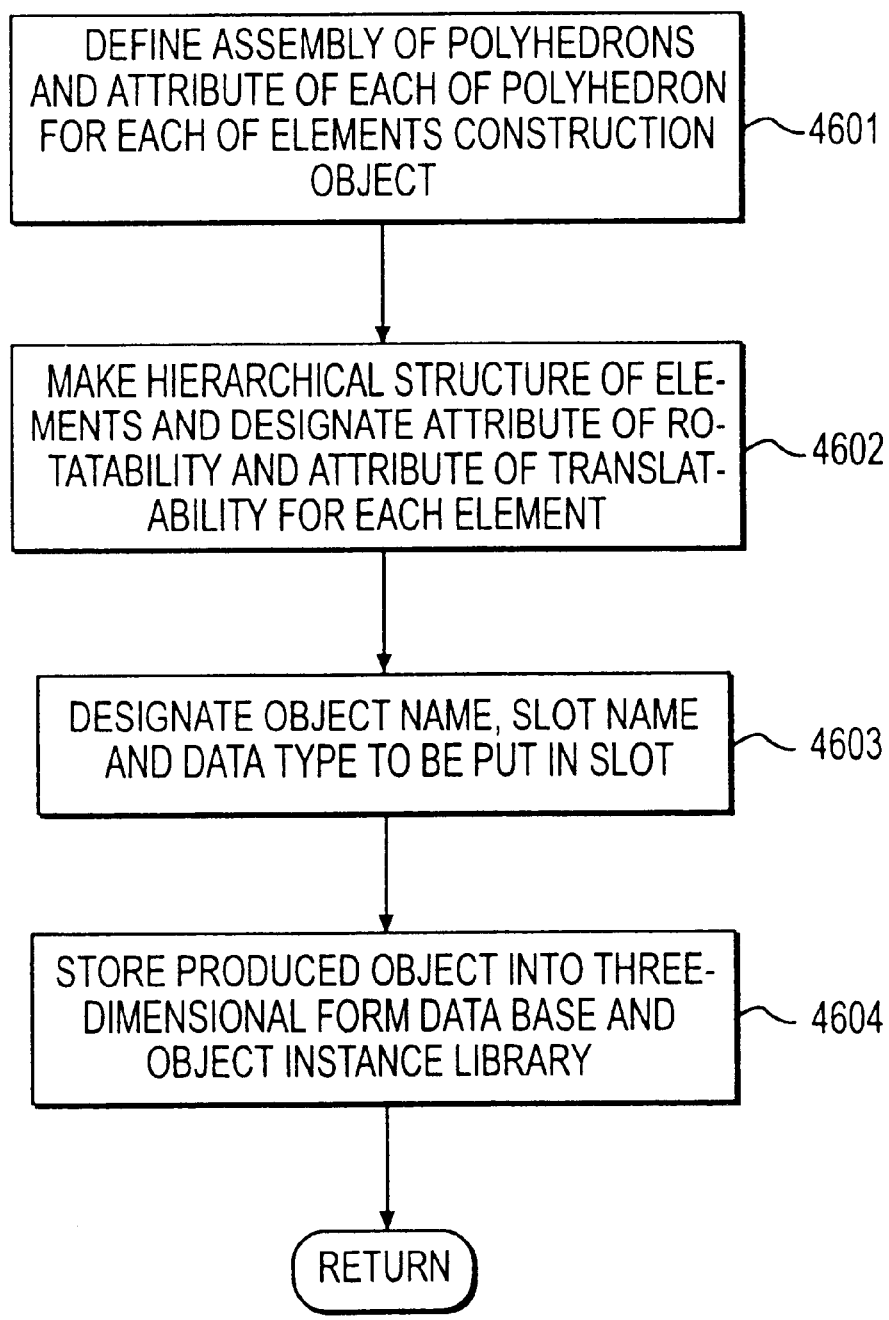

2.10 Object Modeling Processing 2133 (FIG. 37)

This processing is activated when the data kind in event data interpreted by the event dispatch processing 127 is "object modeling". As has already been mentioned, such event data is generated by means of a mouse input when an object is newly defined or modified.

The object modeling processing 2133 is one independent application process. In the object modeling processing 2133, an assembly of polyhedrons representative of each object and the attributes of each polyhedron are newly defined (step 4601 in FIG. 37). Next, this object is hierarchized with a plurality of elements, as exemplified in FIGS. 21A, 21B or 21C, and a new object is defined for each constituent element. At this time, the attribute of translatability and the attribute of rotatability are designated for each constituent element (step 4602). Next, an object name, an object slot name and data type to be put in the object slot are designated (step 4603). Thus produced information concerning a figure representative of the object and information concerning the object itself are stored into the three-dimensional form data base 2123 and the object instance library 2124, respectively (step 4604).

Objects having been defined in the object modeling processing 2133 can be edited at any point of time. For example, if the hierarchy is made so that the receiver 4754 which is a subordinate element of the telephone 4752 is registered as a subordinate element of the right hand (rhand) 4701 which is a subordinate element of the human object 4703 shown in FIG. 21A, the receiver will be moved in accordance with the human hand and as a result, the human's operation of taking the receiver can be realized. A built-in command "link" which will be mentioned in later is realized in this manner.

The name, form and attribute of an object defined in the object modeling processing 2133 are respectively displayed on regions 2236, 2237 and 2238 of the object modeling display area 2108 (see FIG. 19). In the case where a previously defined method exists for that object, the name of the method is displayed on a region 2239.

Figure 38:
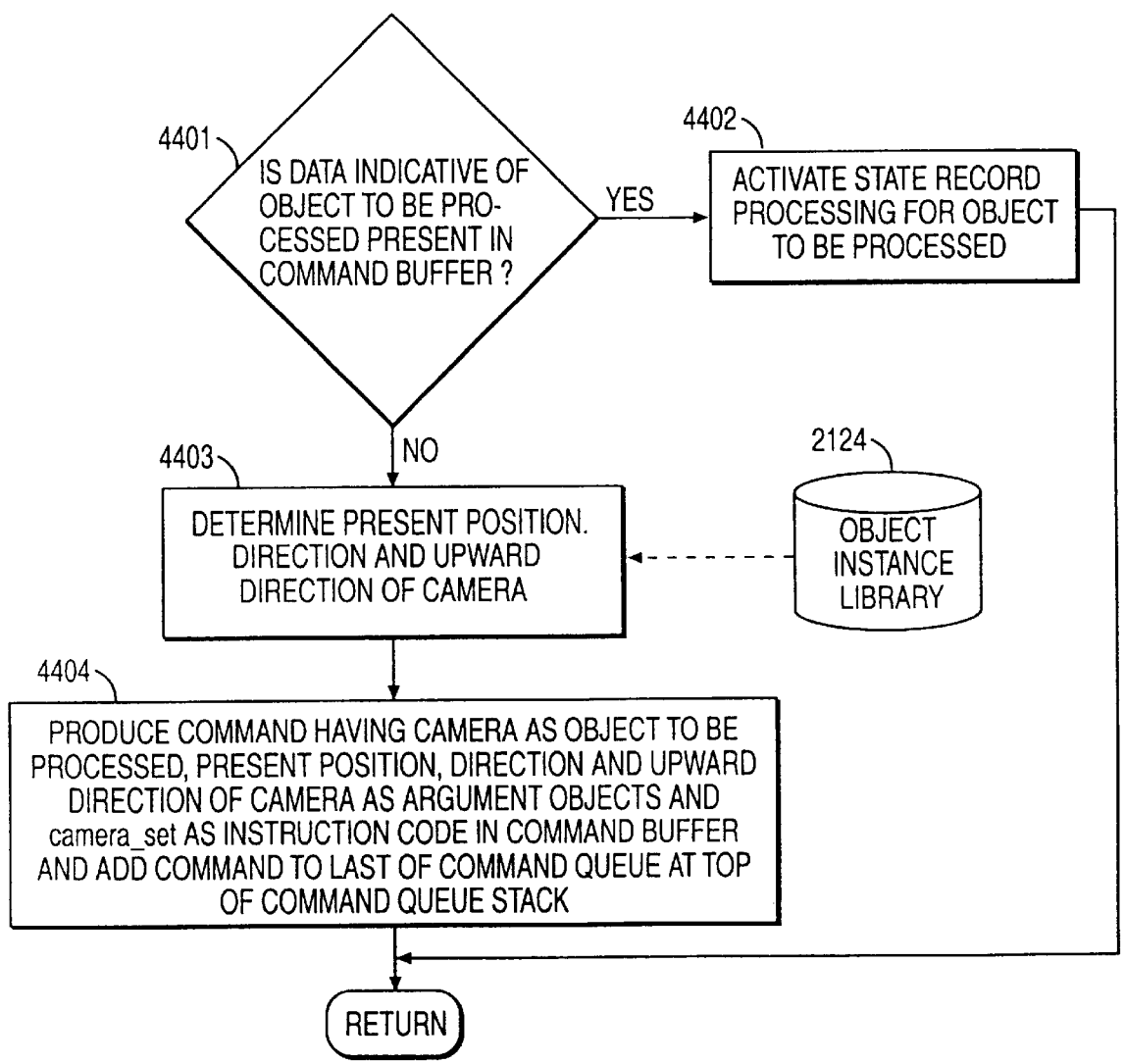
FIGS. 38 and 39 are flow charts concerning a state record processing activated by a program control processing.

3. State Record Processing 2134 (FIG. 38)

Figure 39:
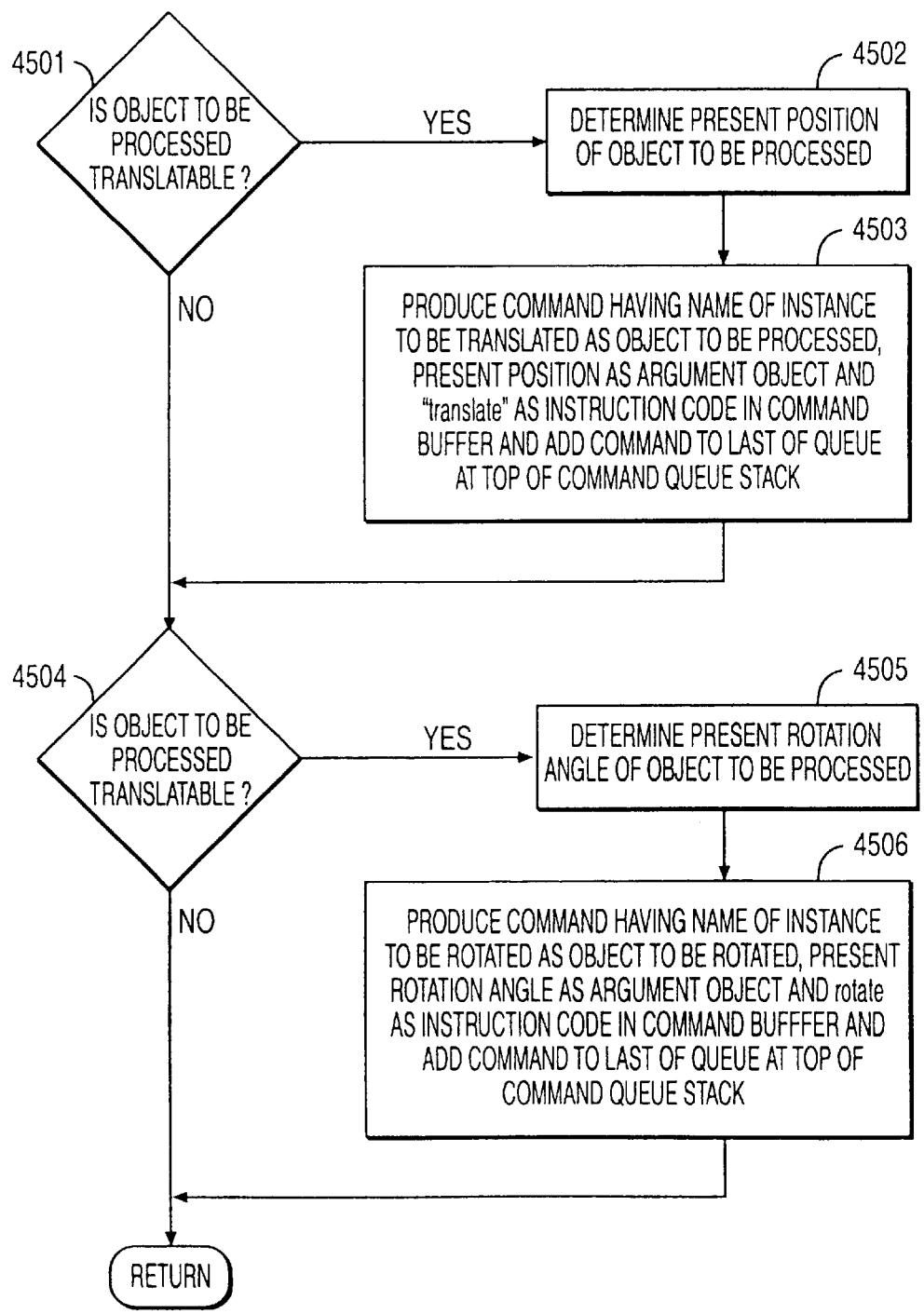

As has already been mentioned, this processing is activated by the program control processing 2132 when the record of a command having been produced is instructed by the operator. In the state record processing 2134, the examination is made of whether or not data indicative of an object to be processed is present in the command buffer 2120 (step 4401). In the case where the data indicative of the object to be processed is present, a state record processing 2210 for object to be processed (FIG. 39) is activated (step 4402). This data is not present in the case where the record of the present state is instructed by the operator after the field of view of the camera (not shown) has been changed by use of the view control display area 2104. In this case, the state of the object instance camera is recorded. Namely, the present state (position, direction and upward direction) of the camera (not shown) manipulated through the view control processing 2129 is examined referring to an instance 4780 (FIG. 21C) in the object instance library 2124 for the camera (step 4403). And, a command for setting of the field of view of the camera is produced by storing the camera object instance 4780 as an object to be processed, the present position, direction and upward direction of the camera as arguments and "camera_set" as an instruction code into the camera buffer 2120 and this command is added to the last of a leading command queue in the command queue stack 2122 (step 4404). The instruction code "camera_set" is an instruction code for a built-in instruction which directs the camera (not shown) corresponding to the camera object instance in a direction designated by the argument of the command.

On the other hand, the judgement step 4401 shows the presence of the data indicative of the object to be processed in the command buffer 2120 when prior to the instruction of the record of the present state the operator instructs the translation or rotation of the icon in the object display area 2102 by a mouse input using the motion control display area 2103 (FIG. 19). Accordingly, when the state record processing 2240 for object to be processed is activated, whether nor not the object to be processed which is indicated by data in the command buffer 2120 is translatable and whether or not the object to be processed is rotatable are examined on the basis of attribute data concerning the object instance of the object to be processed (steps 4501 and 4504 in FIG. 39).

In the judgement on the translatability or rotatability, a translatable or rotatable one is selected as an object to be translated or rotated among an object instance of the object to be processed and object instances which are subordinate elements of the object to be processed, as has been mentioned in item 2.7 Motion Control Processing 2129. In the case of "translatable" or "rotatable", the present position of the selected object instance to be translated or the present rotation angle of the selected object instance to be rotated is determined (step 4502 or 4505). For the translation or rotation, the object instance to be translated or rotated, the determined present position or rotation angle and a special instruction code "translate" or "rotate" are stored into the command buffer 120 to produce a command for translation or rotation and the produce command is added to the last of a leading command queue in the command queue stack 2122 (step 4503 or 4506).

By the above processing, the command to execute the translation or rotation can be embedded or incorporated into the program.

4. Execution of Object Method

In the present system, the execution of the object method and the programming of the object method can be carried out simultaneously. System elements for realizing this purpose will now be described.

Figure 40:
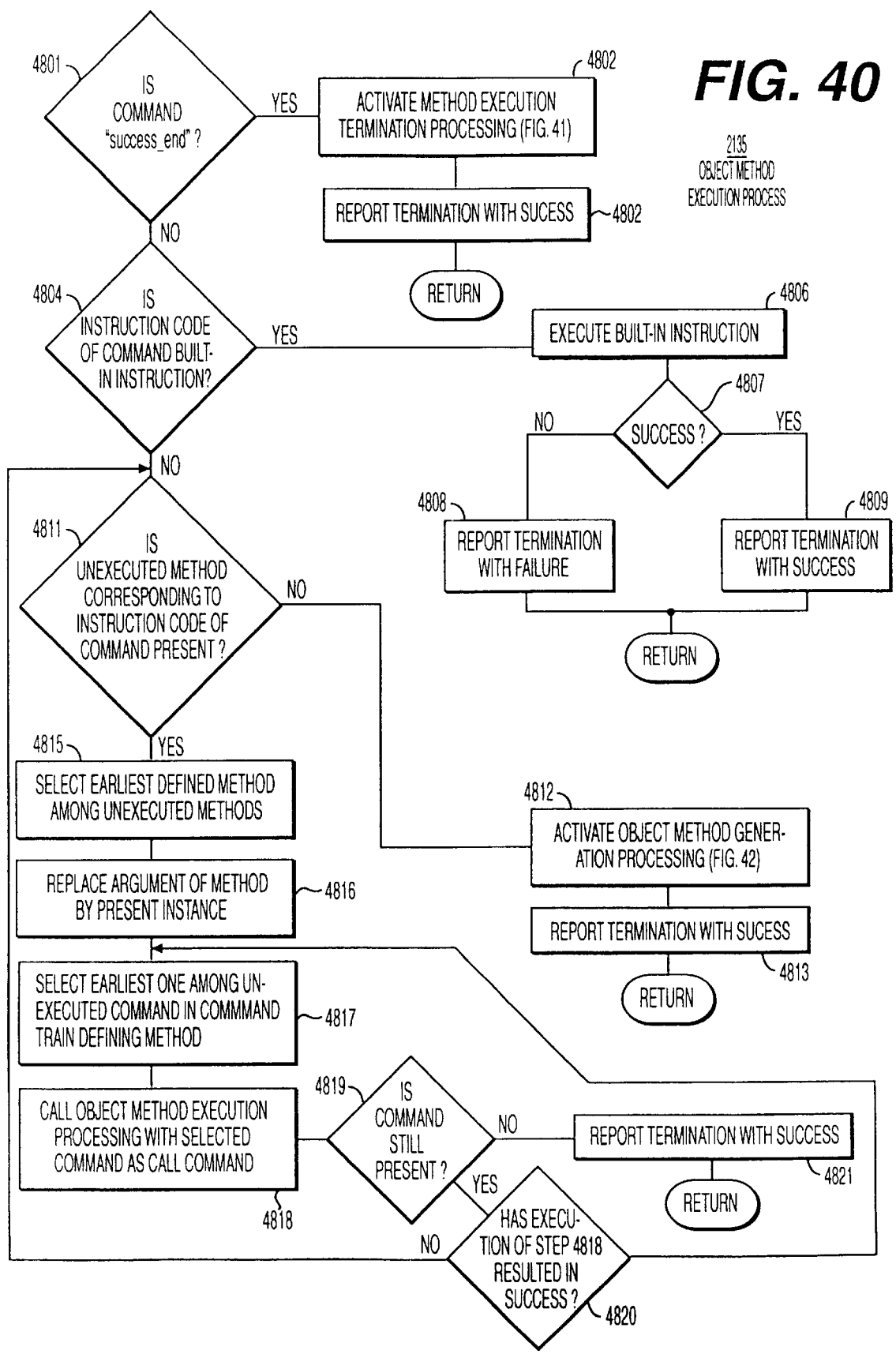

4.1 Object Method Execution processing 2135 (FIG. 40)

As shown in FIG. 40, when the object method execution processing 2135 is activated, the following processing is performed in accordance with a called command (or a command which is an object of this processing).

(1) If the execution of consecutive commands previously produced results in a success or the called command is a command "success_end" indicating the termination of execution of the program (step 4801), a method execution termination processing 2240 (FIG. 41) is activated (step 4802) and the termination with success is reported (step 4803), thereby returning the control.

(2) When the called command is not "success end", the examination is made of whether or not an instruction code of the command is a built-in instruction code (step 4804). If the instruction code is the built-in instruction code, the built-in instruction is executed using a program library which is preliminarily defined for that instruction (step 4806). If the execution results in a success (step 4807), the termination with success is reported (step 4809), thereby returning the control. On the other hand, if the execution results in a failure, the termination with failure is reported (step 4808), thereby returning the control.

In the case where the called command is not "success_end" and the instruction code of the command is not a built-in instruction code, that command is one which was defined by a user or one which is to be defined from now on. The following processing is performed.

(1) The examination is made of whether or not an unexecuted method is present in methods previously defined for an object instance designated by the object-to-be-processed field of the command (step 4811). If any unexecuted method is not present, an object method generating processing 2240 (see FIG. 42) is activated (step 4812) and the termination with success is reported (step 4813), thereby returning the control. On the other hand, if any unexecuted method is present, it is meant that this method is defined by the user and hence the flow proceeds to the next step in order to execute te method.

(2) The first or earliest defined one is selected among methods defined by the user for the object (step 4815). For the purpose of this selection, when a plurality of methods are defined for each object, they are placed in the object instance library in the order of definition. An object instance designated as an argument of the selected method is called and is replaced by the object instance of the command (step 4816).

(3) The first or earliest one is selected among unexecuted commands in a command strain defining that method (step 4817) and the object method is executed with this command as the called command (step 4818).

(4) The examination is made of whether or not any unexecuted command is still present for that method (step 4819). If any unexpected command is not present, it is meant that the execution of the method has normally been completed and hence the termination with success is reported (step 4821), thereby returning the control. On the other hand, if any unexecuted command is present, the method is uncompleted and the flow proceeds to the next step.

(5) The result of execution is (3) or object method execution in step 4818 is examined (step 4820). If the execution results in a success, it is meant that the execution is satisfactorily advancing and the flow is returned to (3). On the other hand, if the execution results in a failure, the executing is encountering any hindrance and hence the flow is returned to (1) in order to remove the hindrance.

4.2 Method Execution Termination Processing 4301 (FIG. 41)

In the case where the method execution termination processing 2301 is activated by the method execution processing 2135 because the command as the object to be executed is "success_end", the following processing will be performed in accordance with the called command, as shown in FIG. 41.

The examination is made of whether or not the called command corresponds to a command queue at the top of the command queue stack 2122 (step 4302). If not so, the control is returned. If so, the following processing is performed.

A method included in the command on top of the command queue stack 2122 is added to object data corresponding to the designated object as a method (step 4303). Next, the command queue stack 122 is popped to erase an object instance created during the time when the popped command queue is at the top of the command queue stack 122, and a method programming display area corresponding to the command is erased (step 4304), thereby returning the control.

4.3 Object Method Method GENERATION Processing 2240 (FIG. 42)

As shown in FIG. 42, the following processing is performed.

A command queue corresponding to the called command is newly produced and is pushed into the command queue stack 2122 (see FIG. 20) (step 4910). Also, a method programming display area corresponding to the method of the called command is produced (step 4921). Further, the name of the method, the designated object and the name of an object to which the designated object belongs, and an argument and the name of an object to which the argument belongs are displayed on the produced display area (step 4930), thereby returning the control.

4.4 Built-in Instruction Execution Processing 4806

A list of built-in instructions 5001 are shown in FIG. 43. The figure shows an object 5002 which is an object of a built-in instruction, a required argument 5003, a built-in instruction 5004, and a function 3004 attained when the instruction is executed. The actual object or argument is either an instance of the object or an atom.

C. Description of Operation

Now, the making of a program according to the present embodiment will be explained by use of specific example. In a first example, a program for call-up or telephoning is made. In a second example, there is made a program which make a communication with a large size general purpose computer to utilize an application program existing on the computer. In any example, a command to instruct an action or motion to be taken by a human icon 5102 is inputted as a command for the program and this command is executed, thereby causing the human icon 5102 to take the motion. This command train is stored into the human object instance library as one method which the human object executes.

1. Generation of Program for Call-up

In the present example, a program (or method) for call-up is produced. A method name allotted as a method for the human object assumes "call".

a. Command Input

Figure 44A:
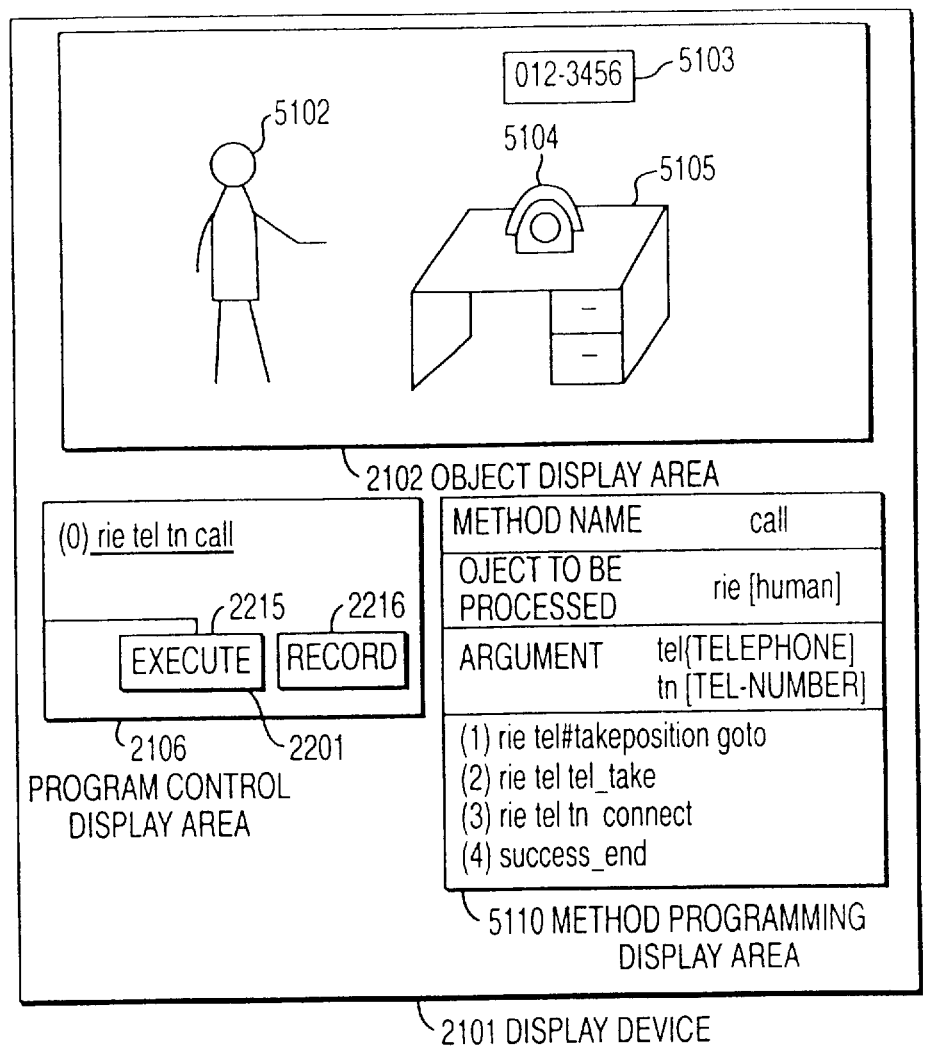
FIGS. 44A and 44B, 45A and 45B, 46A to 46C, 47A and 47B, 48A to 48C, and 49A and 49B are views for explaining the second embodiment by virtue of specific examples, more particularly, states on a display device and main states on a main memory.

In an initial state, the object display area 2102 assumes a state as shown in FIG. 44A.

The human icon 5102 (FIG. 19) represents the human object 4701 shown in FIG. 21A and the telephone icon 5104 (FIG. 20) represents the telephone object 4750 shown in FIG. 21B. In the following, it is assumed that a telephone number (tel-number) object which has not yet been explained has already been defined in the initial state. An icon 5103 representing this telephone number object takes a rectangular shape and has a telephone number as a slot value. The instance name of the human object assume "rie", the instance name of the telephone object assumes "tel", and the instance name of the telephone number object assumes "tn".

In the following, these names are used as the names of icons representing the corresponding objects.

Figure 44B:
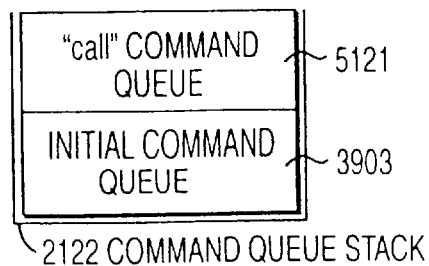

The human icon 5102 is at any place away from the telephone icon 5104 and a receiver of the telephone icon 5104 remains resting. A number 012-3456 is displayed in the telephone number icon 5103. Only an initial queue 1903 shown in FIG. 44B is present in the command queue stack 2122 in the main memory 2112.

Now, a user inputs a command (0) "rie tel tn call" in order to cause the human icon 5102 to telephone. Here, the character strings other than "call" represent objects to be processed and "call" is a method name.

(a-1) Input of Object to be Processed and Argument of Command

In the following, "object to be processed" means the object-to-be-processed field of a command so long as notice is not given or it is not unnatural contextually.

For the purpose of inputting the command (0) "rie tel tn call", the operator inputs, "rie", "tel" and "tn" which are objects to be processed, as character strings in this order by means of the voice input device 2111, the mouse 2109 or the keyboard 2111.

(a-1-1) Case of Voice Input

For example, in order to input the character string by means of a voice, the operator utters "rie" toward the voice input device 2111 (FIG. 19). The voice is sent from the voice input device 2111 to the voice recognition processing 2142 (FIG. 20) which in turn extracts the nearest candidate voice data from the candidate voice data base 2125 (step 2601) and activates the voice event generation processing 2143 (step 2603). In the voice event generation processing 2143, the extracted candidate voice data is received to confirm that the data kind of the candidate voice data is an object instance name (step 2701), there is generated event data the event kind of which is "object selection" and the addition information of which is the copy of a character string region "rie" of that candidate voice data (step 2702), and the input event processing 2126 is activated (step 2709). In the input event processing 2126, the received event data is added to the input event queue 2119 (FIG. 20).

The above candidate voice data is produced in the following manner when the human icon 5102 is defined in advance as an instance of the human object 4701. Namely, simultaneously with the input of the name of that instance by the operator from the keyboard when the definition is made, the system requests a voice input of the same name. When the operator makes the voice input of the name, the voice input is stored as the contents of candidate voice data in the candidate voice data base 125 for "rie".

The event dispatch processing 2127 (FIG. 20) is operative in parallel to the input by the operator and processes event data in the input event queue 2119. In the present example, since the event kind of event data for "rie" is "object seletion", the object selection processing 2130 (FIG. 20) is activated so that addition information "rie" and a null are stored into the command buffer 2120 (step 4001 in FIG. 32).

(a-1-2) Case of Mouse Input

In order to input "rie" by means of the mouse 2109 (FIG. 19), the mouse cursor 2-1 (FIG. 19) is brought onto the body of the human icon 5102 displayed on the object display area 2102 and a mouse button (not shown) is depressed. Thereby, the object selection event generation processing 2304 is activated (see FIG. 26A). As shown in FIG. 26B, in the object selection event generation processing 2304, the depression of the mouse button (on the human icon 5102) is confirmed referring to the position of the mouse cursor 2201 and the three-dimensional form data base 2123 (FIG. 20) (step 2801), there is generated event data in which "object selection" is stored as the event kind and a character string "rie" is stored as addition information (step 2802), and the input event processing 2126 is activated (step 2803). In the input event processing 2126, the sent event data is added to the input event queue 2119.

Like the case of the voice input, when this event data is thereafter dispatched, "rie", and a null are stores in to the command buffer 2120.

(a-1-3) Case of Keyboard Input

In the case where "rie" is to be inputted by means of the keyboard 2110 (FIG. 19), the mouse cursor 2201 is placed at a location other than the object modeling display area 2108 (FIG. 19) and "r", "i" and "e" are typed as they are. For each key input, the keyboard event generation processing 2309 (FIG. 20) is activated. As shown in FIG. 27, in the keyboard event generation processing 2309, the judgment steps 3301 and 3303 are followed by the generation of event data in which "keyboard" is stored as the event kind and key codes supplied from the keyboard are stored as addition information (step 3304) and the activation of the input event processing 2126 (step 3306). In the input event event processing 2126, this event data is added to the input event queue 2119.

In the case where event data for such as input is thereafter dispatched, key codes in the event data are inputted into a vacant area of the command buffer 2120 in order from the front thereof as they are. In the present example, the name "rie" of the object to be processed is stored into the command buffer 2120 from the respective event data for "r", "i" and "e".

Thus, in order to permit the input of a command even if either the voice input, the mouse input or the keyboard input is used, each input is converted into data having a common form.

Through the foregoing processing, the object "rie" to be processed which is to included in the command to be inputted has been stored. Subsequently, object "tel" and "tn" to be processed are added to the command. This operation is carried out in a similar manner to the case of the input of "rie". As regards the object selection, the same holds for the subsequent command inputs. In this manner, "rie tel tn" has been stored in the command buffer 2120.

(a-2) Input of Method Name

Subsequently, the name "call" of the method to be newly defined is inputted from the keyboard 2110. Since this method is one newly used in the system, only the keyboard 2110 permits to make this input. In a similar manner to the foregoing, event data is generated in response to the input and is stored into the input event queue 119. Subsequently, a return code is key-inputted as the indication or instruction of command input in order to input the termination of the input of one command. Then, the keyboard event generation processing 2141 generates event data having "instruction input" as the event kind and null addition information (steps 3303 and 3305 in FIG. 27) and activates the input event processing 2126 which in turn adds the event data to the input event queue 2219. In the event dispatch processing 2127, since the event kind of this event data is "instruction code", the instruction input processing 2131 is activated (steps 3405 and 3411 in FIG. 31). In the instruction input processing 2131, the contents of the command buffer 2120 are added to the initial command queue 3903 and the command buffer 2120 is cleared (steps 4102 and 4103 in FIG. 33). Thereby, the command (0) "rie tel tn call" has been sent to the initial command queue 3903. Thus, the inputted character string is temporarily stored in the command buffer 2120 and the instruction of command input is thereafter given by the user so that the character string inputted and stored till then is used as one command.

In this example, the input of the method has been made by the keyboard. However, even if the method is an undefined method, the input by a voice is possible by preliminarily storing candidate voice data 2501 representative of the method name. Namely, a voice representative of this method name, an object method and "call" are stored into the voice data field 2502, the data kind field 2503 and the character string field 2504 of the candidate voice data 2501. With such a construction, when the method name "call" is inputted by virtue of a voice after the argument of the command (0), event data the event kind of which is "instruction input" is generated in the voice event generation processing 2143 (FIG. 25B) from candidate voice data extracted in the voice recognition processing 2142 (FIG. 25A). The generated event is equivalent to an event generated by "call+return code" which is the above-mentioned key stroke of the method name input by the keyboard. As has already been mentioned, in the case of the object-to-be-processed field or the argument field of a command, an inputted voice is stored into the command buffer since the kind of data in candidate data for the inputted voice is "object instance". As mentioned above, however, since a voice input representative of a method can be handled as the last of a command to be inputted, candidate data for such a voice input can be turned to one command in combination with candidate data for a voice which has already been inputted.

If whether or not the input of a command is completed is judged by discriminating the kind of a voice inputted by the operator in the above-mentioned manner, it is not necessary for the operator to input any special input such as a return code. It is of course that for a previously defined method the above-mentioned voice input can be applied as it is.

A character string stored in the initial command queue 1903 in the above-mentioned manner is displayed together with a command number of the program control display area 2106 (see FIG. 44A).

In the following, it is assumed that the command input is made by use of the above-mentioned method.

b. Execution of Command

The operator brings the mouse cursor 2201 onto the "execute" button 2215 on the program control display area 2106 (FIG. 19) and depresses the mouse button (not shown). For event data generated by this operation, the event dispatch processing 2127 activate the program control processing 2132 (FIG. 20) and the object method execution processing 2135 is activated in the course of execution of the processing 2132 (step 4203 in FIG. 36). Now, a command queue 2121 at the top of the command queue stack 122 is the initial command queue 3903 (FIG. 44B), a leading command in the initial command queue 3903 is the above-mentioned command (0) and the method "call" has not yet been defined. However, irrespective of whether or not the method in the command is one which has already been defined, the system activates the object method execution processing 2135 which executes the command.

In the object method execution processing 2135, the object method generation processing 4812 is activated (step 4812 in FIG. 40) since the instruction code is not "success_end" (step 4801), is not a built-in instruction (step 4804) and has not yet been registered as a method for the designated object human (step 4811).

As shown in FIG. 42, the object method generation processing 4812 creates or produces a new "call command queue 3903 corresponding to the command (0) (that is, an area queue for storing a character storing to be included in the method "call" requested by this command) and pushes it into the command queue stack 2122 (step 4910). Also, the processing 4812 produces the corresponding method programming display area 5110 (step 4920) and displays on the method programming display area the method name "call", a set "rie [human]" of the designated object and an object to which the designated object belongs, and the sets "tel [telephone]" and "tn [tel-number]" of arguments and objects to which the arguments belong (step 4930). The above is a preparatory processing for defining the new method.

Subsequently, the operator inputs each of commands forming the method "call" and causes the execution of the command. In the shown example, the following commands are programmed:

(1) to cause the human to go to the position of the telephone—rie tel#position goto;
(2) to cause the human to take the telephone—rie tel tel_take;
(3) to cause the human to telephone to a given telephone number—rie tel tn connect; and
(4) to result in a success if the above has been accomplished—success_end.

The operator successively inputs the above commands (1) to (4). Here, # represents the slot value of an object instance. The command (1) to (4) are added to a "call" command queue 5121 in order. The commands stored in the "call" command queue 5121 are displayed on a corresponding method programming display area 5110 each time one command is stored.

When the mouse button is depressed with the mouse cursor 2201 being brought onto the "execute" button 2215 (FIG. 44A) on the program control display area 2106, the command (1) at the head of the command queue 5121 corresponding to the "call" method is executed through the object method execution processing 2135.

Since the method "goto" is to "success_end" (step 4801), is not a built-in instruction (step 4804) and is not defined for the human object (step 4811), the object method generation processing 4812 is performed. Namely, the "call" method programming is temporarily interrupted and the "goto" method programming is performed. Therefore, even during the object method generation processing 4812, a "goto" command queue 5020 (FIG. 45B) is formed at the top of the command queue stack 2122 (step 4910 in FIG. 42).

Further, a method programming display area 5210 for the "goto" method or command stored in the"goto" command queue 5020 shown in FIG. 5210 is produced in a form superimposed on the method programming display area 5110 for the "call" method (step 4911). Like the case of the display area 5110, a method name, an object to be processed, an argument and so forth are displayed on the programming display area 5210 (step 4910). Thus, the queues in the command area queue stack 2122 are correctly reflected onto the method programming display areas.

The "goto" method is a program which causes the human to translate to a certain position. In the shown example, the following train of command are inputted:

(10) to produce a temperature object instance to store a distance—dist scalar a create;

(11) to produce a temporary object instance to store a direction—dir vector a create;

(12) to examine a distance between "rie" and "tel"—rie tel # position dist getdistance;

(13) to examine a direction of "tel" seen from "tel"—rie tel # take position dir getdistance;

(14) to cause "rie" to direct to the direction of "tel" on the basis of the result of (13)—rie dir rotate;

(15) to cause "rie" to walk by the distance of (1)—rie dist walk;

(16) to cause "rie" to direct to the direction of the telephone—rie tel # direction rotate; and

(17) to terminate the "goto" method in the case where the above results in a success—success_end.

Figure 45A:
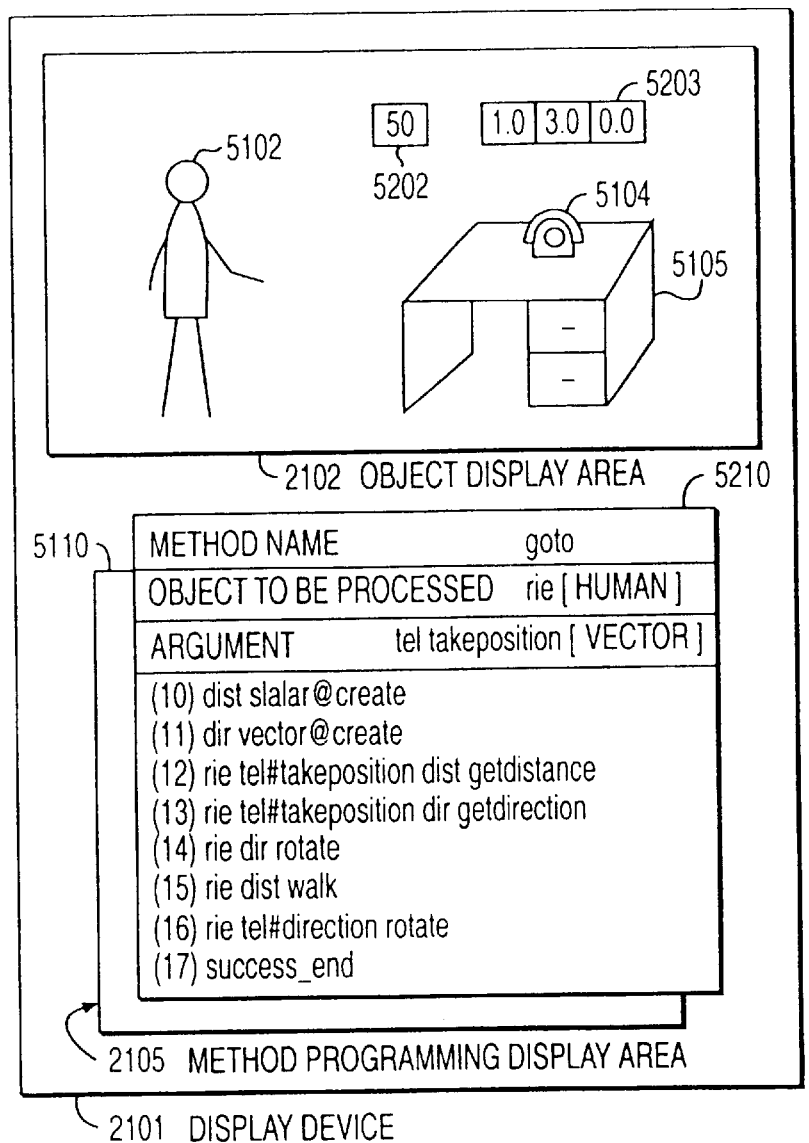
Figure 45B:
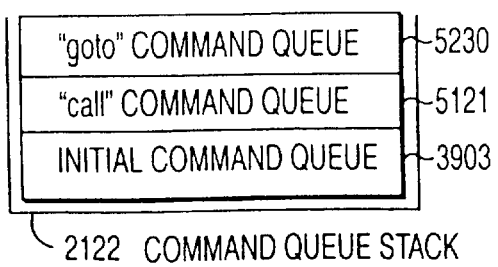

The commands (10) and (11) are commands to produce a distance object to store the distance "dist" (in a scalar quantity) between the human icon 5102 and the telephone icon 5104 and a direction object to store a direction "dir" (in a vector quantity) of the telephone seen from the human. In the present embodiment, the command to produce an object is "(object name) a create" and is a built-in command. In FIG. 45A, reference numerals 5202 and 5203 designate icon representing the distance object and the direction object, respectively and those icons are displayed in accordance with the definition of those objects. When such objects are produced, the names (dist, dir) of the respective objects are inputted by voices. And, the inputted voice, "object instance" and a character string ("dist", "dir") representative of each name are recorded into the voice data field, data kind field and character string data field of candidate voice data, respectively and are stored into the condidate voice data base. In the commands (12) and (13), the values of the above-mentioned distance "dist" and direction "dir" are stored in the temporary object instances produced by the commands (10) and (11) by use of the built-in instructions "getdistance" and "getdirection". In the command (14), the human icon 3102 is rotated by thedirection "dir". In the command (15), the human icon 5102 is caused to walk by the distance "dist". Next, in the command (16), the human icon 5102 is directed to the direction of the telephone. Finally, in the command (10), "success_end" is added.

The above command train is stored into the "goto" command queue area 5230 after the input of the last command (17). Next, when the execution is instructed, the commands in the command queue 5230 are successively executed by the program execution processing 2135 (FIG. 40). Of the execution proceeds to "success_end" with no factor which causes any failure (step 4801), a method execution termination processing 4301 for the "goto" method is performed (step 4802). In the method execution termination processing 4301, the top of the command queue stack 2122 is examined (step 4302 in FIG. 41). Since the command queue under consideration is the "goto" command queue 5230, the command train in this "goto" command queue 5230 is stored as a "goto" method (step 4303). The command queue stack 2122 is popped to erase the "goto" method programming display area 5210. The "dist" 5202 and "dir" 5203, which are temporary data produced for the description of the "goto" method, are erased from the object instance library 2124, the three-dimensional form data base 2123 and the object display area 2102 (step 2304).

At this point of time, the top of the command queue stack reverts to the "call" queue 5121. The remaining commands in the "call" command queue 5121 are (2) "rie tel tel_take", (3) "rie tel tn connect" and (4) "success_end". Namely, the temporarily interrupted "call" method programming is resumed from this state.

When the execution is instructed again, the leading command (2) in the "call" command queue 5121 is executed. Since the "tel_take" method is not defined for the designated object "human", the object method generation processing 4812 is performed. Namely, the "call" method programming is interrupted again to carry out a "tel_take" method programming.

Figure 46A:
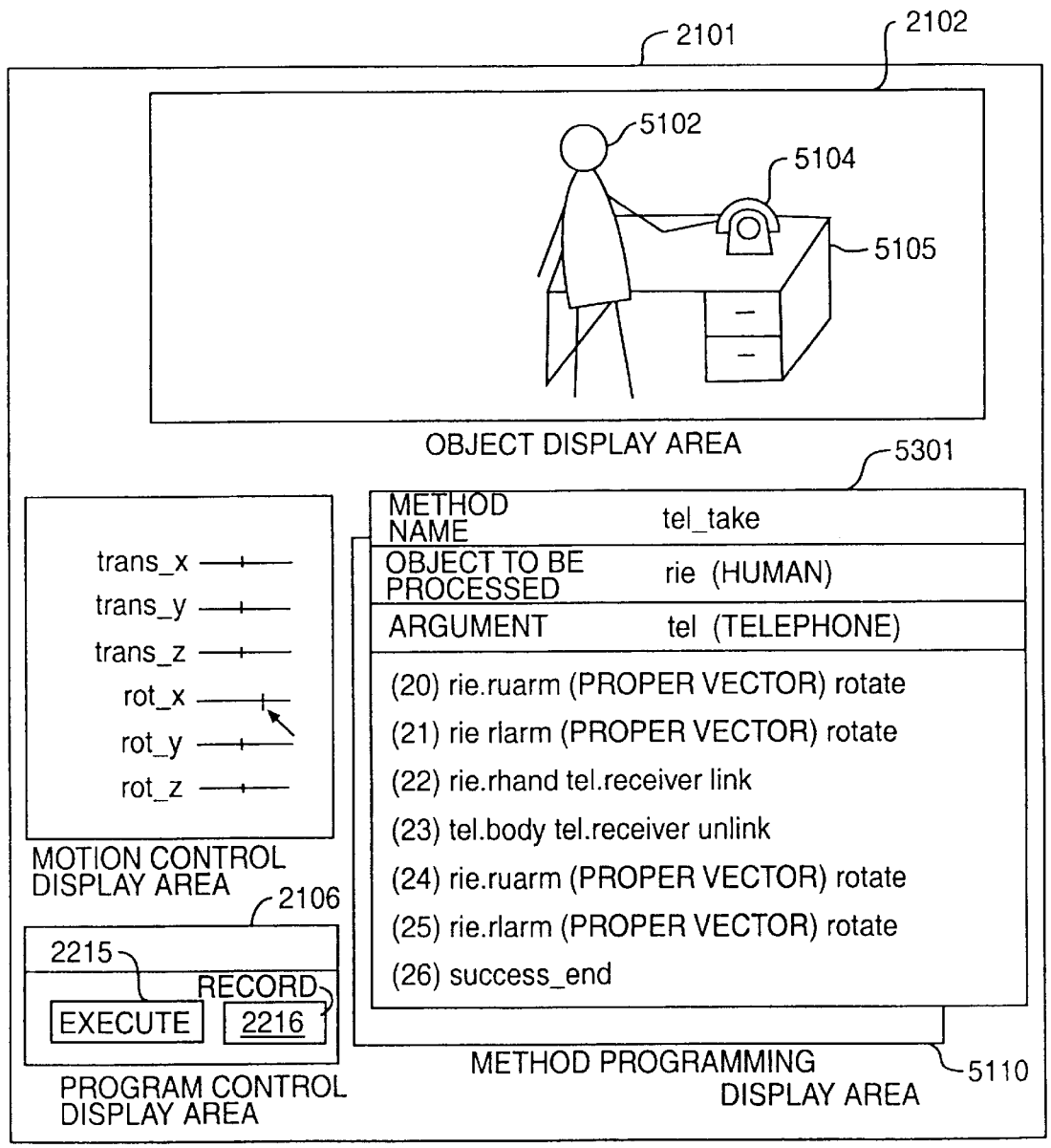
Figure 46B:
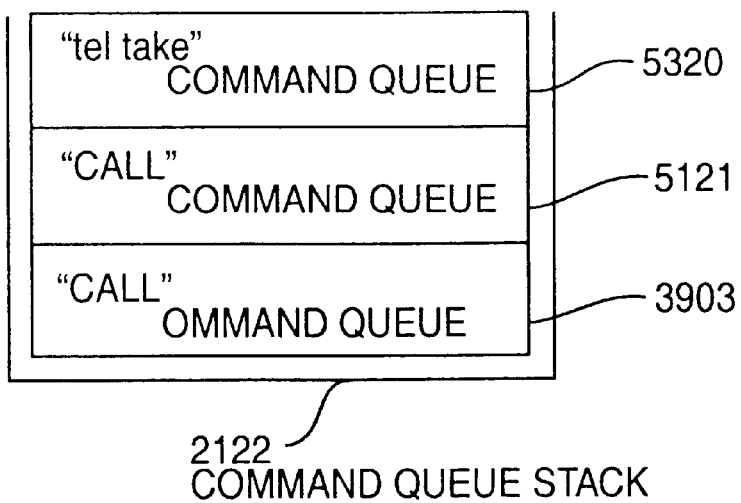

As the result of the processing 4812, the top of the command queue stack 2122 is a "tel_take" command queue 5320, as shown in FIG. 46B and the method programming display area includes the display area 5110 for the "call" method and a display area 5301 for the "tel_take" method, as shown in FIG. 46A.

As the result of the "goto" method, the human 5102 is standing toward the telephone 5104 and at a position which is suitable to take the telephone. Then, a motion is programmed which includes reaching out the right hand of the human 5102 for the receiver of the telephone 5104, holding the receiver and bringing the receiver holding right hand near to the right ear of the human 5102.

In order to cause the right and upper arm and he right and lower arm of the human 5102 to make movements which allows the right hand to hold the receiver, the motion control processing 2128 is performed for the right and upper arm and the right and lower arm while alternately selecting them. In the processing 2128, a rot-x valuator 2220 for rotation about x-axis, a rot-y valuator 2221 for rotation about g-axis and rot-z valuator 2222 for rotation about z-axis (FIG. 19) on the motion control display area are manipulated. Since the attribute of rotatability of each of the right and upper arm and the right and lower arm assumes "rotatable", as shown in FIG. 21A, the right and upper arm and the right and lower arm can be rotated at the right shoulder and the right elbow, respectively. Also, since the attribute of translatability of each of the right and upper arm and the right and lower arm assumes "not translatable", no try to translate them is made because the translation of them results in the translation of the whole of the human, as can be understood from the figure. While the right and upper arm and the right through the motion control processing 2128 shown in FIG. 34, the right hand is placed in the vicinity of the receiver of the telephone. The attribute is given for indicating that only the rotation is allowed for the articulation of the human or the like but the translation is not allowed.

After the above motion control "rie.ruarm" is inputted and is stored into the command buffer 2120 as an object to be processed. When the mouse cursor 2201 is brought onto the "record" button 2216 on the program control display area 2106 and the mouse button is depressed, the program control processing 2132 is activated and the state record processing 2134 is activated in the processing 2132 (step 4204 in FIG. 36). In the state record processing 2134, since the object to be processed ("rie.ruarm") is present in the command buffer 2120, the state record processing 2210 for object to be processed (step 4402 in FIG. 38). In the processing 2210, since the object to be processed which is stored in the command buffer is the right and upper arm of the human 5102 and the right and upper arm possesses the attribute of rotatability which assumes "rotatable" and the attribute of translatability which assumes "not translatable", the right and upper arm is rotated by the angle of rotation which is presently indicated. Therefore, a command

(20) rie.ruarm (present rotation angle) rotate is produced and is added to the "tel_take" command queue 5320 (steps 4504 and 4506). Similarly, by performing the state record processing 2210 for object to be processed for the right and lower arm of the human 5102, a command

(21) rie.rlarm (present rotation angle) rotate is added to the "tel_take" command queue 5320.

Next, the right hand of "rie" 5102 is caused to hold the receiver of "tel" 5104. A built-in instruction "link" is used for that purpose. A command to be inputted is

(22) rie.rhand tel.receiver link.

The method "link" is realized by designating an argument object as a subordinate structure of the object to be processed. As a result, the receiver is translated or rotated from this time on in accordance with the position of the right hand of the human 5102. Also, even if the telephone 5104 is translated or rotated, the receiver is not influenced.

In the present state, the receiver moves in accordance with the movement of the telephone 5104. Therefore, the following command for breaking off this relation is executed:

(23) tel.body tel.receiver unlink.

Figure 46C:
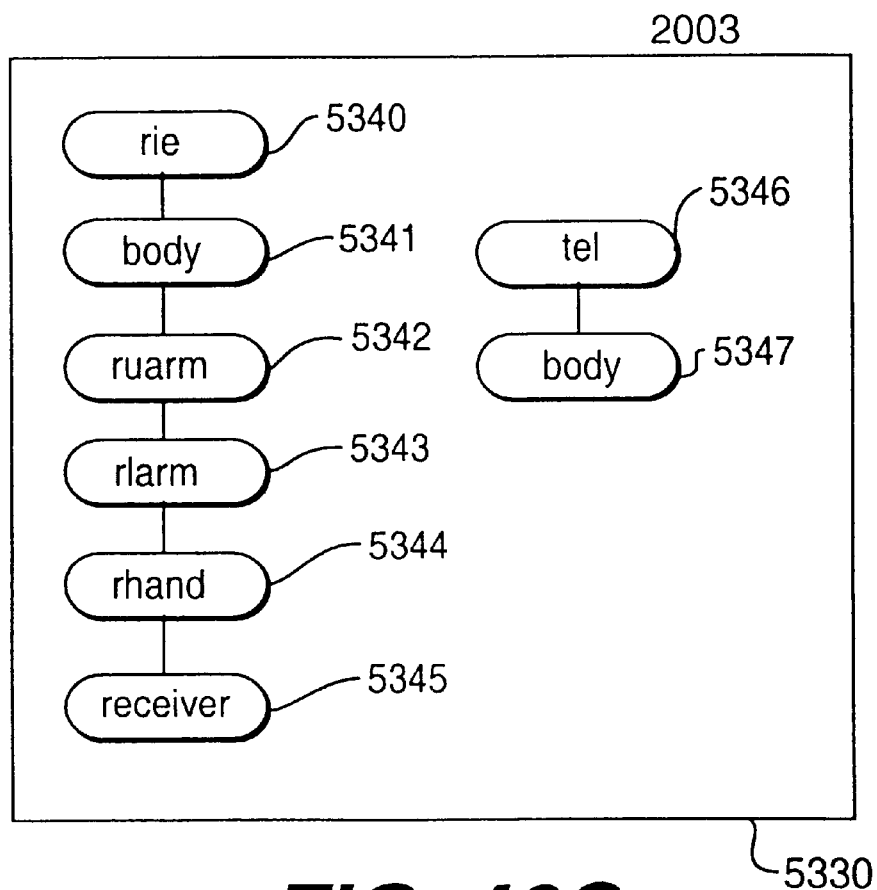

As a result, the human 5102 and the telephone 5104 have object structures as shown in FIG. 46C.

Next, the right and upper arm and the right and lower arm of the human 5102 are manipulated again by use of the valuators rot-x (220), rot-y (221) and rot-z (222) on the motion control display area 2103 so that the receiver is positioned just in the vicinity of the right ear. Thereafter, the state record processing 2134 is activated. As a result, command

(24) rie.ruarm (present rotation angle) rotate, and

(25) rie.rlarm (present rotation angle) rotate are added to the "tel_take" command queue 5320.

As the final command for this method, a command

(26) success_end is added. When the command "success_end" is reached through the successive execution of the above commands, the method execution termination processing 2301 is performed. The train of command (20) to (26) describing the "tel_take" method are recorded, the command queue stack 2122 is popped and the "tel_take" method programming display area 33-1 is erased.

The next command in the "call" command queue 5121 is the command (3) "rie tel tn connect". Since this "connect" method too is not defined in the human object 4701 (FIG. 21A), a new command queue 5430 is produced, the registration of a voice is carried out and the object method generation processing 4812 is performed.

Figure 47A:
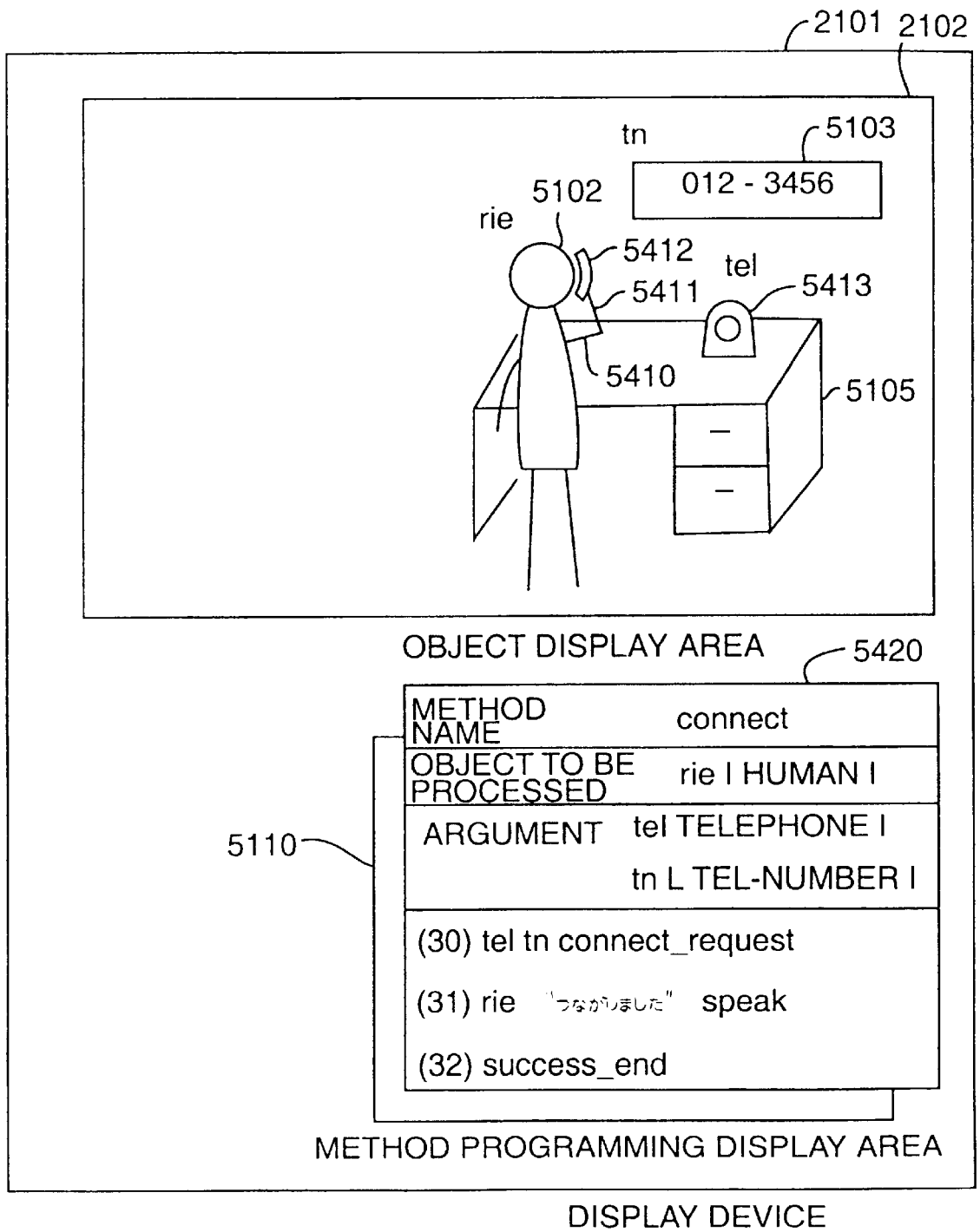

As a result, the "connect" command queue 5430 is produced at the top of the command queue stack 2122 (see FIG. 47B) and the method programming display area 5110 corresponding to "call" and a method programming display area 5420 corresponding to "connect" are displayed (FIG. 47A).

Commands for the "connect" method are the following:

(30) to request the connection to a designated telephone number—tel tn connect_request;

(31) to request the connection to a designated telephone number—tel tn connect_request;

(31) to output a voice indicating the success in connection if the connection is attained—rie "つながりました" ("connected") speak—; and

(32) to terminate the "connect" method in the case where the above results in a success—success_end.

The train of command is executed. In the case where the command (32) "success_end" is reached, the method execution termination processing 4301 is performed so that the train of command (30) to (32) are recorded as the "connect" method, the command queue stack 2122 is popped and the "connect" method programming display area 5420 is erased.

At this point of time, the top of the command queue stack reverts to the "call" command queue 5121 and the leading command in the "call" command queue 5121 is the command (4) "success_end". When the command (4) is executed, the method execution termination processing 4301 is performed so that the train of command (1) to (4) are recorded as the "call" method, the command queue stack 2122 is popped and the "call" method programming display area 5110 is erased. At this point of time, the top of the command queue stack 2122 is the initial command queue 5120. Thus, the intended programming of the "call" method has been terminated. From this time on, if "execute" is inputted and a command "(human object instance) (telephone object instance) (telephone number object instance) call" is sent to the object method execution processing 2135, the human object instance translates to the position of the telephone, looks back to hold the receiver, requests the connection to a designated telephone number and outputs a voice of "connected" if the connection results in a success.

Also, each of commands "(human object instance) (vector object instant) goto", "(human object instance) (telephone object instance) tel_take" and "(human object instance) (telephone object instance) (telephone number object instance) connect", too, is defined in the process of definition of the "call" method. Since the execution of each command is outputted as the motion or voice of an object instance, it is easy to recognize the state of execution.

However, there is a possibility that a failure may occur at a certain stage of the execution of the command train. In the present example, it can be considered that a failure occurs at the command (30) "rie tel tn connect_request" in the command (3) "rie tel tn connect", for example, by reason that a person which is to be called up on the telephone is speaking. But, one feature of the present invention lies in that any need to describe a program is not caused until the failure actually occurs.

In the case where a failure occurs at the command (30) during the command execution is made in some times, it is possible to describe a program by use of the example of failure. As for the example shown in FIG. 47A, assume that a failure occurs when the person 5102 uses a telephone number object instant tn1 through the telephone. A command using tn1 is

(40) rie tel tn1 connect and the following command (30') conformable to the present example substituted for the command (30) encounters the failure:

(30') rie tel tn1 connect_request.

Like the case mentioned before, an object method generation processing 4812 (FIG. 42) is performed. A program now made is one in the case where the connection of the telephone result in a failure. A train of commands are as follows:

(41) to output a message of "not connected" by means of a voice—rie "つながりません" ("not_connected") speak;

(42) to rotate the receiver to a position where it fits in the body—rie.receiver (direction in which the receiver fits in the telephone) rotate;

(43) to place the receiver at the position of the body—rie.receiver tel # position translate;

(44) to break off the relation between the receiver and the right hand of "rie"—rie.receiver tel.body like;

(45) to restore the original relation between the receiver and the body—rie.rhand rie.receiver unlink;

(46) to make the human stand erect—rie neutral; and

(45) to terminate if the above results in a success—success_end.

Figure 48A:
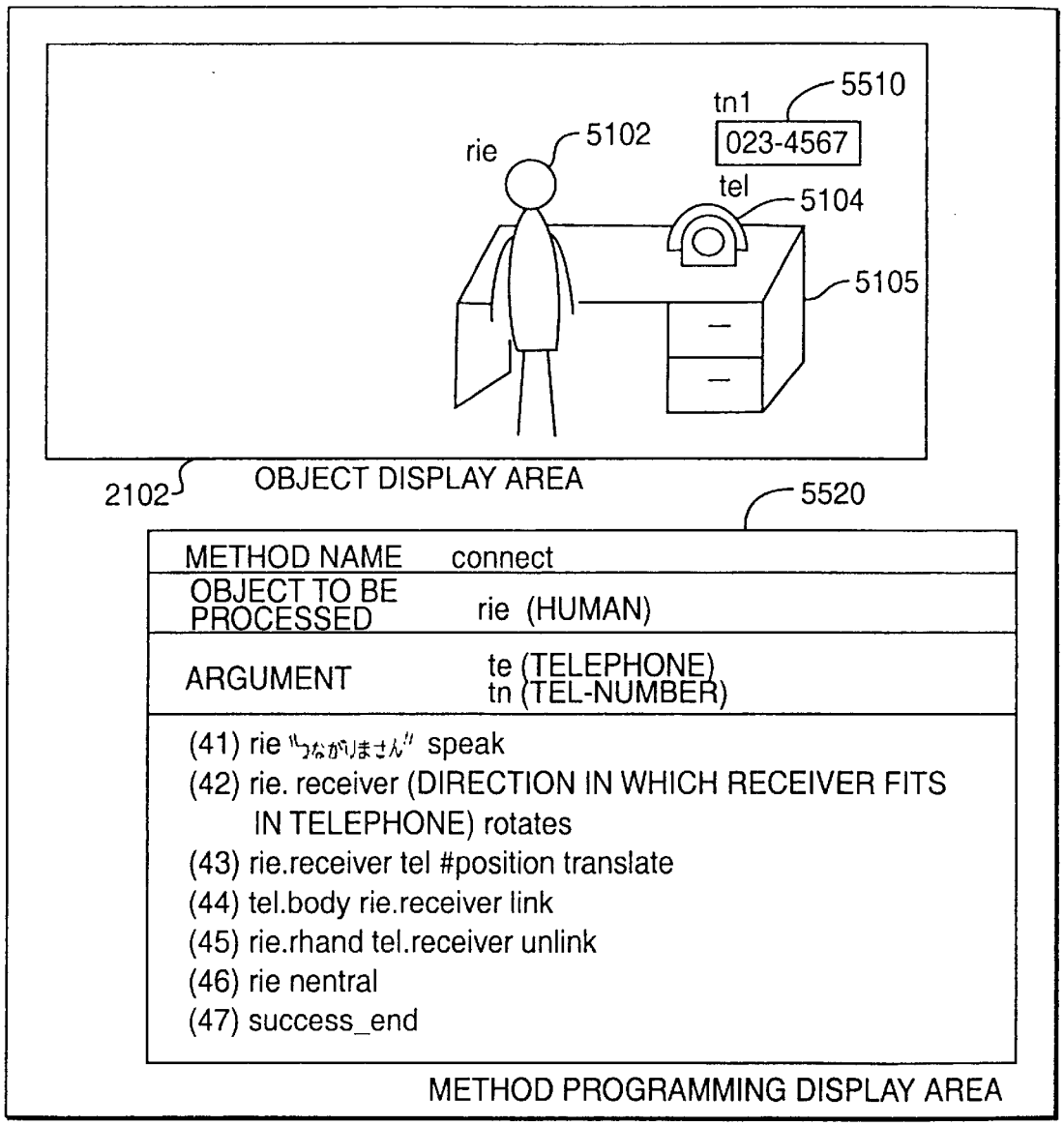
Figure 48B:
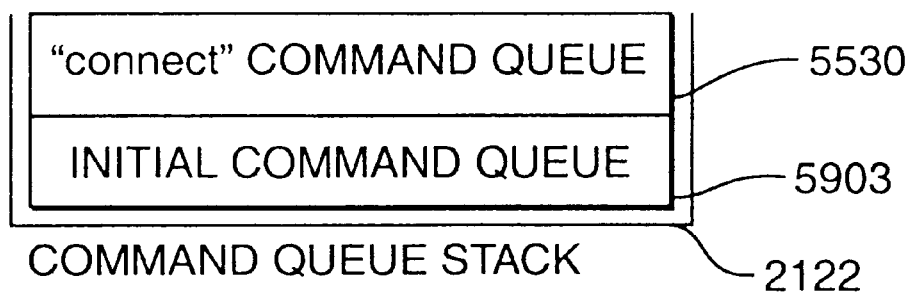
Figure 48C:
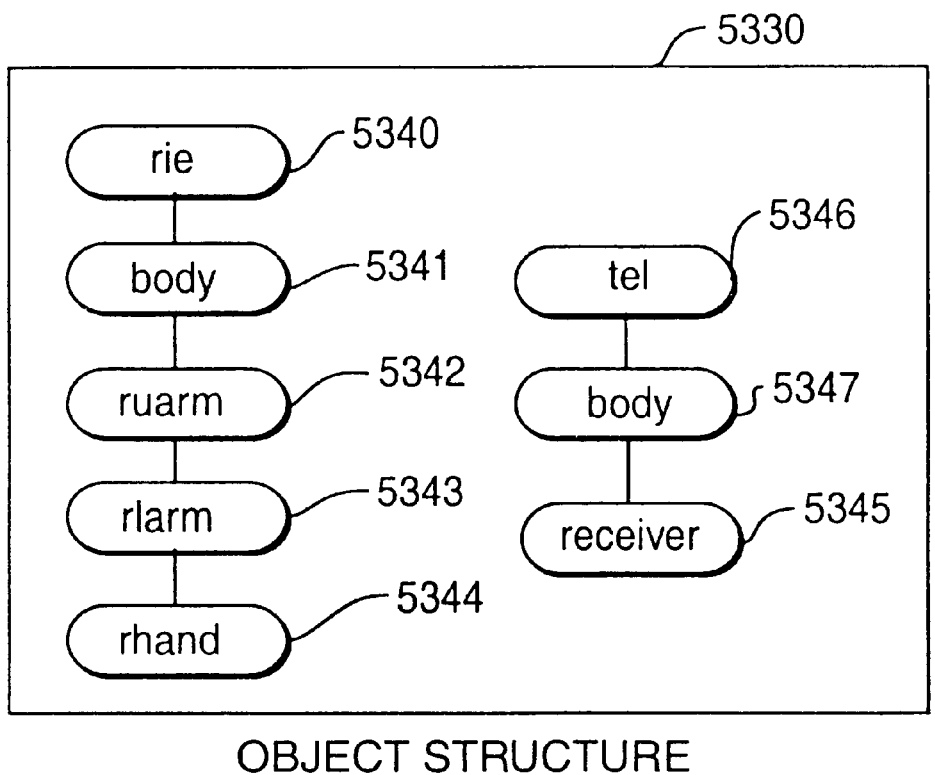

After the execution of the command s(44) and (45), the object structure takes one 5330 shown in FIG. 48C. This state is one which was originally defined for each of the human object instance 4701 and the telephone object instance 4750. On and after this time, the human and the telephone operate as a usual human object 4701 and a usual telephone object 4750.

Figure 47B:
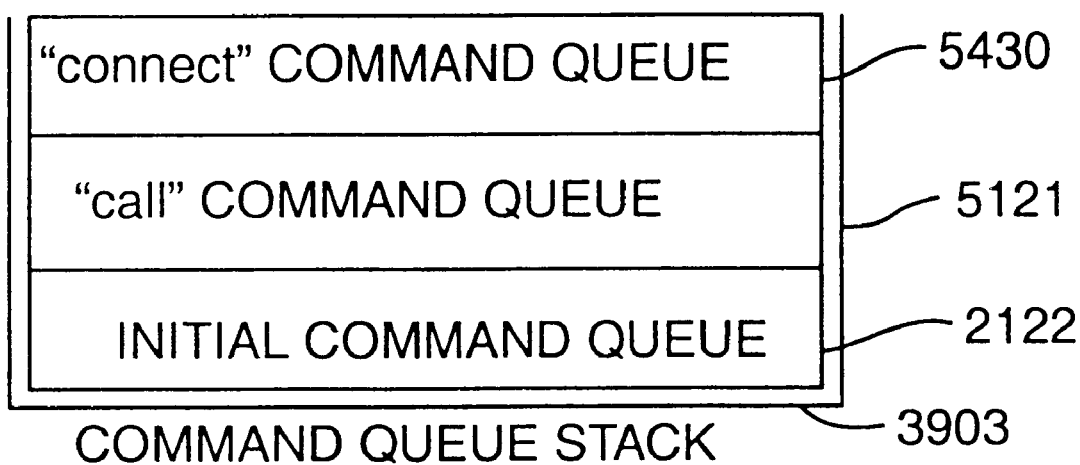

When the command (47) "succes_end" is reached as the result of the successive execution of the above commands, the method execution termination processing 2301 is performed so that the command (41) to (47) are newly stored as the "connect" method for the human object 4701 without lossing the method or commands defined in conjunction with FIG. 47B.

Now, two command trains or the train of commands (30) to (31) and the train of commands (41) to (47) are defined as the "connect" method for the human object. Since the execution of method is conducted in the order of definition, the execution of the command "(human object instance) (telephone object instance) (telephone number object instance) connect" issues a request for designated connection by use of the train of commands (30) to (32). As a result, if a success is attained, a voice output of "connected" is provided. If not successful, there turns to the execution of the commands (41) to (47) in which a voice output of "not connected" is provided and the human rests the receiver on the telephone and stands erect.

The above results in that the secretary has a general set of methods in regard to call-up or telephoning. As shown in FIG. 21A, the human object 2701 has the "call" methods (2712), "goto" methods (2713), "tel_take" method (2714), "connect (1)" method (2715) and "connect (2)" method (2716) which are those of the built-in instruction codes of FIG. 43 in which the object to be processed is the human.

2. Program Using Communication with Large-Size General Purpose Computer 2116

Next, the features of the embodiment of the present invention will be explained using an example in which a council-room is reserved by use of a large size general purpose computer. Therein, reference will also be made to the programming of the field of view of the camera.

A method "yoyaku" (reverse) is described by use of the human object instance "rie" (3102), a terminal object instance "term" (3612), a data object instance "data" (3610) and a room object instance "room" (3611).

Figure 49A:
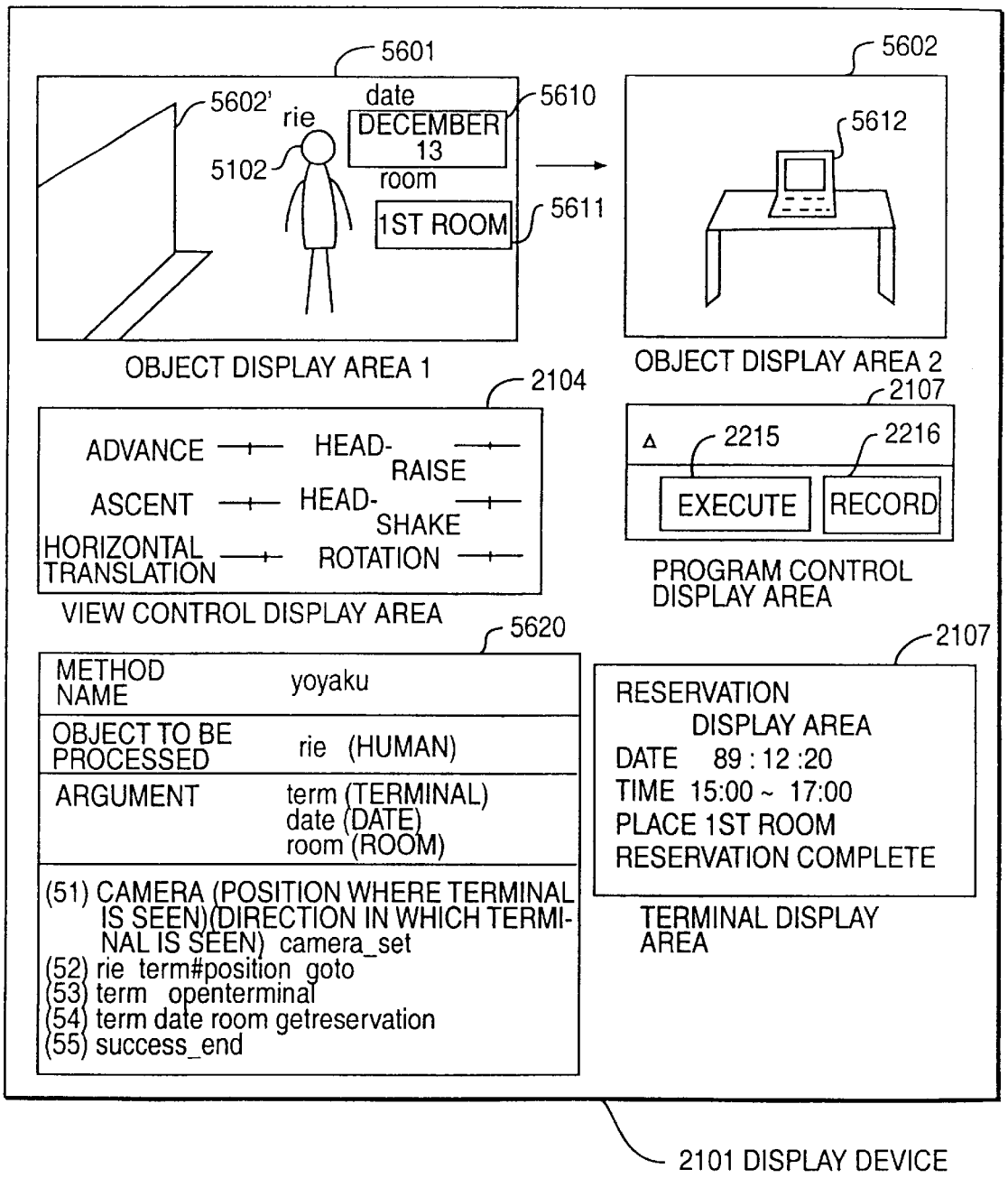
Figure 49B:
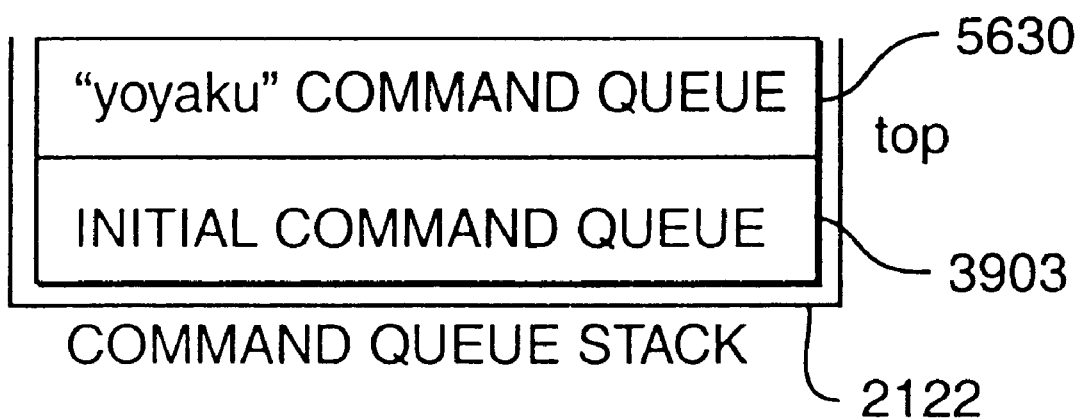

It is assumed that the object instances are placed in a three-dimensional space, as shown in FIG. 49A.

Figure 50:
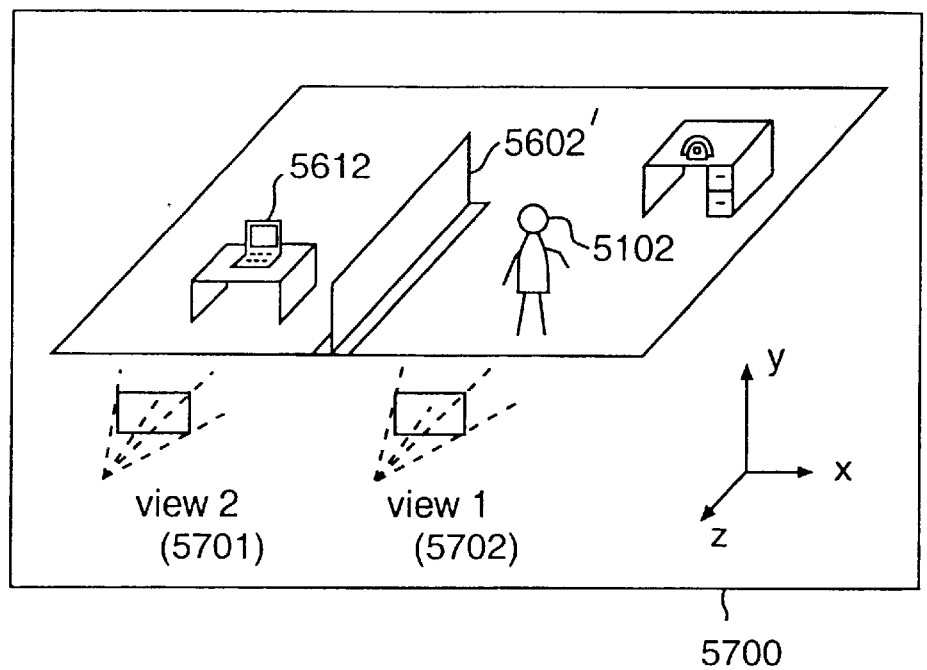
FIG. 50 is a view for explaining the arrangement of object instances in a three-dimensional space and a view for projecting the object instances.

First, it is assumed that a camera object instance uses a view 1 (3701) (see FIG. 50) and the terminal object instance "term" (3612) is obstructed by a partition 3602' and is therefore not displayed on an object display area 1 (3601) shown in FIG. 49A. Accordingly, it is assumed that it is not possible to select the terminal object instance "term" by the mouse 109.

The following method or command is defined:

(50) rie term data room yoyaku.

The "term" (3612) in the command (50) is inputted by either a voice or the keyboard.

When the command (50) is executed, the object method generation processing 4812 is activated so that a "yoyaku" command queue 5630 is pushed into the command queue stack 2122 and a method programming display area 5620 is produced.

If the terminal is not displayed at this point of time, it is not possible to see what is manipulated or operated. Therefore, valuators on the view control display area 2104 are manipulated to change the view 1 (3701) to a view 2 (3702) in which "term" 5612 is seen and to display "term" 5612 as on an object display area 2 (3602), thereby making it possible to select "term" 5612 by the mouse 19.

Thus, in the case where objects defined as three-dimensional form in the computer are to be selected by the display device and the mouse, anyone of those object which is not projected on the display device can be selected by changing the view so that it is projected on the display device.

In this program, the state record processing 134 for the camera is executed provided that the operator programs to put the human to work in a specified view. For that purpose, an object to be processed in the command buffer is made empty. When the state record processing 134 is executed, a command

(51) camera (position where terminal is seen) (direction in which terminal is seen) camera_set is produced. This command is a special command for changing the view.

Next, the previously defined method "goto" is used to add a command

(52) rie term # position goto, thereby causing "rie" 5102 to translate or walk to the position of "term".

An instruction code of the next command

(53) term openterminal is a built-in instruction by which a path of communication with the large size general purpose computer is opened to long-on to the computer. Simultaneously, a terminal display area 2107 is displayed on the display device 2101.

Next, a command

(54) term data room getreservation is executed to execute a reservation application program on the large size general purpose computer, thereby making the reservation of a council-room by means of "data" 5610 and "room" 5611.

If the above results in a success, a command

(55) success_end is added to the "yoyaku" queue 5630. By executing the above command train, the train of commands (51) to (55) are recorded as a "yoyaky" method, the command queue stack 2122 is popped and the "yoyaky" method programming display area 5620 is erased.

In this manner, it is possible to make a designation that a specified view position is established and an object method is executed with the camera set at the specified position.

D. Modifications

The foregoing has be explained in conjunction with an example in which a three-dimensional form is displayed on the object display area 2102 by means of the three-dimensional form data base 2123. However, this is not necessarily essential to the present invention. Explanation will now be made of a method of realizing a system which does not was a three-dimensional form. A program for call-up as mentioned in item 1 of C will described by way of example.

Figure 51:
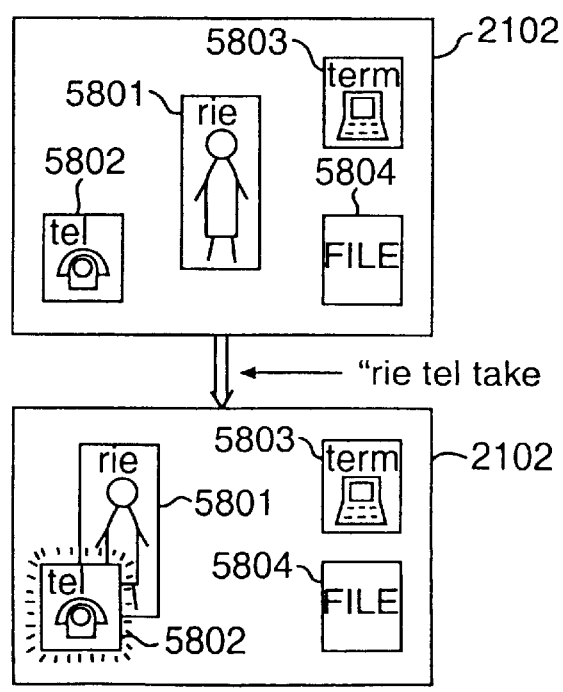
FIGS. 51 to 53 are views for explaining different methods of simply realizing the second embodiment of the present invention in a two-dimensional system.
Figure 52:
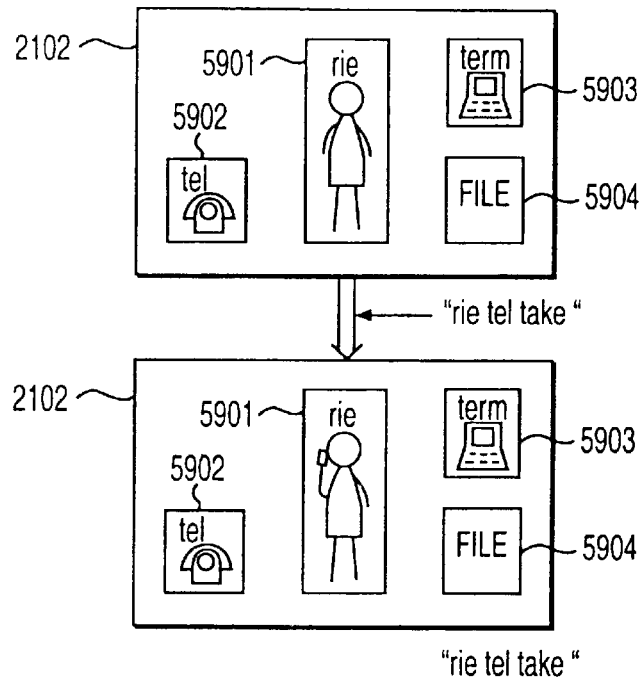
Figure 53:
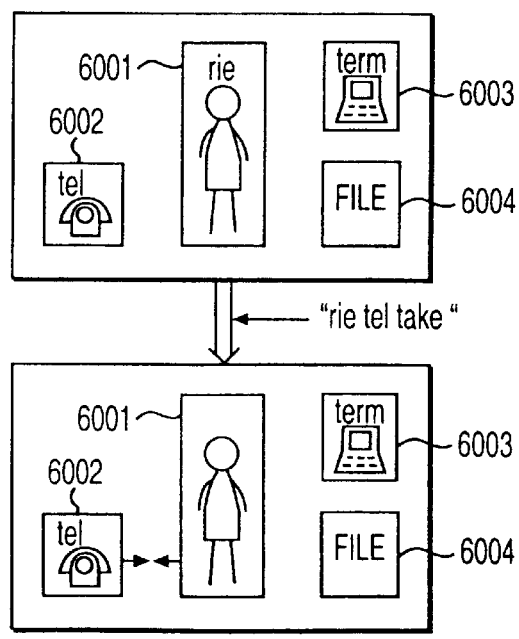

A problems in the case where the call-up program is to be realized by a two-dimensional system is how to express a motion in which an object instance receiving a request goes to the the telephone object and takes up the receiver. As shown in FIG. 51, this realized by causing the request receiving object instance 3801 to translate to the object instance 5802 as an object to be processed and performing a processing of highlighting such as the flickering of an icon representative of the telephone in order to express the take-up of the receiver. Alternatively, both of the icon 5801 and the icon 5802 may be highlighted with no translation. Also, an icon 5901 receiving the request and/or an icon 5902 as the object to be processed may be changed in display form or transformed (or deformed), as shown in FIG. 52. Further, an arrow mark from an icon 6001 receiving the request toward an icon 6002 as the object to be processed and/or an arrow mark from the icon 4002 toward the icon 6001 may be displayed, as shown in FIG. 53.

As apparent from the above, what is essential to the present invention lies in that in expressing the state of execution of a program on the display device, a program managing the execution of a program library is displayed in a figure or graphic form and the display is changed in accordance with the state of execution.

In the present embodiment, the command (2) has been inputted in order to cause the human icon 5102 to take the telephone and the method including the train of commands (20) to (26) has been defined for the command (2). However, for the purpose of informing the operator of the state of program execution, the train of commands (20) to (26) may be preliminary incorporated in the method of the instruction "connect" in the command (3) for causing the human icon 5102 to telephone so that in response to the input of the command (3) the human 5102 translates to the telephone in the vicinity or process of the real telephoning operation method and takes up the receiver.

Further, in the present embodiment, the receiver has been translated linking with the human icon 3302. However, the receiver may be translated in response to the instruction "connect" in the command (3). Also, thereby, it is possible to make the operator recognize what a method of another object requested from a program being made is.

According to the present invention, an object to be originally operated or processed is visualized with an image as it is and a program can be obtained by operating the visualized object. Therefore, there is an effect that the making of a program is easy.

Also, since the state or process of each data manipulation is animated, the programming easily accustomed to non-specialists of a computer and having great reality becomes possible.

Further, since the display of an icon-corresponding to a program is changed in accordance with the stage of execution of the program and in relation with an icon representative of another object to be processed, a user can make a more intuitive grasp of the state of execution of the program.

Still further, in the case where an icon corresponding to a program is of a human shape, it is possible to instruct the execution of the program with a feeling that a secretary exists in a computer when see from a user and a work for the program is requested upon the secretary.

Furthermore, in the case where an icon generally used for the input to a computer is three-dimensionized, an interface can be realized which is easy to obtain a more intuitive appreciation.

Moreover, in the case where a voice input/output is used upon input to a computer, there can be provided a computer operating environment where the operation can be simply made.

The above effects allow a programming easily accustomed to non-specialists of a computer and having great reality and allow many persons to make a variety of programs. This also provides an effect that the problem of lack of programmers can be moderated.

What is claimed is:

1. A method for displaying progress of program execution by using a processing unit coupled with a display device, the method comprising the steps of:

a) displaying on said display device, a first icon indication n object to be operated and a second icon operating said object to be operated;

b) executing a given preset process in response to a designation from an operator of said second icon; and c) changing an appearance of said second icon, based on a predetermined process for displaying the second icon in accordance with progress of said given process independently from an operator's designation for changing a position of said second icon.

2. A method according to claim 1, wherein said operator's designation is performed based on an input voice.

3. A method according to claim 1, wherein said operator's designation is performed by a mouse.

4. A system for displaying progress of program execution including display means for displaying and means for executing a program, comprising:

a) display control means for displaying on said display means, a first icon indicating an object to be operated and a second icon operating said object to be operated;

b) said program executing means executing a given process in response to a designation from an operator of said second icon; and c) said display control means changing an appearance of said second icon, based on a predetermined process in accordance with progress of said given process independently from an operator's designation for changing a position of said second icon.

5. A method according to claim 1, wherein said step of changing the appearance of icon includes changing the distance between said first icon and said second icon in accordance with progress of said given process.

6. A system according to claim 4, wherein said icon changing means includes means for changing the distance between said first icon and said second icon in accordance with progress of said given process.

7. A computer-readable recording medium storing a program for implementing a method for displaying progress of program execution by using a processing unit couple with a display device, the method comprising the steps of:

a) display on said display device, a first icon indicating an object to be operated and a second icon operating said object to be operated;

b) executing a given preset process in response to a designation from an operator of said second icon; and c) changing an appearance of said second icon, based on a predetermined process for displaying the second icon in accordance with progress of said given process independently from an operator's designation for changing a position of said second icon.

8. A recording medium according to claim 7, wherein said step of changing the appearance of icon includes changing the distance between said first icon and said second icon in accordance with progress of said given process.

9. A computer program for implementing a method for displaying progress of program execution by using a processing unit coupled with a display device, the method comprising the steps of:

a) displaying on said display device, a first icon indicating an object to be operated and a second icon operating said object to be operated;

b) executing a given preset process in response to a designation from an operator of said second icon; and c) changing an appearance of said second icon, based on a predetermined process for displaying the second icon in accordance with progress of said given process independently from an operator's destination for changing a position of said second icon.

10. A computer program according to claim 9, wherein said step of changing the appearance of icon includes changing the distance between said first icon and said second icon in accordance with progress of said given process.

* * * * *